%% US008762380B2

(12) United States Patent
Shirai et al.

(10) Patent No.: US 8,762,380 B2
(45) Date of Patent: Jun. 24, 2014

(54) CORRELATING CATEGORIES OF ATTRIBUTES OF CONTENTS WITH CLASSIFICATION ELEMENTS

(75) Inventors: Yasuhiro Shirai, Kanagawa (JP); Toshihiro Morita, Kanagawa (JP); Taku Sugawara, Tokyo (JP); Shin Ogata, Tokyo (JP); Susumu Morita, Saitama (JP)

(73) Assignee: Sony Corporation, Tokyo (JP)

( * ) Notice: Subject to any disclaimer, the term of this patent is extended or adjusted under 35 U.S.C. 154(b) by 819 days.

(21) Appl. No.: 11/734,405

(22) Filed: Apr. 12, 2007

(65) Prior Publication Data

US 2007/0282787 A1 Dec. 6, 2007

(30) Foreign Application Priority Data

Apr. 26, 2006 (JP) ................................. 2006-122138

(51) Int. Cl.
*G06F 7/00* (2006.01)
*G06F 17/30* (2006.01)

(52) U.S. Cl.
USPC .......................................... 707/738; 707/916

(58) Field of Classification Search
USPC .............. 707/2, 3, 6, 7, 100, 102, 104.1, 705, 707/736, 737, 738, 748, 752, 913, 916
See application file for complete search history.

(56) References Cited

U.S. PATENT DOCUMENTS

| | | | | |
|---|---|---|---|---|
| 5,761,683 A | * | 6/1998 | Logan et al. | 715/206 |
| 5,812,995 A | * | 9/1998 | Sasaki et al. | 707/1 |
| 6,446,080 B1 | * | 9/2002 | Van Ryzin et al. | 707/104.1 |
| 6,526,411 B1 | * | 2/2003 | Ward | 707/102 |
| 6,745,199 B2 | * | 6/2004 | Morita et al. | 707/102 |
| 6,760,721 B1 | * | 7/2004 | Chasen et al. | 707/3 |
| 6,928,433 B2 | * | 8/2005 | Goodman et al. | 386/243 |
| 7,043,477 B2 | * | 5/2006 | Mercer et al. | 707/7 |
| 2004/0193673 A1 | * | 9/2004 | Samji et al. | 709/200 |
| 2005/0076008 A1 | * | 4/2005 | Kudou | 707/3 |
| 2005/0251508 A1 | * | 11/2005 | Shimizu | 707/2 |
| 2006/0155754 A1 | * | 7/2006 | Lubin et al. | 707/102 |

FOREIGN PATENT DOCUMENTS

| | | |
|---|---|---|
| JP | 2001-14166 | 1/2001 |
| JP | 2002-319271 | 10/2002 |
| JP | 2003-68053 | 3/2003 |
| JP | 2003-256803 | 9/2003 |
| JP | 2005-44403 | 2/2005 |
| JP | 2006-40473 | 2/2006 |
| JP | 2007-58562 | 3/2007 |
| WO | WO 2004095237 A2 * | 11/2004 |

OTHER PUBLICATIONS

U.S. Appl. No. 11/777,614, filed Jul. 13, 2007, Shirai, et al.

* cited by examiner

*Primary Examiner* — Marc Somers
(74) *Attorney, Agent, or Firm* — Oblon, Spivak, McClelland, Maier & Neustadt, L.L.P.

(57) ABSTRACT

An information processing apparatus that performs processing for editing information on contents includes: an acquisition means for acquiring attribute data classification information in which a plurality of attribute data indicating predetermined attributes of contents is correlated with category data indicating categories for classifying the plurality of attributes; a selection means for selecting predetermined attribute data from the attribute data included in the attribute data classification information acquired by the acquisition means; and a correlation means for newly correlating the attribute data selected by the selection means with category data other than the category data, which is correlated in the attribute data classification information acquired by the acquisition means, in response to a user's instruction.

21 Claims, 38 Drawing Sheets

FIG. 5

| ARTIST GROUP ID | ARTIST ID | ORDER INFORMATION | ATTRIBUTE INFORMATION |
|---|---|---|---|
| AGID_1 | AID_1 | 1 | USER A |
| AGID_1 | AID_2 | 2 | USER B |
| AGID_1 | AID_3 | 3 | system |
| AGID_2 | AID_2 | 2 | USER A |
| AGID_2 | AID_4 | 1 | USER A |
| ... | ... | ... | ... |

| CONTENTS ID | CONTENTS NAME | ALBUM NAME | ARTIST NAME | GENRE NAME | CONTENTS FILE NAME | REPRODUCED FLAG |
|---|---|---|---|---|---|---|
| TID_1 | Song1 | Album1 | AT1 | Pops | Song1.oma | 0 |
| TID_2 | Song2 | Album1 | AT1 | Pops | Song2.oma | 0 |
| TID_3 | Song3 | Album2 | AT2 | Rock | Song3.oma | 0 |
| ... | ... | ... | ... | ... | ... | ... |

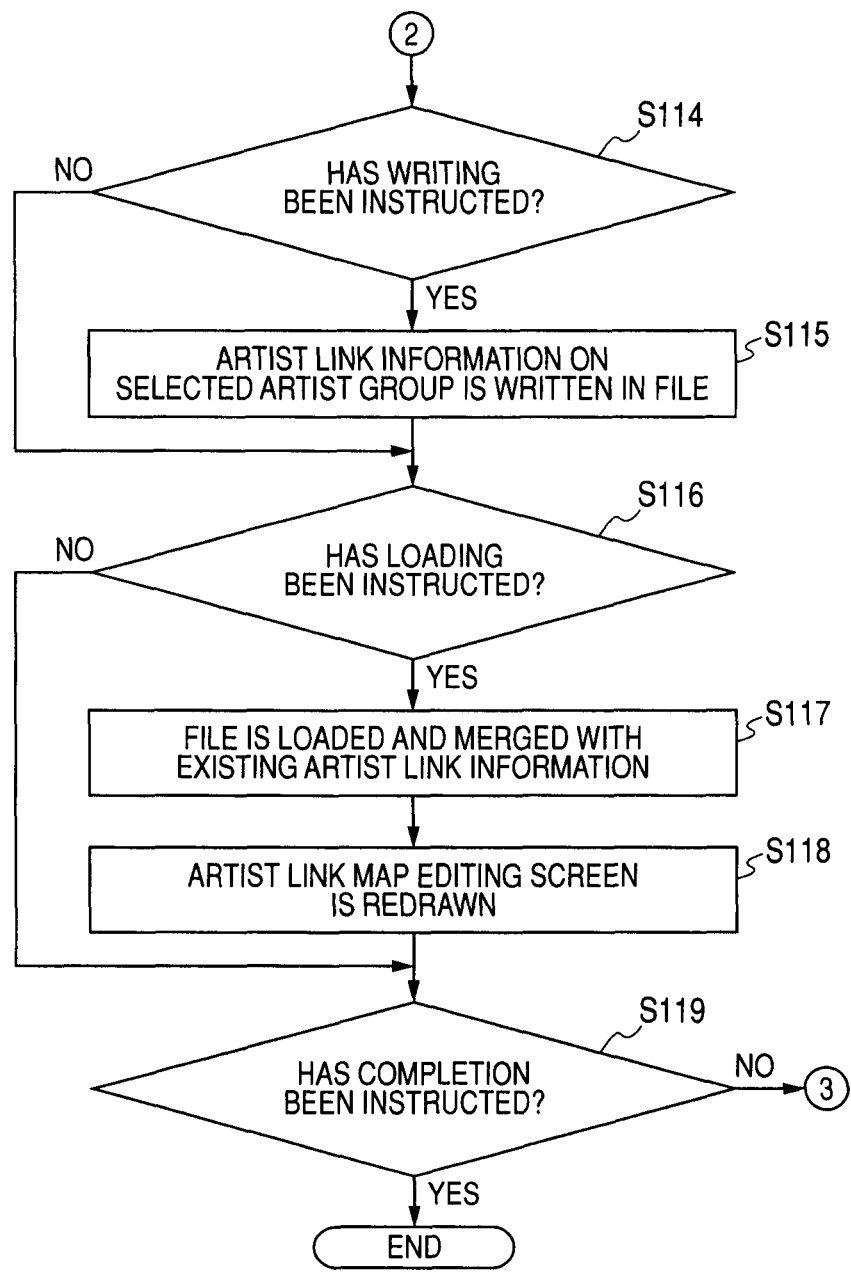

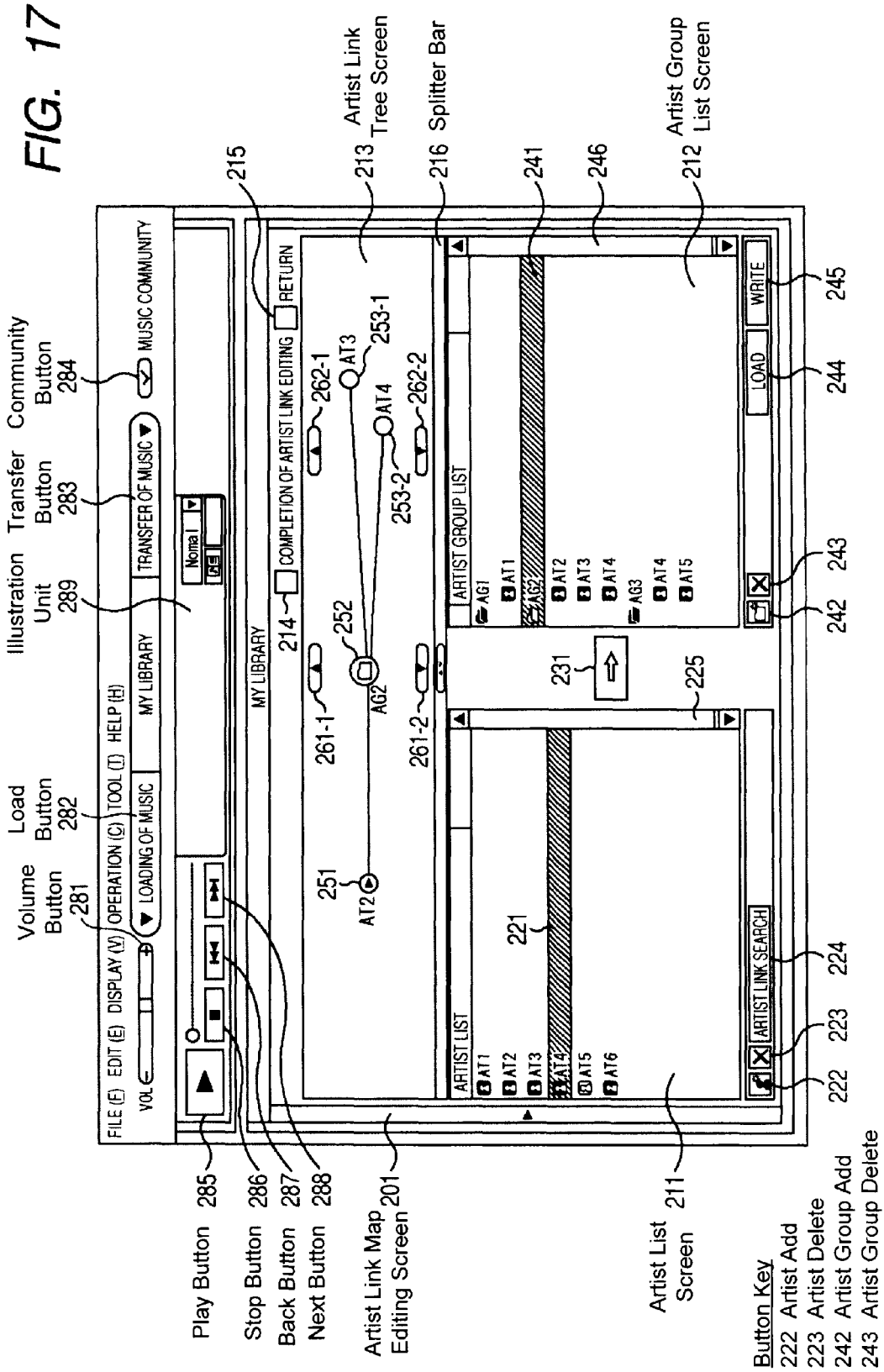

FIG. 18

```
- <ArtistLinkMap Version="4.0">
- <Group Creator="System" Width="Narrow">
  <Title>AG1</Title>
  <Comment/>
  <Artist>AT1</Artist>
  </Group>
- <Group Creator="User" Width="Narrow">
  <Title>AG2</Title>
  <Comment/>
  <Artist>AT2</Artist>
  <Artist>AT3</Artist>
  </Group>
- <Group Creator="User" Width="Narrow">
  <Title>AG3</Title>
  <Comment/>
  <Artist>AT3</Artist>
  <Artist>AT4</Artist>
  </Group>
  </ArtistLinkMap>
```

CORRELATING CATEGORIES OF ATTRIBUTES OF CONTENTS WITH CLASSIFICATION ELEMENTS

CROSS REFERENCES TO RELATED APPLICATIONS

The present invention contains subject matter related to Japanese Patent Application JP 2006-122138 filed in the Japanese Patent Office on Apr. 26, 2006, the entire contents of which being incorporated herein by reference.

BACKGROUND OF THE INVENTION

1. Field of the Invention

The present invention relates to an information processing apparatus, an information processing method, and a program. In particular, the present invention relates to an information processing apparatus, an information processing method, and a program capable of causing a user to easily edit artist link information indicating association among artists of contents such that artist link information efficient for the user can be created.

2. Description of the Related Art

In recent years, a method of loading music data to a personal computer (PC) by ripping a song recorded in a CD (compact disc) or downloading a desired song from a music distribution server using music distribution service or the like has widely spread, such that a user can enjoy contents, such as music data, loaded to a PC by using the PC or a portable device (PD).

Moreover, since a storage means for storing a large amount of data is recently provided in the PC or PD, a user may record various kinds of contents in the PC. Accordingly, in the case when various kinds of contents not depending on user's liking are recorded in the PC or PD, it took time for the user to search desired contents corresponding to user's mood from the various kinds of contents, for example.

Therefore, the present applicant has released, as a proposal that allows a user to easily search contents loaded to the PC or PD, a product in which artist link information (that is, classification information indicating association among one attributes of contents referred to as artists) on loaded music data is acquired through a network in the PC or PD and then association among artists is displayed on the basis of the acquired information such that a user can select a content to listen next corresponding to the user's liking, as disclosed in "NW-A3000, NW-A1000, 'Catalogue information' (artist link)", [online], SonyDrive, [Searched on Mar. 31, 2006], Internet www dot walkman dot sony dot co dot jp/products/Aseries dot html, for example.

SUMMARY OF THE INVENTION

However, since the artist link information that is the classification information indicating association among artists (attributes) is supplied from a server or the like, it is difficult for a user to edit the artist link information. For this reason, under current circumstances, it is difficult to cope with a case in which artists are rarely linked or a case in which artists are not properly linked, which lacks in flexibility.

Therefore, in view of the above, it is preferable to cause a user to easily edit artist link information indicating association among artists of contents such that artist link information efficient for the user can be created.

According to an embodiment of the present invention, an information processing apparatus that performs processing for editing information on contents includes: an acquisition means for acquiring attribute data classification information in which a plurality of attribute data indicating predetermined attributes of contents is correlated with category data indicating categories for classifying the plurality of attributes; a selection means for selecting predetermined attribute data from the attribute data included in the attribute data classification information acquired by the acquisition means; and a correlation means for newly correlating the attribute data selected by the selection means with category data other than the category data, which is correlated in the attribute data classification information acquired by the acquisition means, in response to a user's instruction.

In the information processing apparatus described above, preferably, a category indicated by the other category data is created by a user's instruction.

Further, in information processing apparatus described above, preferably, the correlation means newly correlates category data, which is included in the attribute data classification information acquired by the acquisition means, with attribute data other than the attribute data correlated with the category data in response to a user's instruction.

Furthermore, in information processing apparatus described above, preferably, the correlation means causes the attribute data, which is correlated with category data included in the attribute data classification information acquired by the acquisition means, to stop being correlated with the category data in response to a user's instruction.

Furthermore, in information processing apparatus described above, preferably, the acquisition means acquires the attribute data classification information on contents stored in a predetermined storage means, through a network.

Furthermore, in information processing apparatus described above, preferably, the correlation means outputs, as a file, attribute data classification information that is a result obtained by newly correlating the attribute data selected by the selection means with the other category data.

Furthermore, in information processing apparatus described above, preferably, the correlation means acquires the attribute data classification information output as the file from another information processing apparatus and also newly correlates category data, which is included in the attribute data classification information that is the result of the new correlation, with the attribute data correlated in the acquired attribute data classification information.

Furthermore, in information processing apparatus described above, it is preferable to further include a contents acquisition means for acquiring, when contents having the newly correlated attribute data are not stored in a predetermined storage means, the contents having the attribute data through a network.

Furthermore, in information processing apparatus described above, preferably, the attribute data correlated with the category data included in the attribute data classification information is prioritized.

According to another embodiment of the present invention, an information processing method of an information processing apparatus that performs processing for editing information on contents includes the steps of: acquiring attribute data classification information in which a plurality of attribute data indicating predetermined attributes of contents is correlated with category data indicating categories for classifying the plurality of attributes; selecting predetermined attribute data from attribute data included in the acquired attribute data classification information; and newly correlating the selected attribute data with category data other than the category data, which is correlated in the acquired attribute data classification information, in response to a user's instruction.

Further, according to still another embodiment of the present invention, there is provided a program causing an information processing apparatus that performs processing for editing information on contents to execute processing including: acquiring attribute data classification information in which a plurality of attribute data indicating predetermined attributes of contents is correlated with category data indicating categories for classifying the plurality of attributes; selecting predetermined attribute data from attribute data included in the acquired attribute data classification information; and newly correlating the selected attribute data with category data other than the category data, which is correlated in the acquired attribute data classification information, in response to a user's instruction.

In any one of the embodiments of the present invention, there is acquired the attribute data classification information in which the plurality of attribute data indicating predetermined attributes of contents is correlated with category data indicating categories for classifying the plurality of attributes. In addition, predetermined attribute data is selected from attribute data included in the acquired attribute data classification information. In addition, the selected attribute data is newly correlated with category data other than the category data, which is correlated in the acquired attribute data classification information, in response to a user's instruction.

According to any one of the embodiments of the present invention, an environment that allows editing artist link information of an artist of contents is provided. As a result, it is possible to simply create artist link information efficient for a user.

BRIEF DESCRIPTION OF THE DRAWINGS

FIG. 5 is a view illustrating an example of the configuration of an artist link correspondence table shown in FIG. 4;

FIG. 16 is a flow chart explaining artist link information editing processing in the PC shown in FIG. 1;

FIG. 17 is a view illustrating an example of the configuration of an artist link map editing screen after redrawing;

FIG. 18 is a view illustrating an example of the configuration of an XML file in which artist link information is written;

DESCRIPTION OF THE PREFERRED EMBODIMENTS

Hereinafter, preferred embodiments of the present invention will be described. The relationship between configuration requirements defined in the appended claims and specific examples in the embodiments of the present invention are as follows. The description is made to confirm that the specific examples supporting the present invention defined in the appended claims are described in the embodiments of the present invention. Therefore, even if there exists a specific example that is described in the embodiments of the present invention but not described in the following description as what corresponds to the configuration requirements of the present invention, the specific example is not to be interpreted as an example which does not correspond to the configuration requirements. In contrast, even if a specific example is described in the following description as what corresponds to the configuration requirements of the present invention, the specific example is not to be interpreted as an example which does not correspond to a configuration requirement other than the configuration requirements.

Further, the following description is not to be interpreted that the inventions corresponding to specific examples described in the embodiments of the present invention cover all of the present invention defined in the appended claims. That is, the following description describes the inventions described in the specification, but does not deny inventions not recited in the appended claims of the present application or inventions to be applied by a divisional application or to be added by an amendment in the future.

An information processing apparatus according to an embodiment of the present invention serves as an information processing apparatus (for example, a PC 1-1 in FIG. 1) that performs processing for editing information on contents. The information processing apparatus according to the embodiment of the present invention includes: an acquisition means (for example, ALM management unit 54 in FIG. 3) acquiring attribute data classification information in which a plurality of attribute data indicating predetermined attributes (for example, artists) of contents is correlated with category data indicating categories (for example, artist groups) for classifying the plurality of attributes; a selection means (for example, GUI control unit 51) selecting predetermined attribute data from the attribute data included in the attribute data classification information acquired by the acquisition means; and a correlation means (for example, ALM editing control unit 52 in FIG. 3) newly correlating the attribute data selected by the selection means with category data other than the category data, which is correlated in the attribute data classification information acquired by the acquisition means, in response to a user's instruction.

Figure 1:
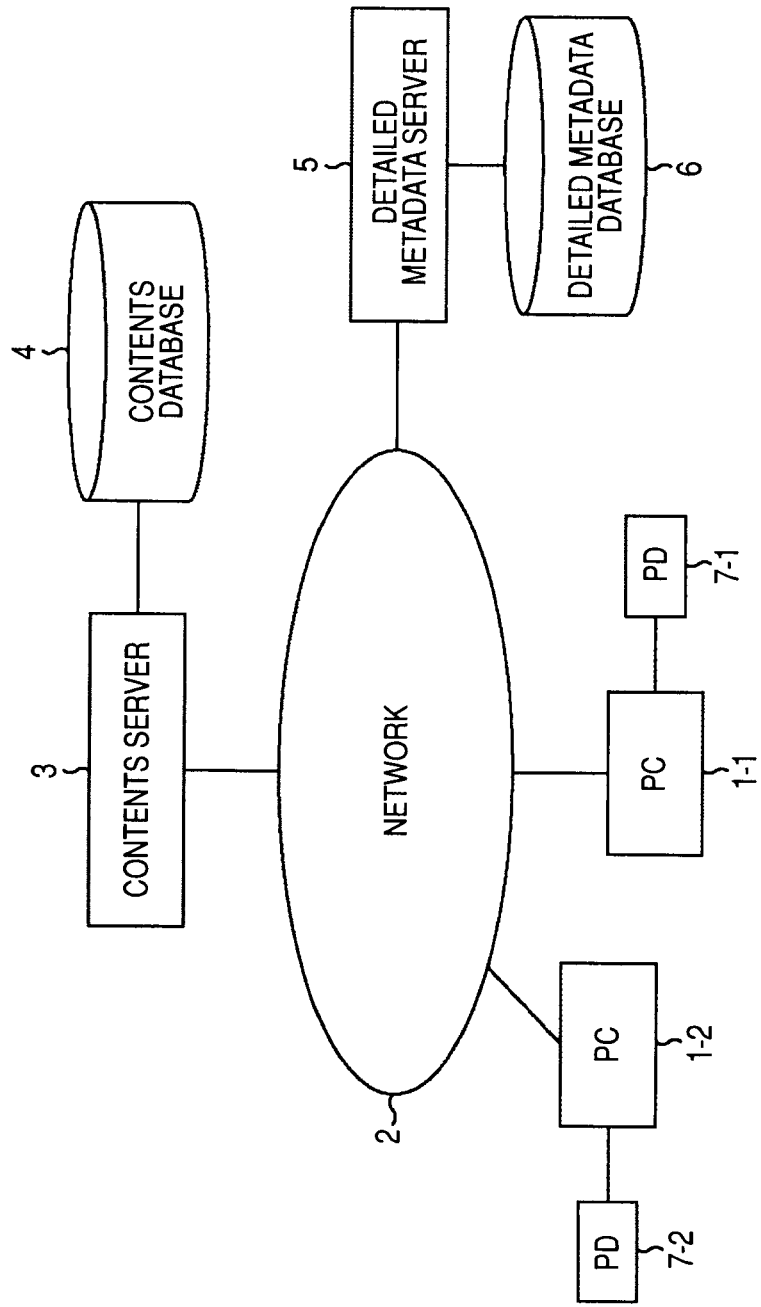
FIG. 1 is a view illustrating an example of the configuration of a contents providing system according to an embodiment of the present invention.

The acquisition means may acquire the attribute data classification information on contents stored in a predetermined storage means (for example, contents file storage unit 59 in FIG. 3), through a network (for example, network 2 in FIG. 1).

The correlation means may output, as a file (for example, XML file), attribute data classification information that is a result obtained by newly correlating the attribute data selected by the selection means with the other category data.

The information processing apparatus according to the embodiment of the present invention may further include a contents acquisition means (for example, data acquisition control unit 61 in FIG. 3) acquiring, when contents having the newly correlated attribute data are not stored in a predetermined storage means (for example, contents file storage unit 59 in FIG. 3), the contents having the attribute data through a network.

In addition, priorities (for example, order information in FIG. 5) may be granted to the attribute data correlated with the category data included in the attribute data classification information.

An information processing method or program according to another embodiment of the present invention is an information processing method or program of an information processing apparatus that performs processing for editing information on contents. The information processing method or program according to the embodiment of the present invention includes steps of: acquiring (for example, steps S6 and S7 in FIG. 8) attribute data classification information in which a plurality of attribute data indicating predetermined attributes of contents is correlated with category data indicating categories for classifying the plurality of attributes; selecting (for example, step S101 in FIG. 14) predetermined attribute data from attribute data included in the acquired attribute data classification information; and newly correlating (for example, step S102 in FIG. 14) the selected attribute data with category data other than the category data, which is correlated in the acquired attribute data classification information, in response to a user's instruction.

Hereinafter, embodiments of the present invention will be described with reference to the accompanying drawings.

FIG. 1 is a view illustrating an example of the configuration of a contents providing system according to an embodiment of the present invention.

Personal computers (PCs) 1-1 and 1-2 are connected to a network 2 represented as Internet. In the case when it is not necessary to specifically distinguish the PCs 1-1 and 1-2, the PCs 1-1 and 1-2 are simply referred to as a PC 1. Even though only two PCs 1 are shown in this example, an arbitrary number of PCs are connected to the network 2.

Further, a contents server 3 that provides contents, such as motion pictures or songs, to the PC 1 and a detailed metadata server 5 are connected to the network 2. An arbitrary number of contents servers 3 and an arbitrary number of detailed metadata servers 5 are connected to the network 2. Moreover, a case in which music contents are provided will be described in the example shown in FIG. 1.

The contents server 3 has contents database (DB) 4 that stores data of contents (hereinafter, referred to as contents data), such as songs, and metadata corresponding to the contents. For example, the metadata is configured to include a name of an album in which the contents are included, a name of an artist that plays or provides the contents, genre of the contents, tone, rhythm, or a value (parameter) of ranking of the contents in the market.

The contents server 3 authenticates a user, which is registered, in order to provide contents in response to access from the PC 1. Moreover, the contents server 3 transmits contents data and metadata of contents, which has been requested by the user, among various kinds of contents stored in the contents database 4, to the PC 1 that has authenticated the user through the network 2. In addition, contents data of various kinds of contents that contents providers recommend users to watch and listen may be provided.

The detailed metadata server 5 has contents detailed metadata database (DB) 6 in which detailed metadata of various contents commercially available is stored. Detailed metadata is configured to include contents ID (identification) that is an identifier of contents, metadata (for example, artist name and genre) added in contents data, category data indicating categories (for example, subgenre) for classifying similar contents, and the like.

The subgenre is information of genre considered to be closest to include the contents A, other than genre in metadata of the contents A. Contents included in genre P in metadata may be classified into a plurality of subgenres similar to the genre P. In other words, even though contents are classified to be included in only one genre in metadata, the contents may be classified to be included in a plurality of subgenres. That is, it can be said that contents classified into a subgenre are similar. For example, detailed metadata is configured to include a contents ID of contents, an artist name of the contents, a name of subgenre into which similar contents are classified, and the like.

The detailed metadata server 5 transmits detailed metadata, which corresponds to a contents ID of contents acquired in the PC 1, among detailed metadata stored in the detailed metadata database 6, through the network 2 in response to access from the PC 1.

The PC 1 accesses the contents server 3 by using client software, such as web browser, records contents data and metadata received from the contents server 3 or converts contents data read from a CD (compact disc) by using a predetermined encoding method (for example, ATRAC3plus™), and records the encoded contents data together with the metadata. The metadata is acquired from a CD or other metadata servers (not shown).

When the contents data and the metadata are recorded, the PC 1 accesses the detailed metadata server 5 in order to receive detailed metadata of corresponding contents from the detailed metadata server 5. Then, on the basis of the received detailed metadata, the PC 1 creates artist link information associated with artists of the contents and records the created artist link information. Then, in response to a user's operation, the PC 1 edits the artist link information that is recorded, creates a playlist in which the reproduction order of the contents is described, and reproduces the contents data that is recorded using the artist link information or the playlist.

Further, for example, portable devices (PDs) 7-1 and 7-2 serving as portable record and reproduction apparatuses are connected to the PCs 1-1 and 1-2 through USB (universal serial bus) cables, respectively, such that the portable devices (PDs) 7-1 and 7-2 can also be disconnected from the PCs 1-1 and 1-2. In the case when it is not necessary to specifically distinguish the PDs 7-1 and 7-2, the PDs 7-1 and 7-2 are simply referred to as a PD 7. The PC 1 transmits to the connected PD 7 the contents data and metadata that are recorded, the edited artist link information, the created playlist, and the like.

The PD 7 records various kinds of contents data, metadata thereof, the edited artist link information, the playlist, and the like from the PC 1 and then reproduces contents data using the recorded contents data, metadata, artist link information, playlist, and the like. In addition, by mounting a removable media 22 (refer to FIG. 2) in which various kinds of contents files are recorded beforehand, the PD 7 may reproduce contents data and the like recorded in the removable media 22.

In FIG. 1, a case has been described in which a contents file is acquired from the contents server 3 through the PC 1. However, without using the PC 1, the PD 7 may directly acquire data from the contents server 3 or the detailed metadata server 5 through direct connection with the network 2 or wireless communication.

Figure 2:
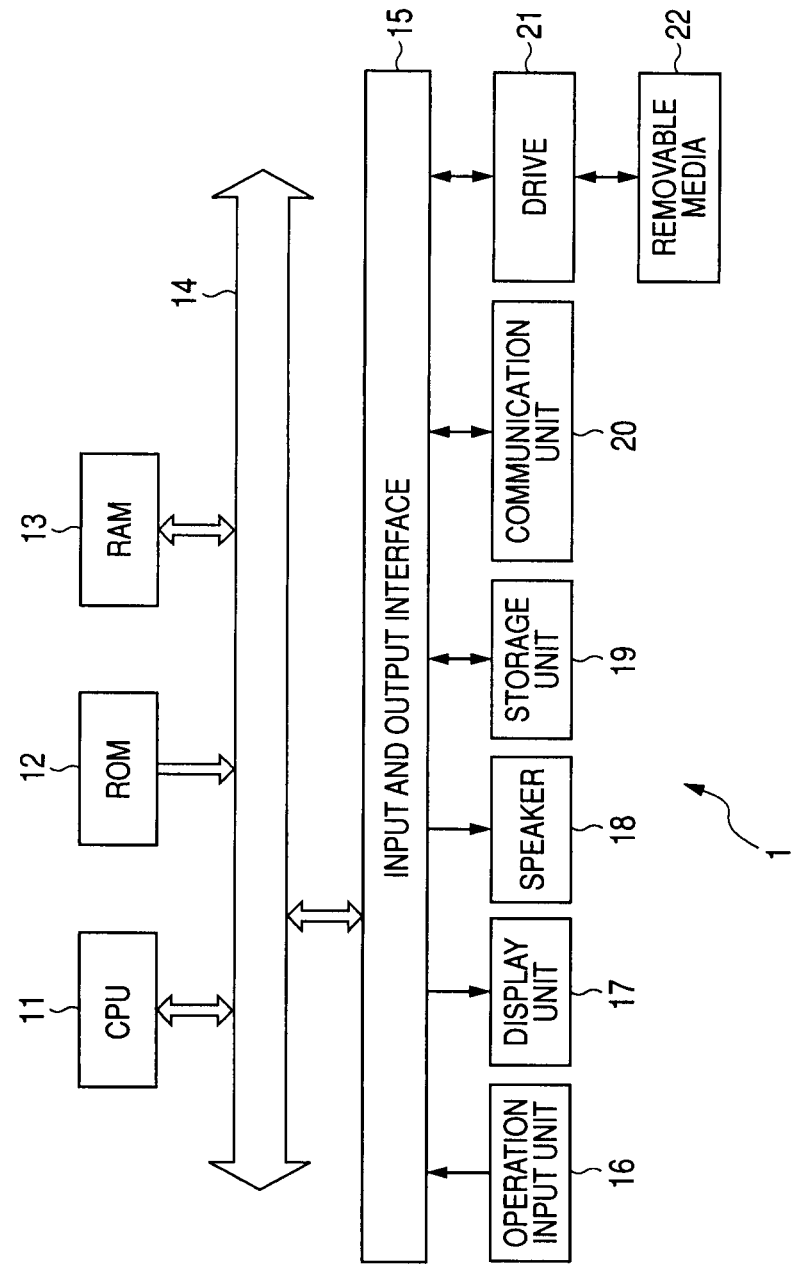
FIG. 2 is a block diagram illustrating an example of the hardware configuration of a PC shown in FIG. 1.

FIG. 2 is a view illustrating an example of the hardware configuration of the PC 1.

A CPU (central processing unit) 11 executes various kinds of processing according to a program stored in a ROM (read only memory) 12 or a program loaded from a storage unit 19 to a RAM (random access memory) 13. In addition, data that is required to execute various kinds of processing by the CPU 11 is also appropriately stored in the RAM 13.

The CPU 11, the ROM 12, and the RAM 13 are connected to one another through a bus 14. In addition, an input and output interface 15 is also connected to the bus 14.

Further, an operation input unit 16 such as a keyboard or a mouse, a display unit 17 serving as a display such as a CRT (cathode ray tube) or an LCD (liquid crystal display), a speaker 18, a storage unit 19 such as a hard disc, and a communication unit 20 such as a modem, a terminal adaptor, or a USB interface is connected to the input and output interface 15. The communication unit 20 performs communication processing through the network 2 or a USB cable.

Furthermore, a drive 21 is connected to the input and output interface 15 if needed. In this case, the removable media 22, such as a magnetic disc, an optical disc, a magneto-optic disc, or a semiconductor memory is appropriately mounted in the drive 21, and a computer program read from the removable media 22 is installed in the storage unit 19 as necessary.

Although not shown, the contents server 3, the detailed metadata server 5, and the PD 7 are also realized by using a computer having basically the same configuration as the PC 1 shown in FIG. 2. Then, in the following description, the configuration of FIG. 2 is cited as a configuration of the contents server 3, the detailed metadata server 5, and the PD 7.

Here, by causing the CPU 11 to execute various kinds of programs, the computer in FIG. 2 functions as the PC 1, the contents server 3, the detailed metadata server 5, or the PD 7 in FIG. 1. In this case, a program may be recorded beforehand in the ROM 12 or the storage unit 19 serving as a recording medium provided inside the computer in FIG. 2. Alternatively, a program may be stored (recorded) temporarily or permanently in the removable media 22, such as a magnetic disc, an optical disc, a magneto-optic disc, or a semiconductor memory. In other words, a program may be supplied as package software.

Moreover, in addition to installing a program obtained from the removable media 22 in the computer shown in FIG. 2, the program may be installed by wirelessly transmitting the program from a download site to the computer shown in FIG. 2 through a satellite for digital satellite broadcasting or wire line-transmitting the program to the computer shown in FIG. 2 through a LAN (local area network) and the network 2.

Figure 3:
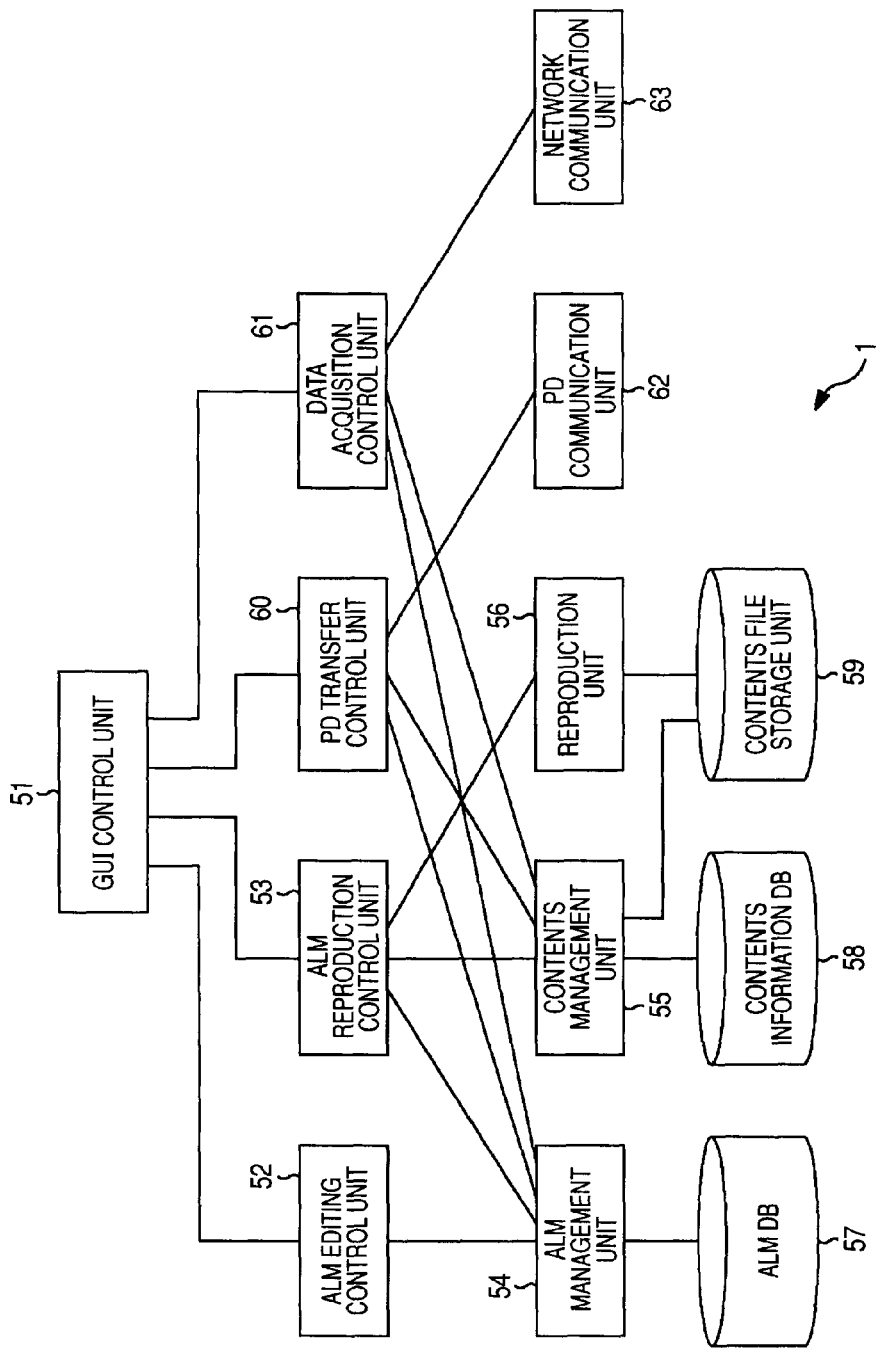
FIG. 3 is a block diagram illustrating an example of the functional configuration of the PC shown in FIG. 1.

FIG. 3 is a block diagram illustrating an example of the functional configuration of the PC 1. The functional block shown in FIG. 3 is realized by causing the CPU 11 of the PC 1 to execute a predetermined program for registering music contents and selecting the registered contents to watch and listen to the registered contents, for example.

The functional block shown in FIG. 3 is configured to include a GUI (graphical user interface) control unit 51, an ALM (artist link map) editing control unit 52, an ALM (artist link map) reproduction control unit 53, an ALM (artist link map) management unit 54, a contents management unit 55, a reproduction unit 56, an ALM (artist link map) database (DB) 57, a contents information database (DB) 58, a contents file storage unit 59, a PD (portable device) transfer control unit 60, a data acquisition control unit 61, a PD (portable device) communication unit 62, and a network communication unit 63.

The GUI control unit 51 makes a control such that a user's operation is input through the operation input unit 16, an operation signal corresponding to the operation is supplied to the ALM editing control unit 52, the ALM reproduction control unit 53, the PD transfer control unit 60, or the data acquisition control unit 61, or a GUI image (screen) is created on the basis of information of the ALM database 57 or contents information database 58 from the ALM editing control unit 52, the ALM reproduction control unit 53, and the PD transfer control unit 60, and the created GUI image or an image corresponding to screen data supplied from the contents server 3 through the data acquisition control unit 61 is displayed on a monitor serving as the display unit 17.

The ALM editing control unit 52 performs editing, such as addition or deletion, on artist link information that is managed in the ALM database 57 by the ALM management unit 54, in response to the operation signal from the GUI control unit 51. The ALM reproduction control unit 53 controls the contents management unit 55 and the reproduction unit 56 in response to the operation signal from the GUI control unit 51, and performs shuffle reproduction (hereinafter, referred to as 'artist link map (ALM) reproduction'), which is random reproduction, by using the artist link information managed by the ALM management unit 54. In addition, in the PC 1, ordinary reproduction in which contents are reproduced corresponding to a user's instruction may be performed in addition to the artist link map reproduction.

The ALM management unit 54 creates the artist link information on the basis of detailed metadata supplied from the data acquisition control unit 61 and registers the created artist link information in the ALM database 57. As described above, since the detailed metadata is configured to include a contents ID of contents, an artist name of the contents, a name of subgenre into which similar contents are classified, and the like, matching between an artist name of contents and a subgenre of the contents are acquired from the detailed metadata. Then, the ALM management unit 54 considers that artists classified into the same subgenre (artists belonging to the same subgenre) are associated, and creates artist link information obtained by associating an artist group with the artists in a state in which the subgenre is an artist group and names of the artists (of contents) classified into the subgenre are included in the artist group.

That is, the artist link information is information that associates artists belonging to the same artist group and may also be edited. For example, in cases when an artist A is currently a member of an artist B (group), was a member of an artist B (group) in the past, inherits a lineage of an artist C, and provides a song to an artist D, the artists A, B, C, and D are considered to be associated. Accordingly, it is possible to cause the artists A, B, C, and D to belong to the same artist group by creating a predetermined artist group.

Further, the ALM management unit 54 reflects editing of artist link information, which is performed by the ALM editing control unit 52, in the ALM database 57 or creates a list of associated artists, which are associated with a basing-point artist to be targeted, under the control of the ALM reproduction control unit 53 or the PD transfer control unit 60, and notifies the created list of associated artists.

The contents management unit 55 causes the contents data from the data acquisition control unit 61 to be stored in the contents file storage unit 59 and the metadata from the data acquisition control unit 61 to be registered in the contents information database 58. In addition, the contents management unit 55 calculates a list of contents of associated artists under the control of the ALM reproduction control unit 53 or the PD transfer control unit 60 and notifies the calculated list of contents. The reproduction unit 56 read and reproduces a contents file from the contents file storage unit 59 under the control of the ALM reproduction control unit 53, and causes the reproduced contents (song) to be output from the speaker 18.

The ALM database 57, the contents information database 58, and the contents file storage unit 59 are included in the storage unit 19 shown in FIG. 2, for example.

The artist link information managed by the ALM management unit 54 is stored in the ALM database 57. The artist link information stored in the ALM database 57 is created on the basis of detailed metadata acquired from the detailed metadata server 5 corresponding to artists of contents. In addition, the artist link information stored in the ALM database 57 may be edited (for example, added or deleted) corresponding to a user's operation.

Information (contents information) on contents managed by the contents management unit 55 is stored in the contents information database 58. Corresponding to a contents ID, the contents information database 58 stores information including a contents name, a contents file name, history of a number of reproduction times, history of transfer to a PD, and the like. In addition, playlist information (information including a playlist name and a contents ID belonging to the playlist) created on the basis of a user's operation is also stored in the contents information database 58.

The contents data managed by the contents management unit 55 is stored as a contents file, which is managed in the contents information database 58, in the contents file storage unit 59.

In response to an operation signal from the GUI control unit 51, the PD transfer control unit 60 causes data (for example, contents data, metadata, edited artist link information, playlist in which a reproduction order is described, and the like) whose transfer has been instructed to be output to the ALM management unit 54 or the contents management unit 55, and then controls the PD communication unit 62 to transmit the data whose transfer has been instructed to the PD 7.

The data acquisition control unit 61 controls the network communication unit 63 in response to an operation signal from the GUI control unit 51, for example, so as to access the contents server 3 and the detailed metadata server 5. The data acquisition control unit 61 supplies screen data, which is supplied from the contents server 3, to the GUI control unit 51 or supplies to the contents management unit 55 the contents data and the metadata acquired from the contents server 3, and the supplies the detailed metadata acquired from the detailed metadata server 5 to the ALM management unit 54. In addition, it is also possible to supply the detailed metadata to the contents management unit 55 and record the detailed metadata, as one of metadata, in the contents information database 58 so as to corresponding to a contents ID.

The PD communication unit 62 transmits data, which is supplied from the PD transfer control unit 60, to the PD 7 through the communication unit 20 and a USB cable (not shown). The network communication unit 63 accesses the contents server 3 or the detailed metadata server 5 through the communication unit 20 and the network 2 and then supplies to the data acquisition control unit 61 screen data or contents data and metadata supplied from the contents server 3 and detailed metadata supplied from the detailed metadata server 5.

Figure 4:
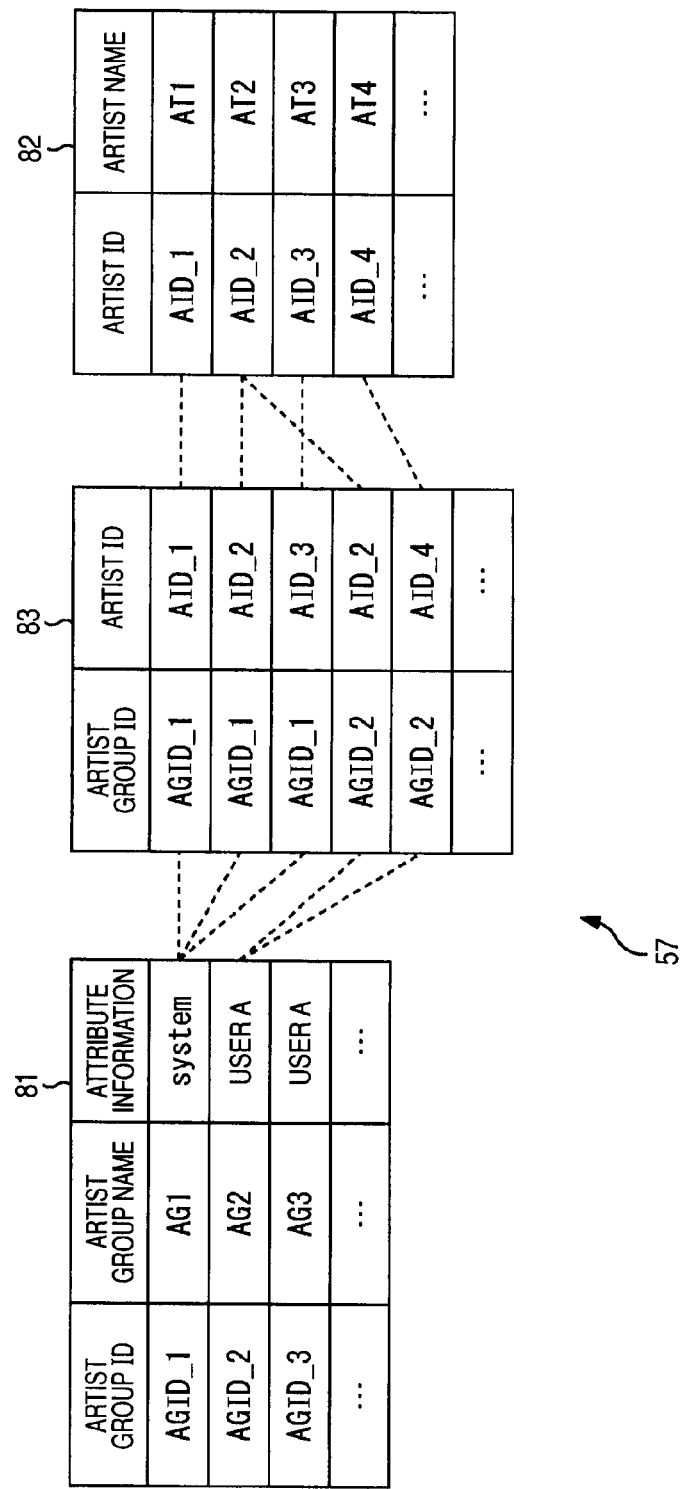
FIG. 4 is a view illustrating an example of the configuration of ALM database shown in FIG. 3.

FIG. 4 is a view illustrating an example of the detailed configuration of the ALM database 57.

In the example shown in FIG. 4, the ALM database 57 is configured to include an artist group (AG) list table 81, an artist list table 82, and an artist link correspondence table 83.

The artist group list table 81 includes an artist group ID (identification), an artist group name, and attribution information. An artist group name is a name indicating a category in which artists classified to be associated with one another are included. The artist group name may be freely changed by a user or a new artist group name may be added by the user. However, when the artist group name is created on the basis of detailed metadata, a subgenre name is registered as an artist group name.

Attribution information indicates who has created the artist group. For example, a user A indicates being created by a user of the PC 1, and a 'system' indicates being created by the ALM management unit 54 on the basis of detailed metadata. The attribution information is utilized at the time of artist link map reproduction to be described later, for example.

The artist group list table 81 shown in FIG. 4 stores that an artist group ID of an artist group name 'AG1' is 'AGID_1' and attribution information is 'system', an artist group ID of an artist group name 'AG2' is 'AGID_2' and attribution information is 'userA', and an artist group ID of an artist group name 'AG3' is 'AGID_3' and attribution information is 'userA'. That is, in the artist group list table 81, artist group IDs and artist group names are stored to correspond to each other. Moreover, the artist group 'AG1' is created by the ALM management unit 54, and the artist groups 'AG2' and 'AG3' are created by the user of the PC 1.

The artist list table 82 includes an artist ID (identification) and an artist name. In the artist list table 82 shown in FIG. 4, artist IDs and artist names are stored to correspond to each other such that an artist group ID of an artist name 'AT1' is 'AID_1', an artist group ID of an artist name 'AT2' is 'AID_2', and an artist group ID of an artist name 'AT3' is 'AID_3'.

The artist link correspondence table 83 includes an artist group ID and an artist ID. In the artist link correspondence table 83 shown in FIG. 4, artist group IDs and artist IDs are described to correspond to each other such that an artist ID 'AID_1', an artist ID 'AID_2', and an artist ID 'AID_3' are included in an artist group ID 'AGID_1' and an artist ID 'AID_2' and an artist ID 'AID_4' are included in an artist group ID 'AGID_2'.

That is, in the artist link correspondence table 83, one artist group ID may include a plurality of artist IDs, and a plurality of artist group IDs may include the same artist ID.

As mentioned above, it can be seen that the artist AT1 of the artist ID 'AID_1', the artist AT2 of the artist ID 'AID_2', and the artist AT3 of the artist ID 'AID_3' are included in the artist group AG1 of the artist group ID 'AGID_1' by referring to the artist link information including the artist group list table 81, the artist list table 82, and the artist link correspondence table 83. In addition, it can be seen that the artist AT2 of the artist ID 'AID_2' and the artist AT4 of the artist ID 'AID_4' are included in the artist group AG2 of the artist group ID 'AGID_2'.

That is, in this artist link information, the artist AT1 of the artist ID 'AID_1', the artist AT2 of the artist ID 'AID_2', and the artist AT3 of the artist ID 'AID_3' are associated with one another, and the artist AT2 of the artist ID 'AID_2' and the artist AT4 of the artist ID 'AID_4' are associated with each other.

In addition, in the case of an artist registered in the ALM database 57, contents corresponding to the contents information database 58 may not be registered.

FIG. 5 is a view illustrating an example of a more detailed configuration of the artist link correspondence table 83. In the example shown in FIG. 5, the artist link correspondence table 83 also has order information and attribution information in addition to the artist group ID and artist ID shown in FIG. 4.

The order information indicates priorities referred, for example, when transmitting artist link information to the PD 7 that has limitation in data storage capacity as compared with the PC 1 or when displaying artists included in an artist group on the display unit 17 side by side and may be changed by a user's operation. For example, information on only artists, which correspond to top 20 priorities, among artists included in the artist group is transmitted to the PD 7.

The attribution information of the artist link correspondence table 83 indicates who has added an artist in an artist group. As described above, the user A indicates being created by the user of the PC 1, and the 'system' indicates being created by the ALM management unit 54 on the basis of detailed metadata. In addition, a user B indicates being created by a user of another PC 1. The attribution information is referred for an initial value of the order information.

That is, in order to give priority to a user's request over detailed metadata, the initial value of the order information is set as 'user A (self)>user B (friend)>system' on the basis of attribution information, such that a case being created by a user is set to be highly prioritized.

In the artist link correspondence table 83 shown in FIG. 5, order information '1' and attribution information 'user A' are stored corresponding to the artist AT1, of which artist ID is 'AID_1', included in the artist group 'AG1' whose artist group ID is 'AGID_1'. In addition, order information '2' and attribution information 'user B' are stored corresponding to the artist AT2, of which artist ID is 'AID_2', included in the artist group 'AG1' whose artist group ID is 'AGID_1'. In addition, order information '3' and attribution information 'system' are stored corresponding to the artist AT3, of which artist ID is 'AID_3', included in the artist group 'AG1' whose artist group ID is 'AGID_1'.

That is, it can be seen that among artists included in the artist group AG1 whose artist group ID is 'AGID_1', a priority of the artist AT1 whose artist ID is 'AID_1' is set to be highest and a priority of the artist AT3 whose artist ID is 'AID_3' is set to be lowest. Furthermore, it can be seen that artist link information that the artist AT1 is included in the artist group AG1 is created by the user A, artist link information that the artist AT2 is included in the artist group AG1 is created by the user B, and artist link information that the artist AT3 is included in the artist group AG1 is created by the 'system'.

Here, a case of the artist group AG1 will be specifically described referring also to attribute information of the artist group list table 81 shown in FIG. 4. For example, the artist group AG1 and artist link information that the artist AT3 is included in the artist group AG1 are created by the ALM management unit 54 based on detailed metadata, and then artist link information that information that the artist AT1 is included in the artist group AG1 is added by editing of a user of the PC 1. Then, as will be described in detail later, a file in which artist link information of a user of another PC 1 is described is loaded, and artist link information that the artist AT2 is included in the artist group AG1 is added by merging the information.

Further, in the artist link correspondence table 83, order information '2' and attribution information 'userA' are stored corresponding to the artist AT2, of which artist ID is 'AID_2', included in the artist group 'AG2' whose artist group ID is 'AGID_2'. In addition, order information '1' and attribution information 'user A' are stored corresponding to the artist AT4, of which artist ID is 'AID_4', included in the artist group 'AG2' whose artist group ID is 'AGID_2'.

That is, it can be seen that among artists included in the artist group AG2 whose artist group ID is 'AGID_2', a priority of the artist AT4 whose artist ID is 'AID_4' is set to be highest and a priority of the artist AT2 whose artist ID is 'AID_2' is set to be lowest. Moreover, it can be seen that the artist link information that the artist AT2 is included in the artist group AG2 is created by the user A and the artist link information that the artist AT4 is included in the artist group AG2 is also created by the user A.

Figure 6:
FIG. 6 is a view illustrating an example of the configuration of contents information database shown in FIG. 3.

FIG. 6 is a view illustrating an example of contents information table stored in the contents information database 58.

A contents information table includes a contents ID used to identify contents (song), a contents name, a name of an album in which contents are included, an artist name of an artist who is a player or provider of the contents, a name of genre to which the contents belong, a contents file name of contents, and information on attribute of contents, such as a reproduced flag used at the time of artist link map reproduction. Details of the reproduced flag will be described later with reference to FIG. 30. A reproduced flag of contents, whose reproduction is selected during artist link map reproduction, is set to '1'.

For example, the contents information table shown in FIG. 6 is stored with contents information that a contents name of contents whose contents ID is 'TID_1' is 'Song1', an album name is 'Album1', an artist name is 'artist AT1', a genre name is 'Pops', a contents file name is 'Song1.oma', and a reproduced flag is '0'.

Further, the contents information table shown in FIG. 6 is stored with contents information that a contents name of contents whose contents ID is 'TID_2' is 'Song2', an album name is 'Album1', an artist name is 'artist AT1', a genre name is 'Pops', a contents file name is 'Song2.oma', and a reproduced flag is '0'. Furthermore, the contents information table shown in FIG. 6 is stored with contents information that a contents name of contents whose contents ID is 'TID_3' is 'Song3', an album name is 'Album2', an artist name is 'artist AT2', a genre name is 'Rock', a contents file name is 'Song3.oma', and a reproduced flag is '0'.

In addition, although not shown in the example of FIG. 6, information including speed of contents, tone, rhythm, date (release date), ranking information, history of a number of reproduction times, history of transfer to PDs, and playlist such as a playlist name is also stored corresponding to the contents ID in the contents information database 58, as described above. As ranking information, for example, there are sales ranking of the contents in a market, watch and listening ranking of users that uses the contents server 3, and the like.

Moreover, in the case when contents are image contents, for example, a program name, a title of a movie, date (release date), and the like are included in the contents information database 58. In addition, an evaluation value, which is created on the basis of a user's operation of the operation input unit 16, corresponding to rating (evaluation) of the contents may also be recorded as contents metadata in the contents information database 58. In addition, creation of an evaluation value may be performed after watching and listening to contents or before watching and listening to the contents.

Figure 7:
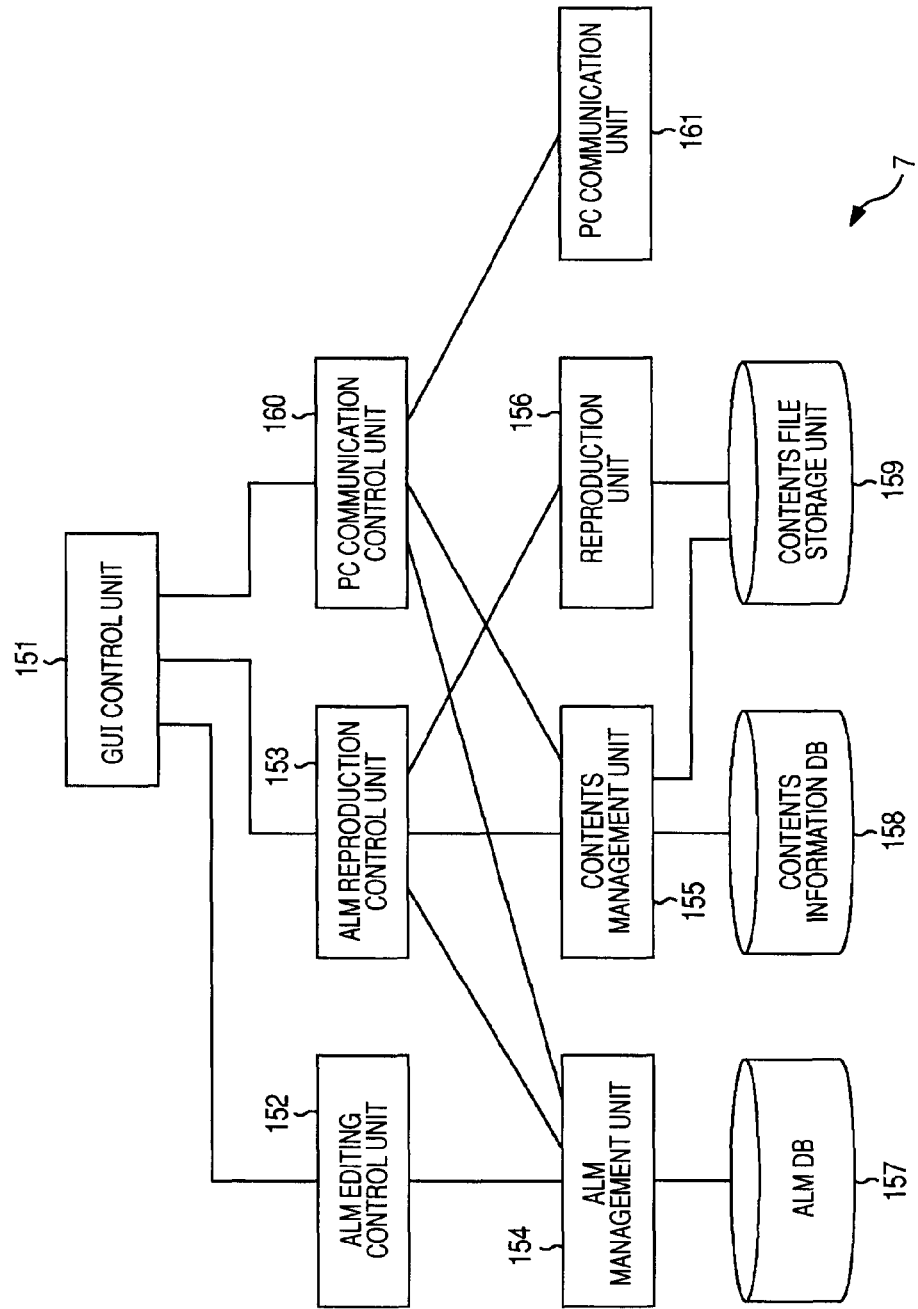
FIG. 7 is a block diagram illustrating an example of the functional configuration of a PD shown in FIG. 1.

FIG. 7 is a block diagram illustrating an example of the functional configuration of the PD 7. The functional block shown in FIG. 7 is realized by causing the CPU 11 of the PD 7 to execute a predetermined program.

The functional block shown in FIG. 7 is configured to include a GUI control unit 151, an ALM editing control unit 152, an ALM reproduction control unit 153, an ALM management unit 154, a contents management unit 155, a reproduction unit 156, an ALM database (DB) 157, a contents information database (DB) 158, a contents file storage unit 159, a PC (personal computer) communication control unit 160, and a PC communication unit 161. Moreover, the configuration of the GUI control unit 151 to the contents file storage unit 159 shown in FIG. 7 is basically equal to that of the GUI control unit 51 to the contents file storage unit 59 shown in FIG. 3, and accordingly, explanation thereof will be omitted.

The PC communication control unit 160 supplies, to the corresponding ALM management unit 154 and contents management unit 155, data (that is, data whose transfer has been instructed by the user of the PC 1, such as contents data, metadata, edited artist link information, playlist in which reproduction orders of contents is described) supplied from the PC communication unit 161.

For example, the PC communication control unit 160 supplies data, such as contents data, metadata, or playlist, to the contents management unit 155 and supplies the artist link information edited by the PC 1 to the ALM management unit 154. In addition, when detailed metadata (subgenre) is transmitted together with the metadata, the detailed metadata (subgenre) is supplied to the ALM management unit 154.

The ALM management unit 154 causes the artist link information edited by the PC 1 to be reflected in the ALM database 157. In addition, in the case when detailed metadata is transmitted without artist link information, the ALM management unit 154 creates artist link information on the basis of the detailed metadata and registers the created artist link information in the ALM database 157, in the same manner as the ALM management unit 54. Further, in the same manner as the ALM management unit 54, the ALM management unit 154 also reflects editing of artist link information, which is performed by the ALM editing control unit 152, in the ALM database 157 or searches a list of associated artists, which are associated with a basing-point artist to be targeted, under the control of the ALM reproduction control unit 153, and notifies a result of the search.

Figure 8:
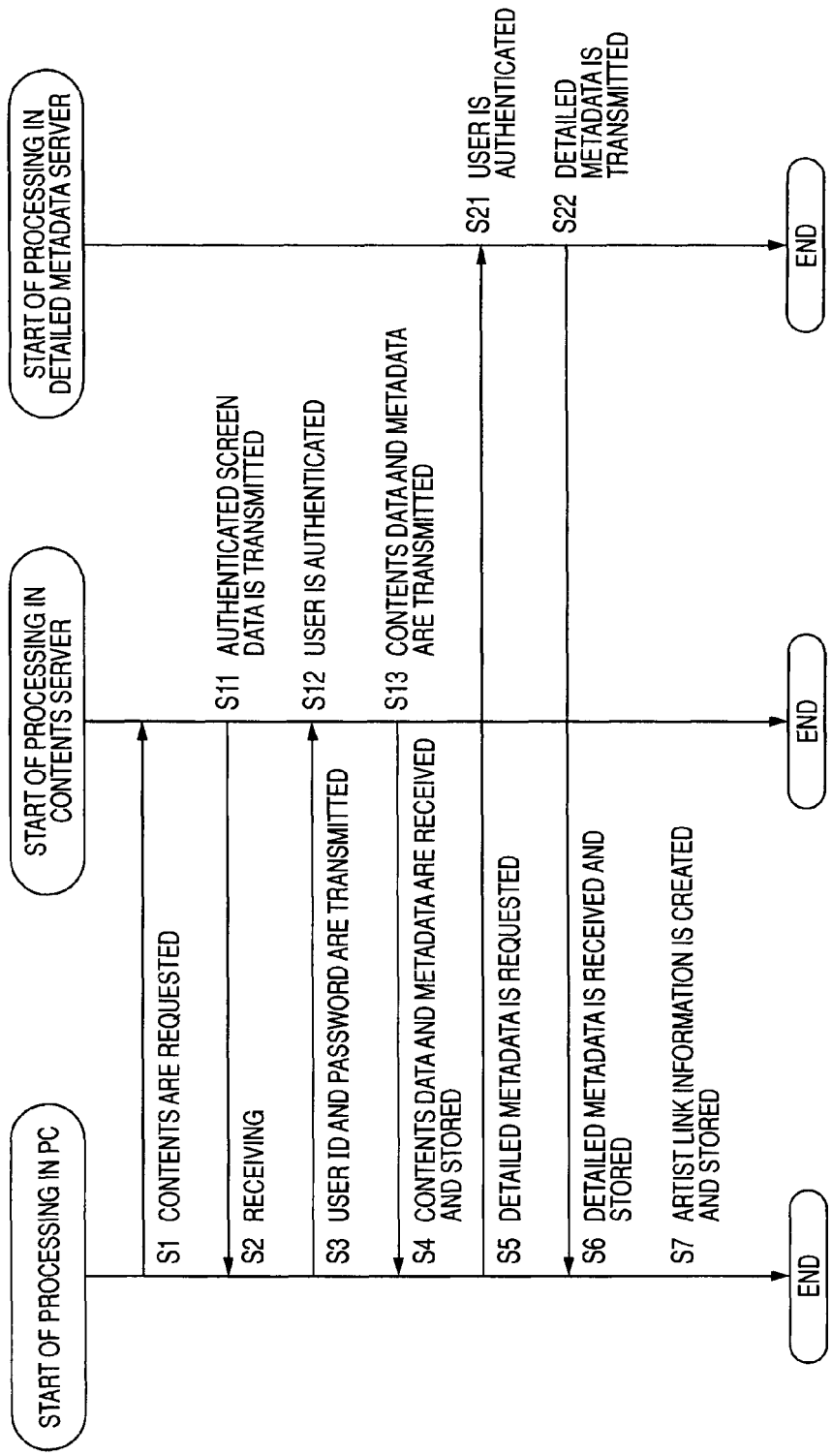
FIG. 8 is a flow chart explaining an example of processing in the contents providing system shown in FIG. 1.

Next, referring to a flow chart in FIG. 8, an example of processing in the contents providing system shown in FIG. 1 will be described in which the PC 1 acquires a contents file from the contents server 3, acquires detailed metadata from the detailed metadata server 5, and creates artist link information.

For example, a list of contents is displayed on the display unit 17. A user requests to access the contents server 3 by instructing desired contents using a mouse, which is an example of the operation input unit 16 of the PC 1.

The GUI control unit 51 of the PC 1 is input with a user's operation through the operation input unit 16 and supplies an operation signal corresponding to the operation to the data acquisition control unit 61.

In step S1, the data acquisition control unit 61 controls the network communication unit 63 in response to the operation signal from the GUI control unit 51 so as to access the contents server 3, thereby requesting the contents that the user desires. The network communication unit 63 accesses the contents server 3 through the communication unit 20 and the network 2 so as to request the contents that the user desires.

In step S11, when the communication unit 20 of the contents server 3 receives access request from the PC 1, the communication unit 20 of the contents server 3 transmits authentication screen data for requesting user ID (identification) and password registered beforehand, which are required to use a contents providing system, through a network 2 under the control of the CPU 11.

In step S2, the network communication unit 63 of the PC 1 receives the authentication screen data from the contents server 3 through the communication unit 20 and the network 2 and supplies the received authentication screen data to the GUI control unit 51 through the data acquisition control unit 61. The GUI control unit 51 causes an authentication screen, which corresponds to the authentication screen data from the data acquisition control unit 61, to be displayed on the display unit 17. In response to the authentication screen displayed on the display unit 17, the user inputs a user ID and a password using a mouse which is an example of the operation input unit 16.

When the user's operation is input to the GUI control unit 51 through the operation input unit 16, the GUI control unit 51 supplies the input user ID and password to the data acquisition control unit 61. In step S3, the data acquisition control unit 61 controls the network communication unit 63 to transmit to the contents server 3 the user ID and password from the GUI control unit 51. The network communication unit 63 transmits the user ID and password to the contents server 3 through the communication unit 20 and the network 2.

The communication unit 20 of the contents server 3 receives the user ID and password from the PC 1 and supplies the received user ID and password to the CPU 11. In step S12, the CPU 11 authenticates the user of the PC 1 on the basis of the user ID and password that the communication unit 20 has received, proceeding to step S13. In step S13, the CPU 11 reads contents data and metadata of contents, which the user desires, among various kinds of contents stored in the contents database 4 and then controls the communication unit 20 to transmit the read contents data and metadata through the network 2.

In step S4, the network communication unit 63 of the PC 1 receives the contents data and metadata from the contents server 3 through the communication unit 20 and the network 2, supplies the received contents data and metadata to the contents management unit 55 through the data acquisition control unit 61, and causes the received contents data and metadata to be stored in the contents file storage unit 59 and the contents information database 58. That is, the contents management unit 55 causes the contents data to be stored as a file in the contents file storage unit 59 and causes a contents ID, a stored contents file name, the metadata, and the like to be registered as contents information in the contents information database 58. Here, information on the contents registered in the contents information database 58 is displayed as library on a screen, as will be described later with reference to FIG. 22.

In step S5, the data acquisition control unit 61 controls the network communication unit 63 to access the detailed metadata server 5, thereby requesting detailed metadata of the contents acquired from the contents server 3. The network communication unit 63 accesses the detailed metadata server 5 through the communication unit 20 and the network 2 and requests a contents ID of the contents stored in the PC 1.

In step S21, when access request from the PC 1 is received by the communication unit 20 of the detailed metadata server 5, the CPU 11 authenticates the user. A user registration is performed when utilizing the detailed metadata server 5 for the first time. In the case when the user of the PC 1 is a registered user, the CPU 11 authenticates the user of the PC 1, proceeding to step S22. In step S22, the CPU 11 reads detailed metadata corresponding to the contents ID, which the user desires, among various kinds of detailed metadata of contents stored in the detailed metadata database 6 and then controls the communication unit 20 to transmit the read detailed metadata through the network 2. In addition, in the case when the user of the PC 1 is not a registered user, a process of requesting registration of the user of the PC 1 is performed.

In step S6, the network communication unit 63 of the PC 1 receives the detailed metadata from the detailed metadata server 5 through the communication unit 20 and the network 2 and supplies the received detailed metadata to the data acquisition control unit 61. The data acquisition control unit 61 controls the contents management unit 55 such that the detailed metadata is stored in the contents information database 58 in a state in which the detailed metadata is associated with the contents, and supplies the detailed metadata to the ALM management unit 54.

In step S7, the ALM management unit 54 creates artist link information on the basis of the detailed metadata supplied from the detailed metadata server 5 and registers the created artist link information in the ALM database 57.

For example, the detailed metadata is configured to include a contents ID of contents, subgenre information, an artist name, and the like. In addition, the detailed metadata may be obtained by more specifically classifying other metadata (for example, 'Tempo' indicating the speed (Bpm) of contents, 'Major' indicating whether tone of contents is a major key or a minor key, 'RhythmRatio (ratio of rhythm)' indicating whether the rhythm of contents is percussive or quiet, 'HiMid (high register)' indicating whether the register of contents is upper register (Hi) or a low register (Low), 'date' indicating a year in which the contents are released (sold), or 'Ranking (ranking)' indicating the watch and listening ranking of users), without being limited to genre. Furthermore, analysis data in which contents are analyzed may also be provided. The analysis data is data in which the speed (tempo) of contents, the tone (major or minor) of the whole contents, the rhythm (ratio of percussion instruments) of contents, and the like are analyzed.

The ALM management unit 54 registers an artist group, which is set as the subgenre, in the artist group list table 81 such that the artist group corresponds to an artist group ID, registers artists of contents in the artist list table 82 such that the artists of the contents correspond to artist IDs, and registers each ID in the artist link correspondence table 83 such that names of artists classified into the subgenre are included in the artist group serving as subgenre.

Furthermore, in the case when subgenre is already registered as an artist group, an artist of the contents classified into the subgenre is added in the artist group that has been already registered.

As described above, in the PC 1, the artist link information is created on the basis of the detailed metadata acquired from the detailed metadata server 5, and the created artist link information is stored in the ALM database 57.

Even though it has been described about the case in which the PC 1 acquires detailed metadata when contents data has been acquired, it may be possible to search the contents information database 58 at the time of starting or every predetermined time and to acquire detailed metadata that has not been acquired.

Figure 9:
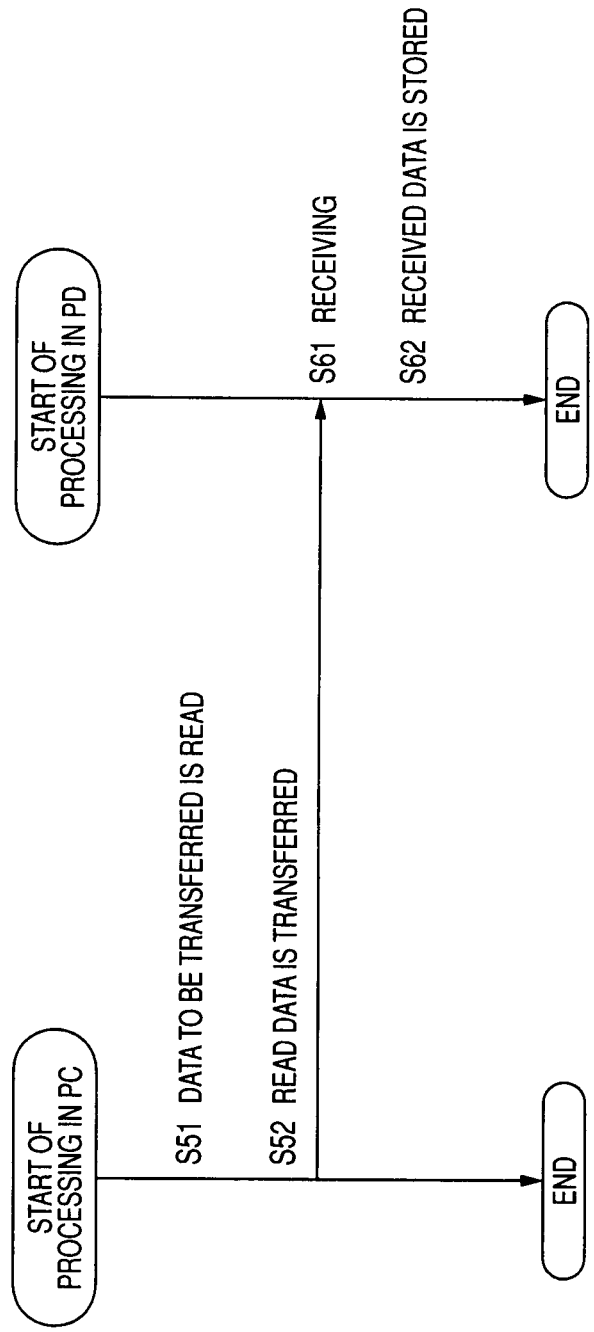
FIG. 9 is a flow chart explaining another example of processing in the contents providing system shown in FIG. 1.

Next, referring to a flow chart in FIG. 9, an example of processing in the contents providing system shown in FIG. 1 will be described in which data is transferred from the PC 1 to the PD 7.

The PD 7 is connected to the PC 1 through a USB cable (not shown) and, for example, a list of contents stored in the PC 1 is displayed on the display unit 17 of the PC 1. A user selects contents to be transferred to the PD 7 using a mouse, which is an example of the operation input unit 16 of the PC 1.

The GUI control unit 51 of the PC 1 is input with a user's operation through the operation input unit 16 and supplies an operation signal corresponding to the operation to the PD transfer control unit 60. In step S51, the PD transfer control unit 60 controls the contents management unit 55 and the ALM management unit 54, such that data on contents that the user desires to transfer is read from the ALM database 57, the contents information database 58, and the contents file storage unit 59 in correspondence with the operation signal from the GUI control unit 51.

That is, the PD transfer control unit 60 controls the contents management unit 55 to read data on contents that the user desires. The contents management unit 55 reads contents information (for example, metadata) that the user desires referring to the contents information database 58, supplies metadata to the PD transfer control unit 60, reads a contents file stored in the contents file storage unit 59 from a contents file name included in the metadata, and supplies the data (contents data) to the PD transfer control unit 60.

For example, in the case of transferring contents together with playlist, it is possible to check completion of transfer of contents data, which has been completely transferred, by checking PD transfer history of the contents information database 58. Accordingly, in this case, only contents that have been read and playlist are transferred but the contents data is not read.

In addition, the PD transfer control unit 60 controls the ALM management unit 54 to read, from the ALM database 57, artist link information corresponding to an artist name of contents, which the user desires, read from the contents management unit 55. The ALM management unit 54 reads an artist ID of an artist name of contents, which the user desires, and an artist group ID corresponding to the artist ID referring to the artist list table 82 and the artist link correspondence table 83, reads an artist group name corresponding to the artist group ID from the artist group list table 81, and supplies the read artist link information to the PD transfer control unit 60.

In step S52, the PD transfer control unit 60 causes data (contents data, metadata, and artist link information) on the contents read from the contents management unit 55 or the ALM management unit 54 to be transmitted to the PD communication unit 62. That is, the PD communication unit 62 transmits the data on contents, which the user desires to transfer, to the PD 7 through the communication unit 20 and a USB cable (not shown).

In step S61, the PC communication unit 161 of the PD 7 receives the data on the contents from the PC 1 through the USB cable and the communication unit 20 and supplies the received data to the PC communication control unit 160. Then, in step S62, the PC communication control unit 160 controls the contents management unit 155 to cause the contents data and the metadata to be stored in the contents file storage unit 159 and the contents information database 158, respectively, and also controls the ALM management unit 154 to cause the artist link information to be stored in the ALM database 157.

That is, the contents management unit 155 causes the contents data to be stored as a file in the contents file storage unit 159 and causes a contents ID, a stored contents file name, the metadata, and the like to be registered as contents information in the contents information database 158. The ALM management unit 154 registers the artist link information from the PC 1 in the ALM database 157. Further, in the case when an existing artist group exists, a process of merging artist link information is performed even in the PD 7, as will be described later with reference to FIGS. 19 and 20.

As described above, even in the PD 7, the artist link information is stored in the ALM database 157. Therefore, artist link information editing processing or artist link map reproduction processing in the PC 1, which will be described later, are similarly performed even in the PD 7.

Next, a process of editing artist link information stored in the ALM database 57 will be described.

Figure 10:
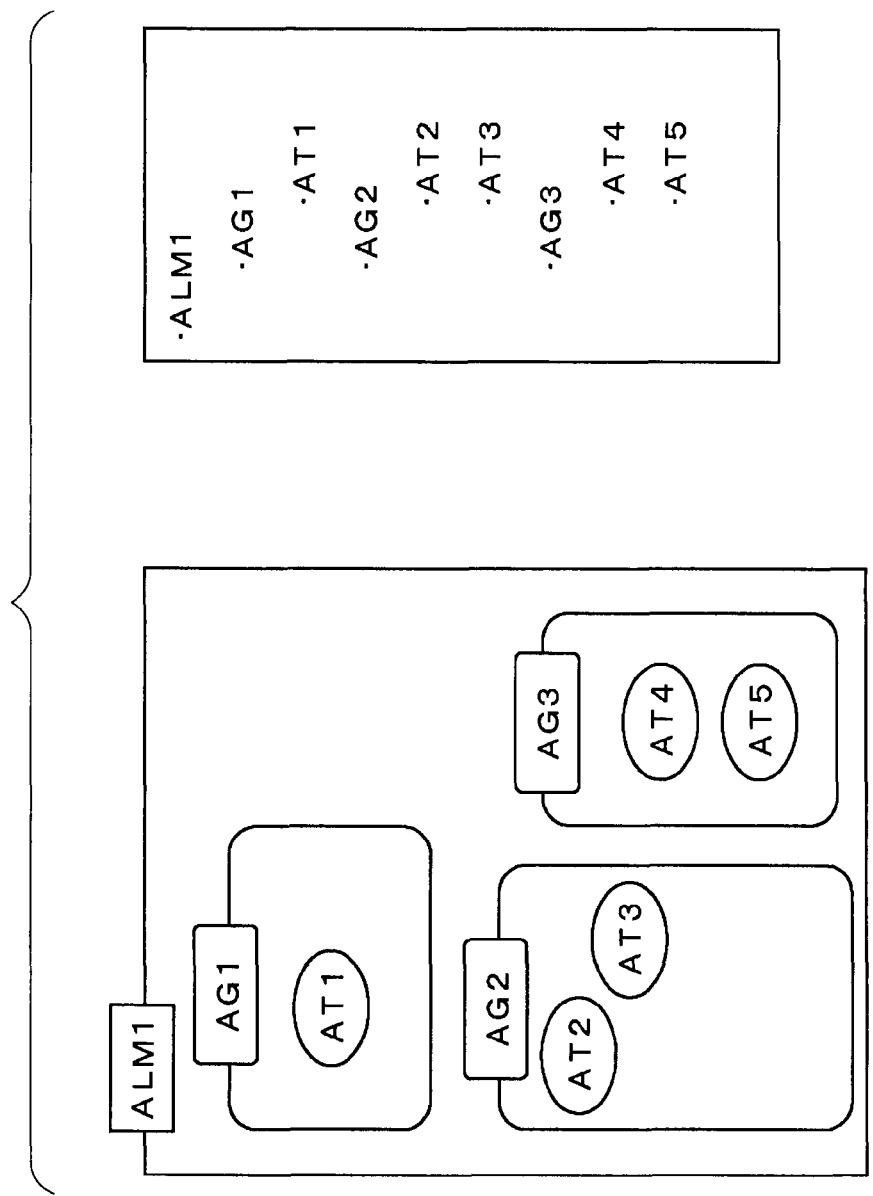
FIG. 10 is a view conceptually illustrating an example of the configuration of artist link information.

In an example shown in FIG. 10, a conceptual diagram that conceptually illustrates the configuration of artist link information and a list display illustrated in the form of a list are shown sequentially from the left.

An artist link map ALM1 is stored as artist link information in the ALM database 57 of the PC 1. The artist link map ALM1 indicates expresses the aggregate of artist groups. An artist group AG1, an artist group AG2, and an artist group AG3 are included in the artist link map ALM1.

In the artist link map ALM1, only an artist AT1 is included in the artist group AG1, an artist AT2 and an artist AT3 are included in the artist group AG2, and an artist AT4 and an artist AT5 are included in the artist group AG3. The artist group has one or more artists. In addition, it is expressed that artists belonging to the same artist group 'have linkage therebetween'.

For example, in the example shown in FIG. 10, since the artist AT4 is included in the artist group AG3, the artist AT4 and the artist AT5 are linked.

Figure 11:
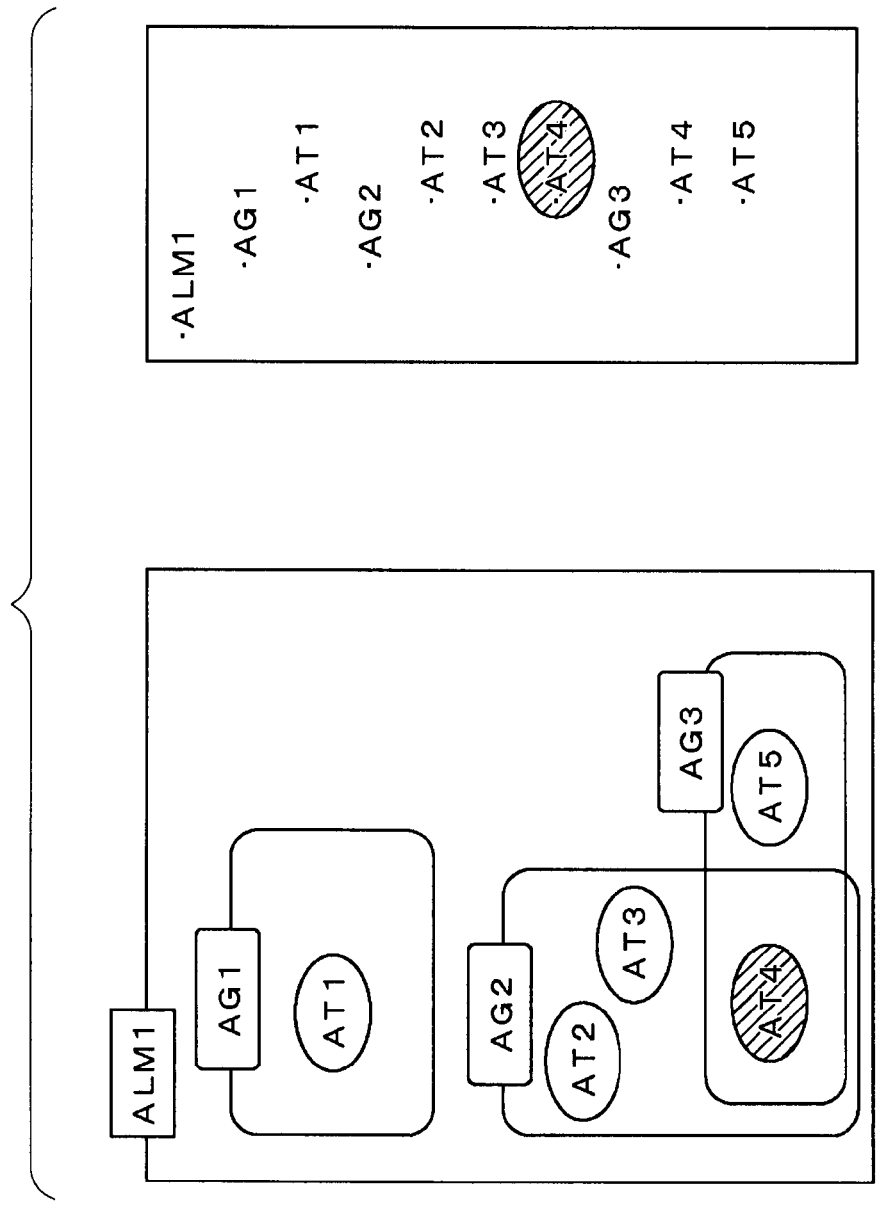
FIG. 11 is a view conceptually illustrating an example of the configuration of artist link information after editing.

Here, editing for adding the artist AT4 in the artist group AG2 of the artist link map ALM1 shown in FIG. 10 is performed. As a result, the artist AT4 is included in the artist group AG2 and the artist group AG3 as shown in FIG. 11.

Figure 12:
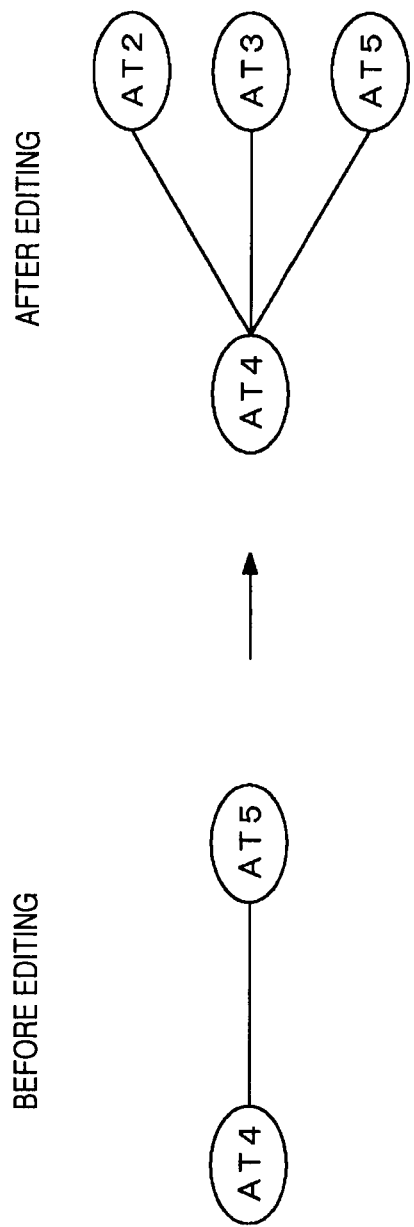
FIG. 12 is a view explaining artist link information before and after editing.

That is, as shown by fan display in FIG. 12, the artist AT4 is linked with only the artist AT5 before editing. However, since the artist AT4 is included in the artist group AG2 and the artist group AG3 after editing, the artist AT4 is linked with the artist AT2, the artist AT3, and the artist AT5.

As described above, the linkage between artists, that is, artist link information may be simply added. In addition, a case of deletion is opposite to the case of addition. That is, only by deleting the artist AT4 included in the artist group AG2 of the artist link map ALM1 shown in FIG. 11, a group in which the artist AT4 is included is only the artist group AG3 as shown in FIG. 10. Accordingly, the artist AT4 is linked with only the artist AT5. Thus, deletion of artist link information may also be performed simply.

Next, a process of editing artist link information will be described.

Figure 13:
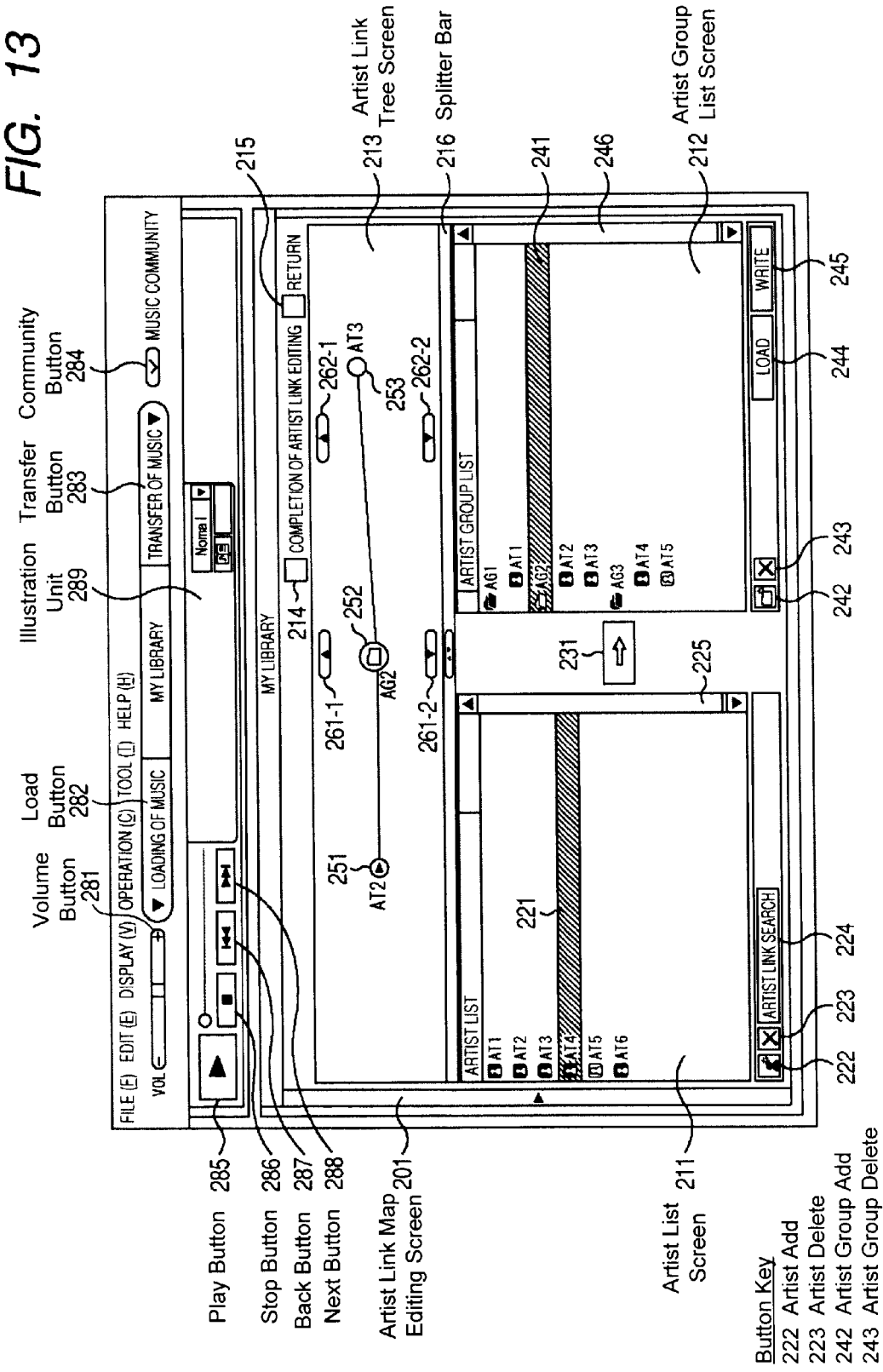
FIG. 13 is a view illustrating an example of the configuration of an artist link map editing screen.

FIG. 13 is a view illustrating an example of the configuration of an artist link map (ALM) editing screen that is displayed on the display unit 17 in order to edit artist link information.

An artist link map editing screen 201 is mainly configured to include an artist list screen 211, an artist group list screen 212, and an artist link tree screen 213.

The artist list screen 211 and the artist group list screen 212 are disposed side by side below the artist link tree screen 213.

In addition, an artist link editing completion button 214 used to return a display from the artist link map preview screen 201 to a signal wave maximum amplitude value detecting unit screen, which is a screen for reproduction and will be described later, and a button 215 for returning to a screen immediately before are disposed above the artist link tree screen 213. In addition, a splitter bar 216, which moves up and down to change a ratio of display between the artist link tree screen 213 and the artist list screen 211 and the artist group list screen 212, is disposed between the artist link tree screen 213 and the artist list screen 211 and the artist group list screen 212.

On the artist list screen 211, a list of artist names (AT1 to AT6) stored in the artist list table 82 are displayed together with artist icons. Moreover, an artist icon (hereinafter, also referred to as an icon of the artist AT5) granted to the artist AT5 is expressed in a color different from icons corresponding to other artists. This indicates that contents of the artist AT5 are not stored in the PC 1. In addition, a cursor 221 that indicates being selected by a user is displayed on an icon of the artist AT4.

Further, an artist addition button 222 used to add a new artist in the artist list table 82, an artist deletion button 223 used to delete an artist being selected by the cursor 221 from the artist list table 82, and an artist link search button 224 that, in a state in which an artist being selected by the cursor 221 is set as a basing-point artist, causes artist link information of the artist to be displayed on the artist link tree screen 213 are disposed in a lower part within the artist list screen 211. At a right side of the artist list screen 211, there is provided a scroll bar 225 for scrolling a list of artist names displayed on the artist list screen 211.

In addition, an artist group addition button 231 is disposed between the artist list screen 211 and the artist group list screen 212. In this case, the artist group addition button 231 is used to add an artist, which is currently selected by the cursor 221 on the artist list screen 211, in an artist group being selected on the artist group list screen 212.

On the artist group list screen 212, a list of artist groups stored in the artist group list table 81 are displayed together with a folder icon. In addition, a folder icon (hereinafter, also referred to as an icon of the artist group AG2) granted to the artist group AG2 is expressed in a color different from icons corresponding to other artist groups. This indicates that an artist included in the artist group AG2 is considered as a basing-point artist and artist link information on the artist group AG2 is displayed on the artist link tree screen 213. In addition, a cursor 241 that indicates being selected by a user is displayed on an icon of the artist group AG2.

On the artist group list screen 212, by clicking a folder icon, a folder icon in an open state is displayed and the artist link correspondence table 83 is referred, such that an icon of an artist included in an artist group corresponding to the folder icon is displayed below the open folder icon. In addition, in the example shown in FIG. 13, folder icons belonging to the artist groups AG1 to AG3 are all opened and icons of artists included in each of the artist groups are displayed.

That is, an artist icon of the artist AT1 is displayed below a folder of the artist group AG1, an artist icon of the artist AT2 and an artist icon of the artist AT3 are displayed below a folder of the artist group AG2, and an artist icon of the artist AT4 and an artist icon of the artist AT5 are displayed below a folder of the artist group AG3.

An artist group addition button 242 used to add a new artist in the artist group list table 81, a deletion button 243 used to delete an artist group being selected by the cursor 241 from the artist group list table 81 or delete an artist being selected by the cursor 241 from a corresponding artist group, a load button 244 for loading artist link information written in an XML (extensible markup language) file, and a writing button 245 for writing artist link information of at least one artist group, which is selected by the cursor 241, in an XML file are disposed in a lower part within the artist group list screen 212. At a left side of the artist group list screen 212, there is provided a scroll bar 246 for scrolling a list of artist groups displayed on the artist group list screen 212.

Artist information on a basing-point artist is displayed on the artist link tree screen 213 in a tree format. That is, a basing-point icon 251 indicating a basing-point artist is displayed on a left side of the artist link tree screen 213, a folder icon 252 indicating an artist group in which the basing-point artist is included is displayed on a middle part of the artist link tree screen 213, and an associated icon 253 of another artist (that is, associated artist associated with the basing-point artist) included in the artist group in which the basing-point artist is included is displayed. In addition, a line indicating link by connecting the basing-point icon 251 and the folder icon 252 with each other is displayed between the basing-point icon 251 and the folder icon 252. Similarly, a line is also displayed between the folder icon 252 and the associated icon 253.

Thus, since the artist group is also displayed, a user can recognize, for what kind of reason (artist group), a basing-point artist and an associated artist are associated with each other. Moreover, in the case when the basing-point artist is included in a plurality of artist groups, a plurality of folder icons 252 are also displayed. In the case when a plurality of associated artists exist in an artist group, a plurality of associated icons 253 are also displayed.

In the example shown in FIG. 13, the artist AT2 is selected as a basing-point artist. Accordingly, character of the artist AT2 is attached to the basing-point icon 251 to be displayed, character of the artist group AG2 in which the artist AT2 is included is attached to the folder icon 252 to be displayed, and character of another artist AT3 included in the artist group AG2 is attached to the associated icon 253 to be displayed.

In the case when the associated icon 253 is clicked on the artist link tree screen 213 by a user's operation of a mouse, which is an example of the operation input unit 16, the artist AT3 indicated by the associated icon 253 becomes a basing-point artist and artist link information of the artist AT3, which has become the basing-point artist, is tree displayed on the basis of the ALM database 57. That is, character of the artist AT3 that has become the basing-point artist is attached to the basing-point icon 251 to be displayed, character of the artist group AG2 in which the artist AT3 is included is attached to the folder icon 252 to be displayed, and character of another artist AT2 included in the artist group AG2 is attached to the associated icon 253 to be displayed.

Hereinbefore, it has been described about the case in which the same artist group AG2 is displayed. However, in the case when character of an artist group AG different from that before clicking is attached to the folder icon 252 to be displayed, a folder icon of an artist group corresponding to the folder icon 252 after clicking is displayed on the artist group list screen 212 in a color different from colors of icons of other artist groups.

Further, in the case when the basing-point icon 251 or the associated icon 253 is double clicked on the artist link tree screen 213 by a user's operation of a mouse, which is an example of the operation input unit 16, contents data corresponding to an artist indicated by each icon is reproduced. At this time, an artist to whom the associated icon 253 corresponds becomes a basing-point artist and artist link information of the artist, which has become the basing-point artist, is tree displayed on the basis of the ALM database 57. Furthermore, in the case when contents of an artist indicated by a double-clicked icon are stored in the PC 1, the data acquisition control unit 61 may control the network communication unit 63 in response to an operation signal from the GUI control unit 51, thereby accessing a web page (for example, in the contents server 3, URL from which contents to be targeted can be downloaded) associated with the artist through the network 2.

Furthermore, in the case when a plurality of associated icons are displayed on the artist link tree screen 213, priorities (order information) of artists included in a corresponding artist group of the artist link correspondence table 83 in FIG. 5 may be changed if a user changes the order of the plurality of associated icons by operating a mouse, which is an example of the operation input unit 16.

In addition, scroll buttons 261-1 and 261-2 used to move a display to a folder icon indicating another artist group in which a basing-point artist is included are disposed above and below the folder icon 252 on the artist link tree screen 213, respectively. In addition, scroll buttons 262-1 and 262-2 used to move a display to an associated icon indicating another associated artist are disposed above and below the associated icon 253 on the artist link tree screen 213, respectively.

Moreover, in the example shown in FIG. 13, a volume button 281 for adjusting volume, a load button 282 for loading (recording after encoding) contents from a CD or the like, a transfer button 283 for transferring contents, playlist, or the like to the PD 7, a community button 284 that is used to access an external server through the network 2 in order to perform communication with other users using contents, a reproduction operation button 285 used to instruct reproduction while contents are stopped and instruct temporary stopping while the contents are being reproduced, a stop button 286 for stopping reproduction of contents, a 'back' button 287 for instructing contents located immediately before contents to be reproduced, a 'next' button 288 for instructing contents located immediately after the contents to be reproduced, and an illustration unit 289 that illustrates a contents name and an artist name of contents being reproduced, an image being reproduced, or the like are provided in an upper part of the artist link map editing screen 201.

Next, referring to flow charts shown in FIGS. 14 to 16, it will be described about a process of editing artist link information of the PC 1, which is performed referring to the artist link map editing screen 201 having the configuration described above.

For example, when a user operates the operation input unit 16 to instruct artist link editing, the GUI control unit 51 causes the artist link map editing screen 201, which is shown in FIG. 13, to be displayed on the display unit 17. For example, as shown by the cursor 221 in FIG. 13, a user operates the operation input unit 16 to select an icon of the artist AT4, which is to be added, on the artist list screen 211 and select an icon of the artist group AG2, which the user desires the artist AT4 to be included, on the artist group list screen 212. Then, the user presses the artist group addition button 231.

The GUI control unit 51 is input with a user's operation through the operation input unit 16 and supplies an operation signal corresponding to the operation to the ALM editing control unit 52. In step S101, the ALM editing control unit 52 determines whether or not addition of an artist to an artist group has been instructed. If an operation signal corresponding to the pressing of the artist group addition button 231 is input from the GUI control unit 51, the ALM editing control unit 52 determines that the addition of an artist to an artist group has been instructed in step S101, proceeding to step S102.

In step S102, the ALM editing control unit 52 edits the artist link correspondence table 83. That is, the ALM editing control unit 52 adds information of an artist being selected in an artist group, which is being selected, of the artist link correspondence table 83. At this time, in the artist link correspondence table 83 shown in FIG. 4, an artist ID (AID_4) of the artist AT4 is additionally registered corresponding to an artist group ID (AGID_2) of the artist group AG2.

In step S103, the GUI control unit 51 redraws the artist link map editing screen 201 corresponding to the editing of the artist link correspondence table 83 performed by the ALM editing control unit 52.

Thus, the artist link map editing screen 201 shown in FIG. 17 is displayed on the display unit 17.

In an example shown in FIG. 17, in addition to an artist icon of the artist AT2 and an artist icon of the artist AT3, an artist icon of the artist AT4 is additionally displayed below a folder of the artist group AG2 of the artist group list screen 212.

Moreover, on the artist link tree screen 213 shown in FIG. 17, an associated icon 253-1 (associated icon 253 in FIG. 13) attached with character of the artist AT3, which is another artist included in the artist group AG2, is added through a line to the folder icon 252 attached with the artist group AG2 in which the artist AT2 serving as a basing-point artist is included, and an associated icon 253-2 attached with character of the artist AT4 is also displayed.

As described above, editing of the artist link information is reflected even on the artist link map editing screen 201 in real-time manner.

Referring back to FIG. 14, if it is determined that the addition of an artist to an artist group has not been instructed in step S101, the process proceeds to step S104.

In step S104, the ALM editing control unit 52 determines whether or not deletion of an artist from an artist group has been instructed. For example, on the artist group list screen 212 of the artist link map editing screen 201 in FIG. 17, a user operates the operation input unit 16 to press the deletion button 243 such that the cursor 241 is displayed on the icon of the artist AT4 included in the artist group AG2 (that is, the icon of the artist AT4 is selected).

If an operation signal corresponding to the pressing of the deletion button 243 is input from the GUI control unit 51, the ALM editing control unit 52 determines that the deletion of an artist to from an artist group has been instructed in step S104, proceeding to step S105.

In step S105, the ALM editing control unit 52 edits the artist link correspondence table 83.

That is, the ALM editing control unit 52 deletes information of an artist being selected from an artist group, which is being selected, of the artist link correspondence table 83. At this time, in the artist link correspondence table 83 shown in FIG. 4, information corresponding to an artist group ID (AGID_2) of the artist group AG2 and an artist ID (AID_4) of the artist AT4 are deleted.

In step S106, the GUI control unit 51 redraws the artist link map editing screen 201 corresponding to the editing of the artist link correspondence table 83 performed by the ALM editing control unit 52. Thus, the artist link map editing screen 201 shown in FIG. 13 is displayed on the display unit 17.

Figure 15:
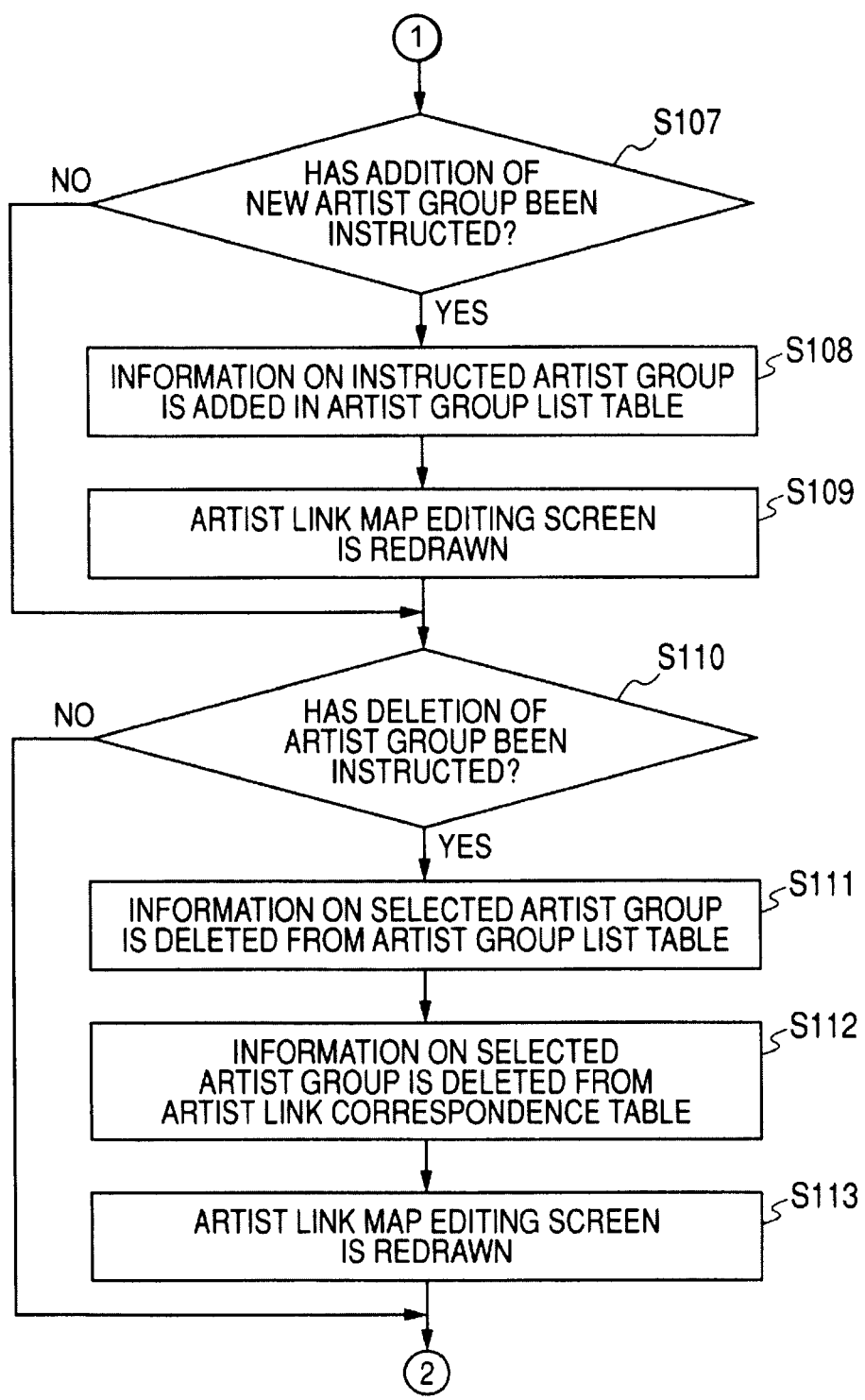
FIG. 15 is a flow chart explaining artist link information editing processing in the PC shown in FIG. 1.

If it is determined that the deletion of an artist from an artist group has not been instructed in step S104, the process proceeds to step S107 in FIG. 15.

In step S107, the ALM editing control unit 52 determines whether or not addition of a new artist group has been instructed. For example, on the artist group list screen 212 of the artist link map editing screen 201 in FIG. 13, an artist group whose name is not set yet is displayed by the GUI control unit 51 when the artist group addition button 242 is pressed.

Here, a user inputs an artist group name (for example, AG4) by using a keyboard that is an example of the operation input unit 16. Here, it is possible to input a group name that the user desires. For example, in the case of desiring to create a group of artists produced by the same music producer, an artist group name expressed as 'OO project' may be input, or in the case of desiring to create a group for ballet music, an artist group name expressed as 'ballet' may be input. Thus, it is possible to input a desired group name. That is, since a new artist group can be created by using a predetermined group name, it is possible to recognize through the group name how artists included in the artist group are linked.

If an operation signal corresponding to the addition of a new artist group (artist group AG4) is input from the GUI control unit 51, the ALM editing control unit 52 determines that the addition of the new artist group has been instructed in step S107, proceeding to step S108.

In step S108, the ALM editing control unit 52 edits the artist link correspondence table 83. That is, the ALM editing control unit 52 adds information of the instructed artist group in the artist link correspondence table 83. At this time, in the artist link correspondence table 83 shown in FIG. 4, name (AG4) and artist ID (for example, AGID_4) of the artist group AG4 are added. In this case, since an artist is not added in the artist group AG4, editing of the artist link correspondence table 83 is not performed.

In step S109, the GUI control unit 51 redraws the artist link map editing screen 201 corresponding to the editing of the artist link correspondence table 83 performed by the ALM editing control unit 52. As a result, the artist group list screen 212, on which the icon of the artist group AG4 is provided in addition to the icons of the artist groups AG1 to AG3 shown in FIG. 13, is displayed on the display unit 17.

If it is determined that the addition of a new artist group has not been instructed in step S107, the process proceeds to step S110.

In step S110, the ALM editing control unit 52 determines whether or not deletion of an artist group has been instructed. For example, on the artist group list screen 212 of the artist link map editing screen 201 in FIG. 17, a user operates the operation input unit 16 to press the deletion button 243 such that the cursor 241 is displayed on the icon of the artist group AG3 (that is, the icon of the artist group AG3 is selected).

If an operation signal corresponding to the pressing of the deletion button 243 is input from the GUI control unit 51, the ALM editing control unit 52 determines that the deletion of an artist group has been instructed in step S110, proceeding to step S111.

In step S111, the ALM editing control unit 52 edits the artist group list table 81. That is, the ALM editing control unit 52 deletes information of an artist group, which is being selected, from the artist group list table 81. At this time, name (AG3) and artist group ID (AGID_3) of the artist group AG3 are deleted from the artist group list table 81 shown in FIG. 4.

Then, in step S112, the ALM editing control unit 52 edits the artist link correspondence table 83. That is, the ALM editing control unit 52 deletes information of an artist group, which is being selected, from the artist link correspondence table 83. At this time, information corresponding to the artist group ID (AGID_3) of the artist group AG3 is all deleted from the artist link correspondence table 83 shown in FIG. 4.

In step S113, the GUI control unit 51 redraws the artist link map editing screen 201 corresponding to the editing of the artist link correspondence table 83 performed by the ALM editing control unit 52. As a result, the artist group list screen 212, on which the icon of the artist group AG3 is deleted from the icons of the artist groups AG1 to AG3 shown in FIG. 13, is displayed on the display unit 17.

If it is determined that the deletion of an artist group has not been instructed in step S110, the process proceeds to step S114 in FIG. 16.

In step S114, the ALM editing control unit 52 determines whether or not writing of artist link information has been instructed. For example, on the artist group list screen 212 of the artist link map editing screen 201 in FIG. 17, a user operates the operation input unit 16 to press the writing button 245 such that the cursor 241 is displayed on the icons of the desired artist groups AG1 to AG3 (that is, the icons of artist groups AG1 to AG3 are selected).

If an operation signal corresponding to the pressing of the writing button 245 is input from the GUI control unit 51, the ALM editing control unit 52 determines that writing of artist link information has been instructed in step S114, proceeding to step S115.

In step S115, the ALM editing control unit 52 writes artist link information of an artist group being selected in a file. That is, the ALM editing control unit 52 writes artist link information of the artist groups AG1 from the ALM database 57 to AG3 in an XML file, for example, and then causes the artist link information to be stored in the storage unit 19 of the PC 1. In addition, a file type is not limited to the XML file.

FIG. 18 is a view illustrating an example of the configuration of an XML file in which artist link information is written. <ArtistLinkMap Version="4.0"> and </ArtistLinkMap> described in first and nineteenth lines indicate that this XML file (contents described in second to eighteenth lines) is an artist link map (artist link information) and a version thereof is '4.0'.

<Group Creator="system" width="Narrow"> and </Group> described in the second and sixth lines indicate that a creator of an artist group based on description between the second and sixth lines (description in third to fifth lines) is 'system' and the width thereof is 'narrow'. <Title>AG1</Title> described in the third line indicates that an artist group name of an artist group described in the second and sixth lines is 'AG1'. <Comment/> described in the fourth line indicates that a comment can be inserted. <Artist>AT1</Artist> described in the fifth line indicates that an artist name included in the artist group described in the second and sixth lines is 'AT1'.

<Group Creator="user" width="Narrow"> and </Group> described in the seventh and twelfth lines indicate that a creator of an artist group based on description between the seventh and twelfth lines (description in eighth to eleventh lines) is 'User' and the width thereof is 'narrow'. <Title>AG2</Title> described in the eighth line indicates that an artist group name of an artist group described in the eighth and eleventh lines is 'AG2'. <Comment/> described in the ninth line indicates that a comment can be inserted. <Artist>AT2</Artist> described in the tenth line indicates that an artist name included in the artist group described in the second and sixth lines is 'AT2'. <Artist>AT3</Artist> described in the eleventh line indicates that an artist name included in the artist group described in the second and sixth lines is 'AT3'.

<Group Creator="user" width="Narrow"> and </Group>described in the thirteenth and eighteenth lines indicate that a creator of an artist group based on description between the thirteenth and eighteenth lines (description in fourteenth to seventeenth lines) is 'User' and the width thereof is 'narrow'. <Title>AG3</Title> described in the fourteenth line indicates that an artist group name of an artist group described in the fourteenth and seventeenth lines is 'AG3'. <Comment/> described in the fifteenth line indicates that a comment can be inserted. <Artist>AT3</Artist> described in the sixteenth line indicates that an artist name included in the artist group described in the fourteenth to seventeenth lines is 'AT3'. <Artist>AT4</Artist> described in the seventeenth line indicates that an artist name included in the artist group described in the fourteenth to seventeenth lines is 'AT4'.

In the example shown in FIG. 18, it has been described about a case in which a creator, which is reading from attribute information of the artist group list table 81 in FIG. 4, of an artist group is written. However, by referring to attribute information corresponding to each artist included in an artist group in the artist link correspondence table 83 shown in FIG. 5, attribute information corresponding to each artist included in the artist group may also be written in an XML file.

The artist link information written in the XML file as described above is transmitted to another PC 1 or the like. The transmitted artist link information is loaded to another PC 1 to be then used, which will be described later.

Referring back to FIG. 16, if it is determined that the writing of artist link information has not been instructed in step S114, the process proceeds to step S116.

In step S116, the ALM editing control unit 52 determines whether or not loading of the artist link information has been instructed. For example, on the artist group list screen 212 of the artist link map editing screen 201 in FIG. 17, a user operates the operation input unit 16 to press the load button 244.

Then, a screen (child screen) for file selection is displayed by the GUI control unit 51. Here, a user selects an XML file to load by using a mouse that is an example of the operation input unit 16.

If an operation signal corresponding to the selection of an XML file is input from the GUI control unit 51, the ALM editing control unit 52 determines that loading of a file has been instructed in step S116, proceeding to step S117.

In step S117, the ALM editing control unit 52 performs editing for updating the ALM database 57 with the selected XML file. That is, the ALM editing control unit 52 loads the selected XML file and then merges artist link information described in the XML file with existing artist link information (ALM database 57).

Figure 19:
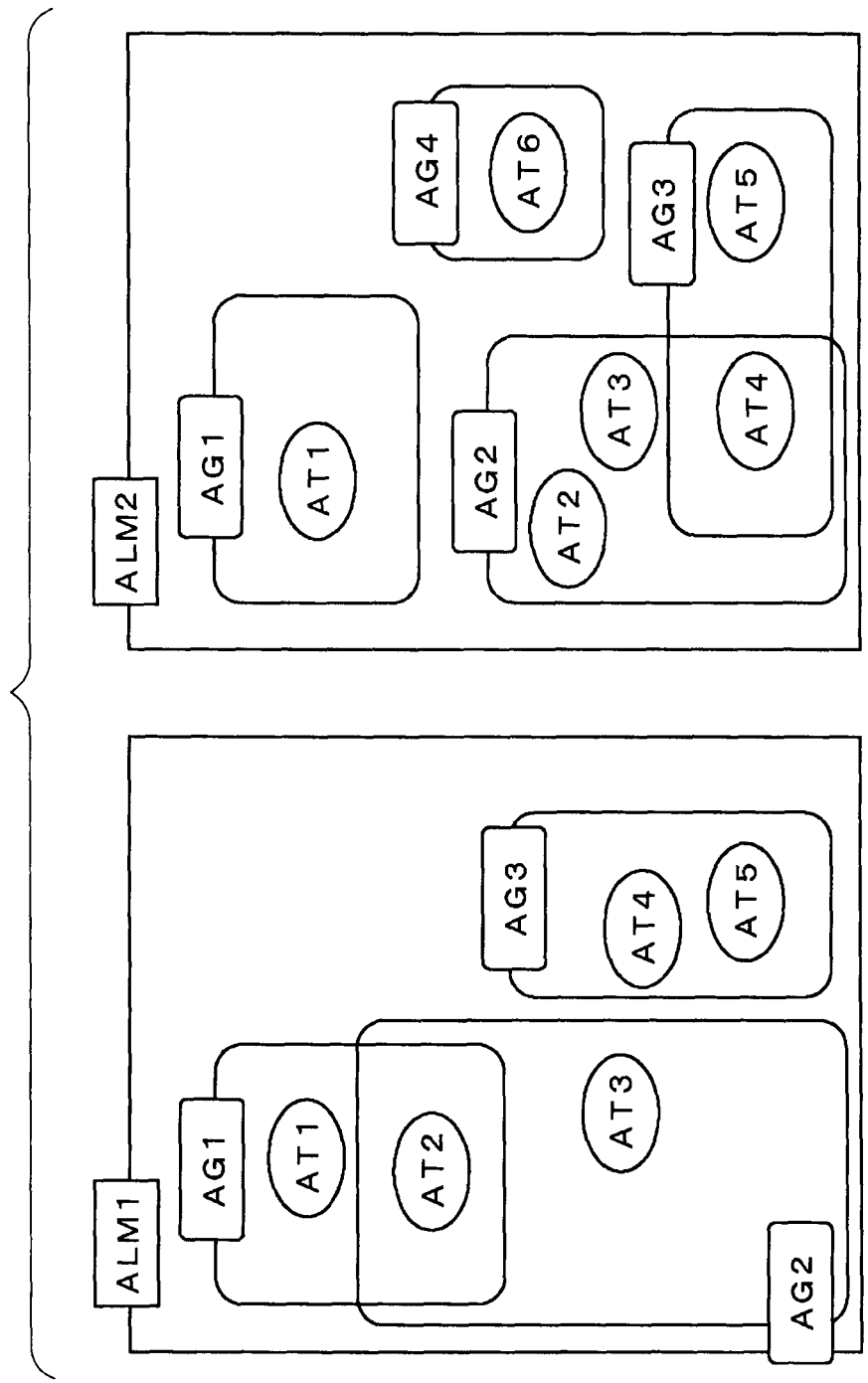
FIG. 19 is a view explaining how artist link information is merged.

Next, the process in step S117 will be described in detail with reference FIGS. 19 and 20. In FIG. 19, a conceptual diagram of the configuration of an artist link map ALM1, which is artist link information stored in the ALM database 57 of the PC 1, and a conceptual diagram of the configuration of an artist link map ALM2, which is artist link information stored in the ALM database 57 of another PC 1 described in the loaded XML file, are shown.

The artist link map ALM1 is configured to include an artist group AG1 in which an artist AT1 and an artist AT2 are included, an artist group AG2 in which the artist AT2 and an artist AT3 are included, and an artist group AG3 in which an artist AT4 and an artist AT5 are included.

On the other hand, the artist link map ALM2 is configured to include an artist group AG1 in which an artist AT1 is included, an artist group AG2 in which an artist AT2, an artist AT3, and an artist AT4 are included, an artist group AG3 in which the artist AT4 and an artist AT5 are included, and an artist group AG4 in which an artist AT6 is included.

That is, the artist link map ALM2 is different from the artist link map ALM1 in that the artist AT2 is not included in the artist group AG1, the artist AT4 is further included in the artist group AG2, and the artist group AG4 including the artist AT6 is further provided.

Figure 20:
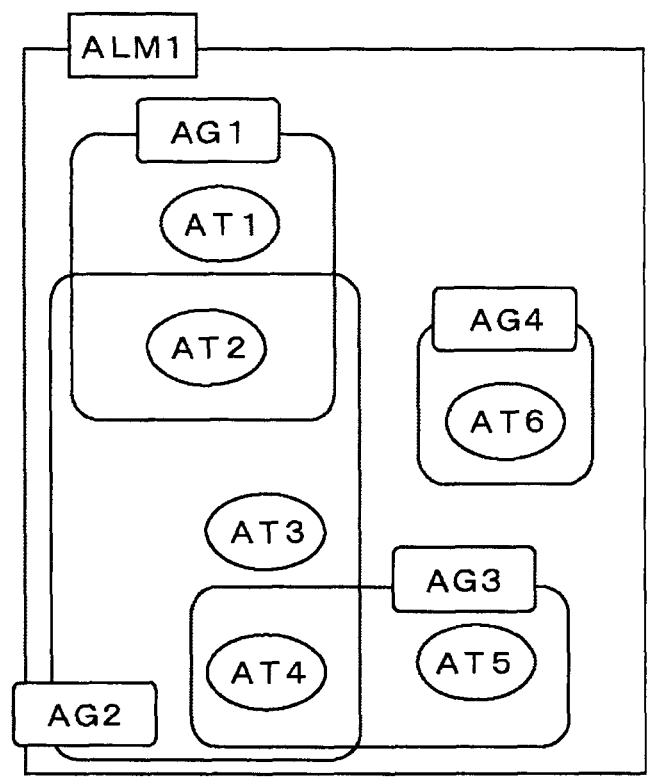
FIG. 20 is a view explaining how artist link information is merged.

When the artist link map ALM2 of the XML file is merged with the artist link map ALM1 of the ALM database 57 of the PC 1, the artist link map ALM1 of the ALM database 57 of the PC 1 is updated as shown in FIG. 20. In addition, the merging is performed on the basis of artist group name and artist name under determination that those having the same name are equal.

The artist link map ALM1 shown in FIG. 20 is configured to include the artist group AG1 in which the artist AT1 and the artist AT2 are included, the artist group AG2 in which the artist AT2, the artist AT3, and the artist AT4 are included, the artist group AG3 in which the artist AT4 and the artist AT5 are included, and the artist group AG4 in which the artist AT6 is included.

That is, since the artist AT2 is not included in the artist group AG1 in the case of the artist link map ALM2 shown in FIG. 19 but is included in the artist group AG1 in the case of the artist link map ALM1 shown in FIG. 19, the artist AT2 is included in the artist group AG1 of the artist link map ALM1 shown in FIG. 20. Further, since the artist AT4 is not included in the artist group AG2 in the case of the artist link map ALM1 shown in FIG. 19 but is included in the artist group AG2 in the case of the artist link map ALM2 shown in FIG. 19, the artist AT4 is included in the artist group AG2 of the artist link map ALM1 shown in FIG. 20. Furthermore, since the artist group AG4 is not included in the case of the artist link map ALM1 shown in FIG. 19 but is included in the case of the artist link map ALM2 shown in FIG. 19, the artist group AG4 is included in the artist link map ALM1 shown in FIG. 20.

Therefore, in this case, artist name and artist group ID of the artist group AG4 are added in the artist group list table 81 of the PC 1, artist name and artist ID of the artist AT6 are added in the artist list table 82, correspondence between IDs of the artist group AG2 and the artist AT4 and correspondence between IDs of the artist group AG4 and the artist AT6 are added in the artist link correspondence table 83.

As described above, if an artist group or an artist included in an artist group is included in at least one of the existing artist link map ALM1 or artist link map ALM2 in the XML file, which are shown in FIG. 19, the artist group or the artist are reflected on the artist link map ALM1 after updating in FIG. 20.

Referring back to FIG. 16, in step S118, the GUI control unit 51 redraws the artist link map editing screen 201 corresponding to the editing of the ALM database 57 performed by the ALM editing control unit 52. As a result, the artist group list screen 212, on which the icon of the artist group AG4 is provided in addition to the icons of the artist groups AG1 to AG3, is displayed on the display unit 17.

If it is determined that loading of a file has been instructed in step S116, the process proceeds to step S119. In step S119, the ALM editing control unit 52 determines whether or not completion of artist link editing has been instructed. For example, a user operates the operation input unit 16 to press the artist link editing completion button 214 disposed at an upper part of the artist link tree screen 213 of the artist link map editing screen 201 in FIG. 13.

If an operation signal corresponding to the pressing of the artist link editing completion button 214 is input from the GUI control unit 51, the ALM editing control unit 52 determines that completion of the artist link editing has been instructed in step S119 and then terminates display of the artist link map editing screen 201. Thus, editing of artist link information is completed.

Figure 14:
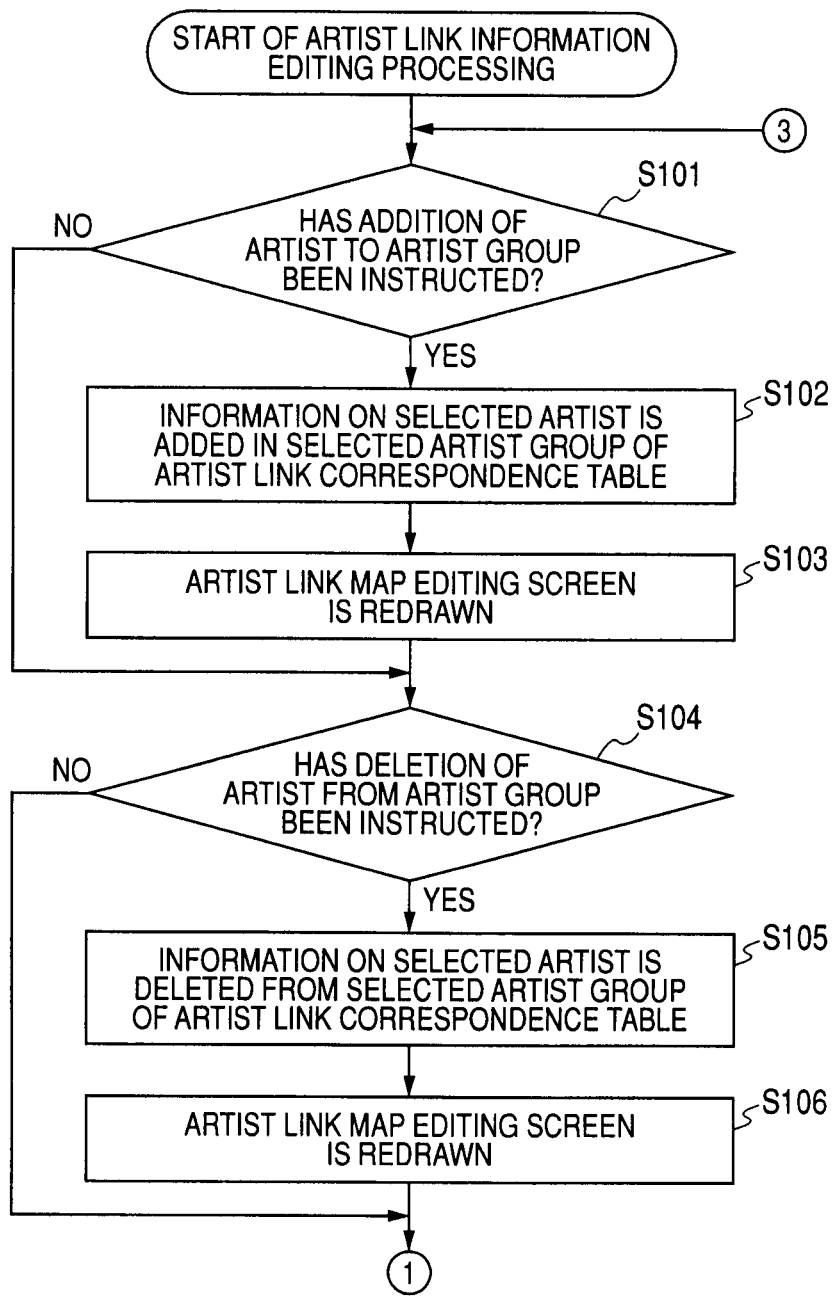
FIG. 14 is a flow chart explaining artist link information editing processing in the PC shown in FIG. 1.

Further, if it is determined that the completion of artist link editing has not been instructed in step S119, the process returns to step S101 in FIG. 14 to repeat the subsequent processes.

Hereinbefore, addition/deletion of an artist to/from an artist group, addition/deletion of an artist group, and writing and loading of artist link information have been represented as the artist link information editing processing. However, it is possible to perform other types of editing, such as addition/deletion of an artist to/from the artist group list table 81 or changing priorities of artists in an artist group of the artist list table 83, in the same manner as described above.

As mentioned above, since artist link information created on the basis of detailed metadata can be easily edited corresponding to a user's operation, more efficient artist link information is created. That is, as for the artist link information created on the basis of detailed metadata, even in a case in which artists, which are considered to be linked, are not linked or a case in which it is difficult to cope with wrong link between artists, it is possible to easily edit the link. As a result, artist link information that is efficient for each user is created.

Furthermore, since edited artist link information can be written in a file or the written file can be loaded, users may exchange information with each other.

Accordingly, for example, since it becomes possible to supply the edited artist link information to the contents server 3 or the like, contents (song) may be sold in cooperation with web service.

That is, for example, there is a case in which an artist, of which contents are not owned by a user, is included in artist link information obtained from the contents server 3 or the like. In this case, it is possible to cause the user to recognize the artist by displaying the artist as an artist linked with other artists. In addition, as described above with reference to FIG. 13, in the case when contents of an instructed artist are not stored in the PC 1, it is possible to access a web site related to the artist. As a result, it is possible to perform sales promotion for contents by requesting users to buy contents that the users do not own.

In addition, since detailed metadata is acquired whenever contents are acquired, the edited artist link information is updated thereafter on the basis of the detailed metadata. In addition, even if there is link information deleted by editing of a user, the link information may be added again on the basis of the detailed metadata acquired thereafter. That is, the artist link information may be updated automatically or manually.

Next, it will be described about artist link map (ALM) reproduction that is shuffle reproduction of contents using artist link information. Hereinafter, referring to FIG. 23, artist link map (ALM) reproduction in the PC 1 will be described through an example in which the ALM database 57 having the configuration shown in FIG. 21 and the contents information database 58 shown in FIG. 22 are built. In addition, in the example shown in FIG. 21, another example of the artist link map editing screen 201 shown in FIG. 13 is illustrated.

Figure 21:
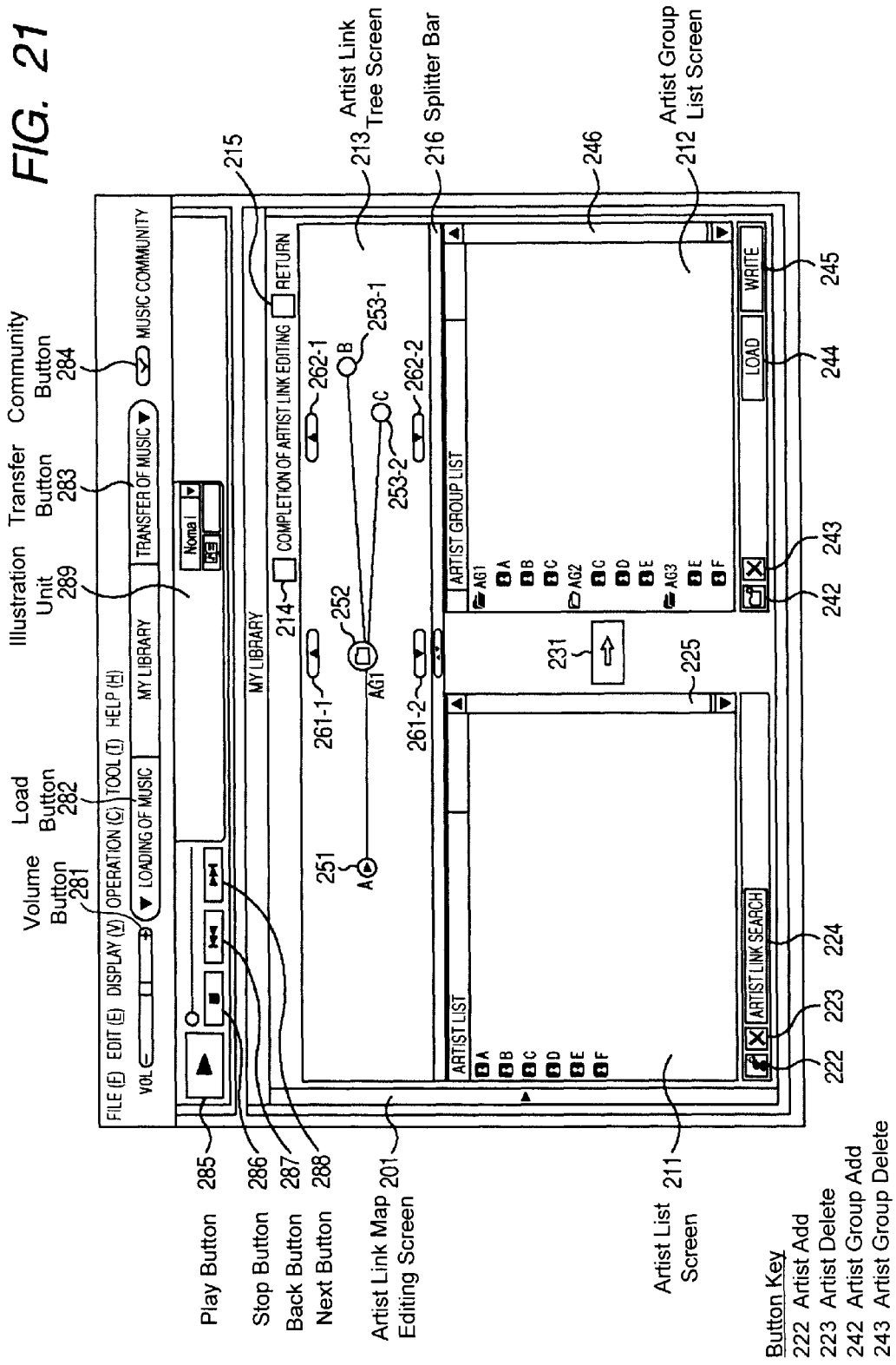
FIG. 21 is a view illustrating another example of the configuration of ALM database.
Figure 22:
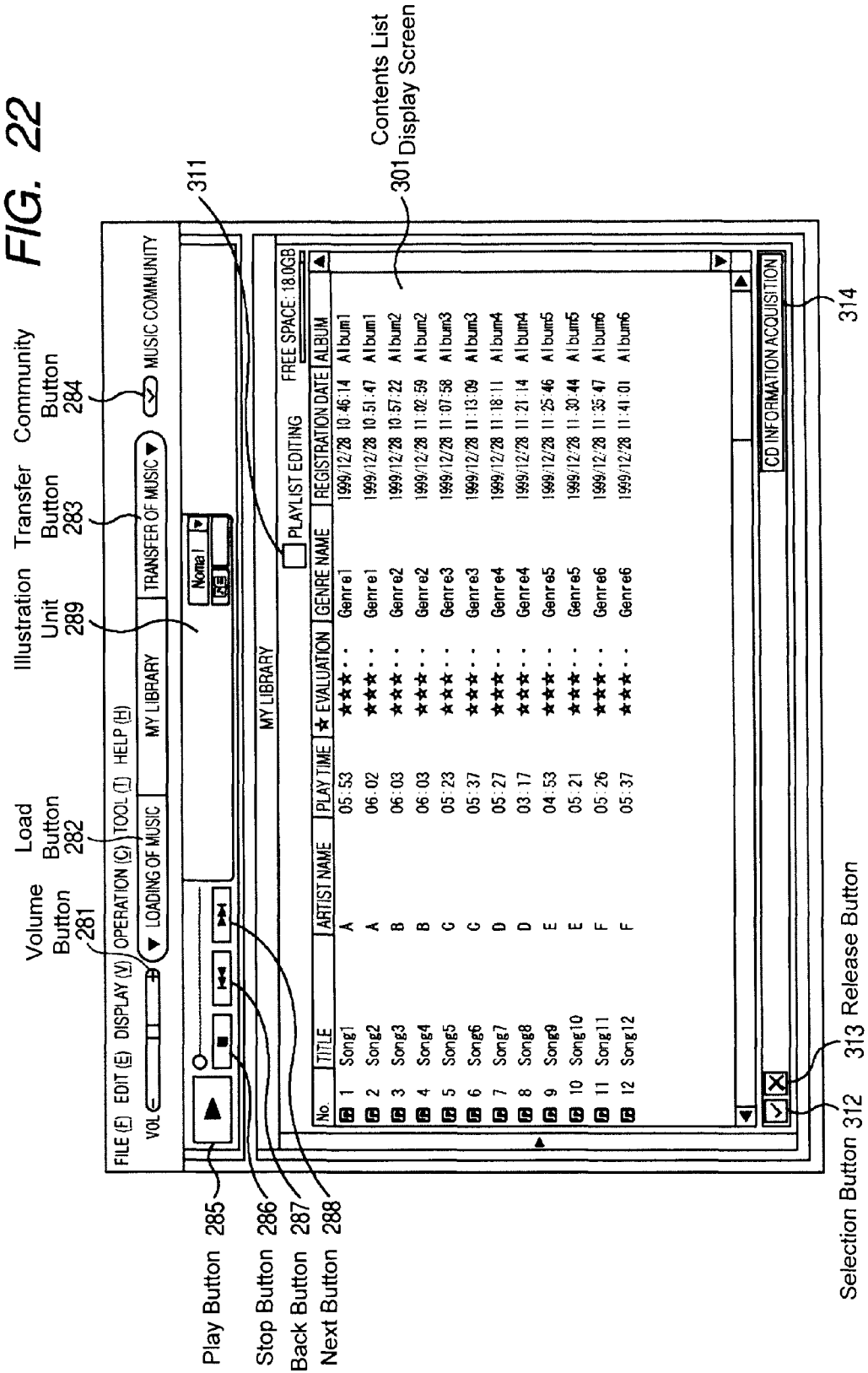
FIG. 22 is a view illustrating another example of the configuration of contents information database.

On the artist link map editing screen 201 shown in FIG. 21, artist names and artist IDs of artists A to F are stored in the artist list table 82 of the PC 1 in the example of FIG. 21 such that a list of artist names (A to F) are displayed together with artist icons on the artist list screen 211.

Further, on the artist group list screen 212, a list of artist group names (AG1 to AG3) are displayed together with folder icons, artist icons of artists A to C are displayed below a folder of the artist group AG1, artist icons of artists C to E are displayed below a folder of the artist group AG2, and artist icons of artists E and F are displayed below a folder of the artist group AG3. That is, it is stored in the artist link correspondence table 83 that the artists A to C are included in the artist group AG1, the artists C to E are included in the artist group AG2, and the artists E and F are included in the artist group AG3.

Therefore, on the artist link tree screen 213 in a case in which the artist A is selected as a basing-point artist, character A is attached to the basing-point icon 251 to be displayed, character of the artist group AG1 in which the artist A is included is attached, as artist link information of the artist A, to the folder icon 252 to be displayed, and characters of the other artists B and C included in the artist group AG1 are attached to the linked icons 253-1 and 253-2 to be displayed.

FIG. 22 shows an example of the configuration of a contents list display screen 301 for displaying a list of contents information.

On the contents list display screen 301, a list of contents information stored in the contents information database 58 is displayed as library. A user may set which information is displayed among the contents information stored in the contents information database 58.

In the example shown in FIG. 22, number 'No.' of contents, 'title' that is a contents name, 'artist name' of contents, 'play time' that is also reproduction time of contents, '☆ evaluation' indicating an evaluation value on the basis of the number of stars, 'genre name' of genre to which contents belong, 'registration date' that is date and time at which contents are stored in the PC 1, and 'album' that contents are included are displayed as the contents information. Here, an evaluation value of contents expressed on the basis of the number (0 to 5) of stars indicates that evaluation is higher as the number of stars increases. As described above referring to FIG. 6, evaluation values of contents set by a user may be displayed or the evaluation values of contents set corresponding to history of the number of reproduction times may be displayed.

For example, contents corresponding to number '1' indicates that a title is 'Song1', an artist name is 'A' (hereinafter, also referred to as artist 'A'), play time is '05:53' (5 minutes and 53 seconds), evaluation corresponds to three stars, a genre name is 'Genre1', a registration date is '1999/12/28 10:46:14' (10 o'clock 46 minute 14 second on Dec. 28, 1999), and an album is 'Album1'. Contents corresponding to number '2' indicates that a title is 'Song2', an artist name is 'A', play time is '06:02' (6 minutes and 2 seconds), evaluation corresponds to three stars, a genre name is 'Genre1', a registration date is '1999/12/28 10:51:47' (10 o'clock 51 minute 47 second on Dec. 28, 1999), and an album is 'Album1'.

Contents corresponding to number '3' indicates that a title is 'Song3', an artist name is 'B' (hereinafter, also referred to as artist 'B'), play time is '06:03' (6 minutes and 3 seconds), evaluation corresponds to three stars, a genre name is 'Genre2', a registration date is '1999/12/28 10:57:22' (10 o'clock 57 minute 22 second on Dec. 28, 1999), and an album is 'Album2'. Contents corresponding to number '4' indicates that a title is 'Song4', an artist name is 'B', play time is '06:03' (6 minutes and 3 seconds), evaluation corresponds to three stars, a genre name is 'Genre1', a registration date is '1999/12/28 11:02:59' (11 o'clock 02 minute 59 second on Dec. 28, 1999), and an album is 'Album2'.

Contents corresponding to number '5' indicates that a title is 'Song5', an artist name is 'C' (hereinafter, also referred to as artist 'C'), play time is '05:23' (5 minutes and 23 seconds), evaluation corresponds to three stars, a genre name is 'Genre3', a registration date is '1999/12/28 11:07:58' (11 o'clock 07 minute 58 second on Dec. 28, 1999), and an album is 'Album3'. Contents corresponding to number '6' indicates that a title is 'Song6', an artist name is 'C', play time is '05:37' (5 minutes and 37 seconds), evaluation corresponds to three stars, a genre name is 'Genre3', a registration date is '1999/12/28 11:13:09' (11 o'clock 13 minute 9 second on Dec. 28, 1999), and an album is 'Album3'.

Contents corresponding to number '7' indicates that a title is 'Song7', an artist name is 'D' (hereinafter, also referred to as artist 'D'), play time is '05:27' (5 minutes and 27 seconds), evaluation corresponds to three stars, a genre name is 'Genre4', a registration date is '1999/12/28 11:18:11' (11 o'clock 18 minute 11 second on Dec. 28, 1999), and an album is 'Album4'. Contents corresponding to number '8' indicates that a title is 'Song8', an artist name is 'D', play time is '03:17' (3 minutes and 17 seconds), evaluation corresponds to three stars, a genre name is 'Genre4', a registration date is '1999/12/28 11:21:14' (11 o'clock 21 minute 14 second on Dec. 28, 1999), and an album is 'Album4'.

Contents corresponding to number '9' indicates that a title is 'Song9', an artist name is 'E' (hereinafter, also referred to as artist 'E'), play time is '04:53' (4 minutes and 53 seconds), evaluation corresponds to three stars, a genre name is 'Genre5', a registration date is '1999/12/28 11:25:46' (11 o'clock 25 minute 46 second on Dec. 28, 1999), and an album is 'Album5'. Contents corresponding to number '10' indicates that a title is 'Song10', an artist name is 'E', play time is '05:21' (5 minutes and 21 seconds), evaluation corresponds to three stars, a genre name is 'Genre5', a registration date is '1999/12/28 11:30:44' (11 o'clock 30 minute 44 second on Dec. 28, 1999), and an album is 'Album5'.

Contents corresponding to number '11' indicates that a title is 'Song11', an artist name is 'F' (hereinafter, also referred to as artist 'F'), play time is '05:26' (5 minutes and 26 seconds), evaluation corresponds to three stars, a genre name is 'Genre6', a registration date is '1999/12/28 11:35:47' (11 o'clock 35 minute 47 second on Dec. 28, 1999), and an album is 'Album6'. Contents corresponding to number '12' indicates that a title is 'Song12', an artist name is 'F', play time is '05:37' (5 minutes and 37 seconds), evaluation corresponds to three stars, a genre name is 'Genre6', a registration date is '1999/12/28 11:41:01' (11 o'clock 41 minute 1 second on Dec. 28, 1999), and an album is 'Album6'.

That is, contents files corresponding to contents of 'Song1' and 'Song2' of the artist A, contents of 'Song3' and 'Song4' of the artist B, contents of 'Song5' and ' Song6' of the artist C, contents of 'Song7' and 'Song8' of the artist D, contents of 'Song9' and 'Song10' of the artist E, contents of 'Song11' and 'Song12' of the artist F are stored in the contents file storage unit 59.

In addition, a playlist edit button 311 for changing a screen in order to edit a playlist is disposed at an upper right part of the contents list display screen 301. In addition, a selection button 312 for selecting contents and a release button 313 for releasing selection of contents are disposed at a lower left part of the contents list display screen 301. In addition, a CD information acquisition button 314 used to cause the contents server 3 or the like to acquire metadata of contents recorded in a CD through the network 2 is disposed at a lower right part of the contents list display screen 301.

Figure 23:
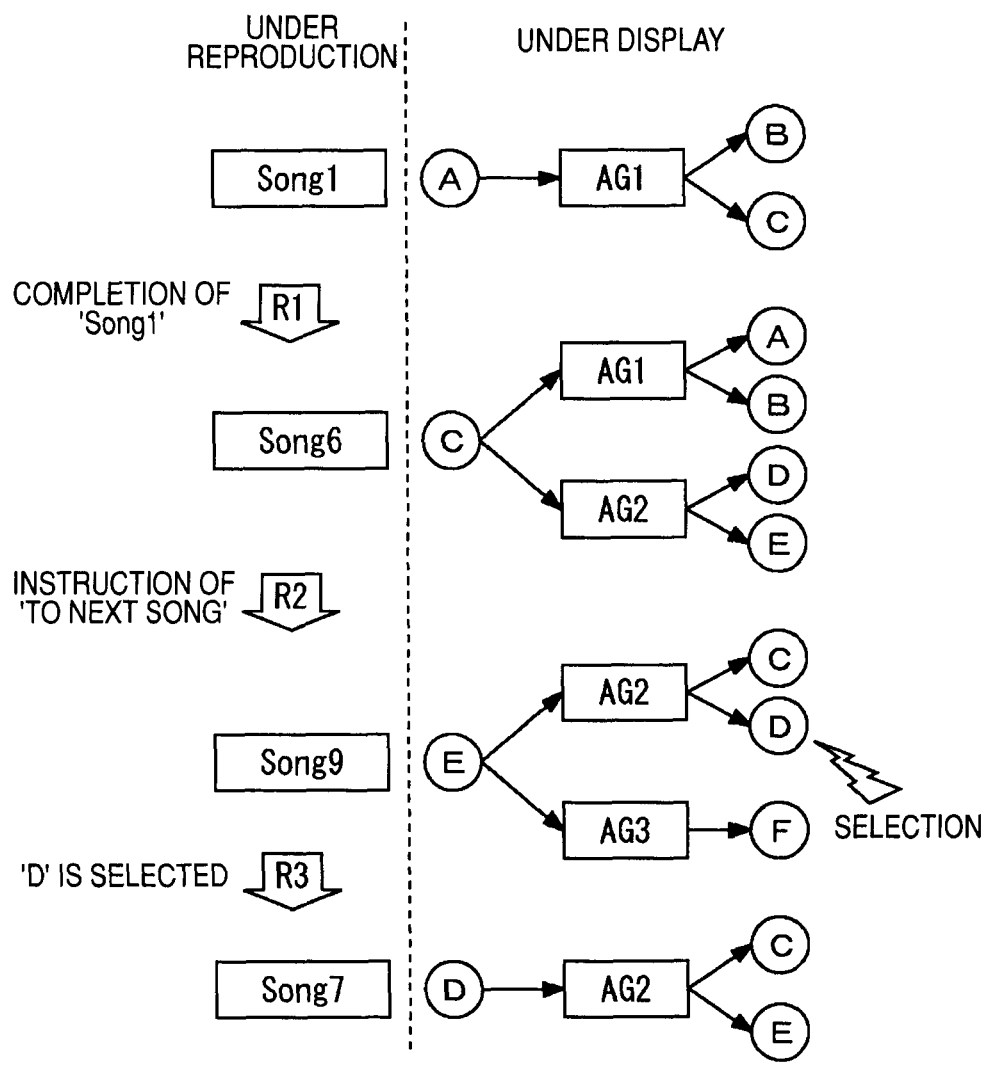
FIG. 23 is a view explaining artist link map reproduction processing.

Here, for example, a user operates the operation input unit 16 to select contents of the 'Song1' of the artist A and instruct reproduction of the artist link map. When an operation signal corresponding to the user's operation is input from the GUI control unit 51, the ALM reproduction control unit 153 controls the reproduction unit 56 to reproduce contents of the 'Song1' as shown in FIG. 23 and also controls the ALM management unit 54 to acquire artist link information of the artist A from the ALM database 57 having the configuration described in FIG. 21. Here, the artist link information of the artist A indicates that the artist A is included in the artist group AG1 and the other artists B and C, which are linked artists, are also included in the artist group AG1.

Figure 24:
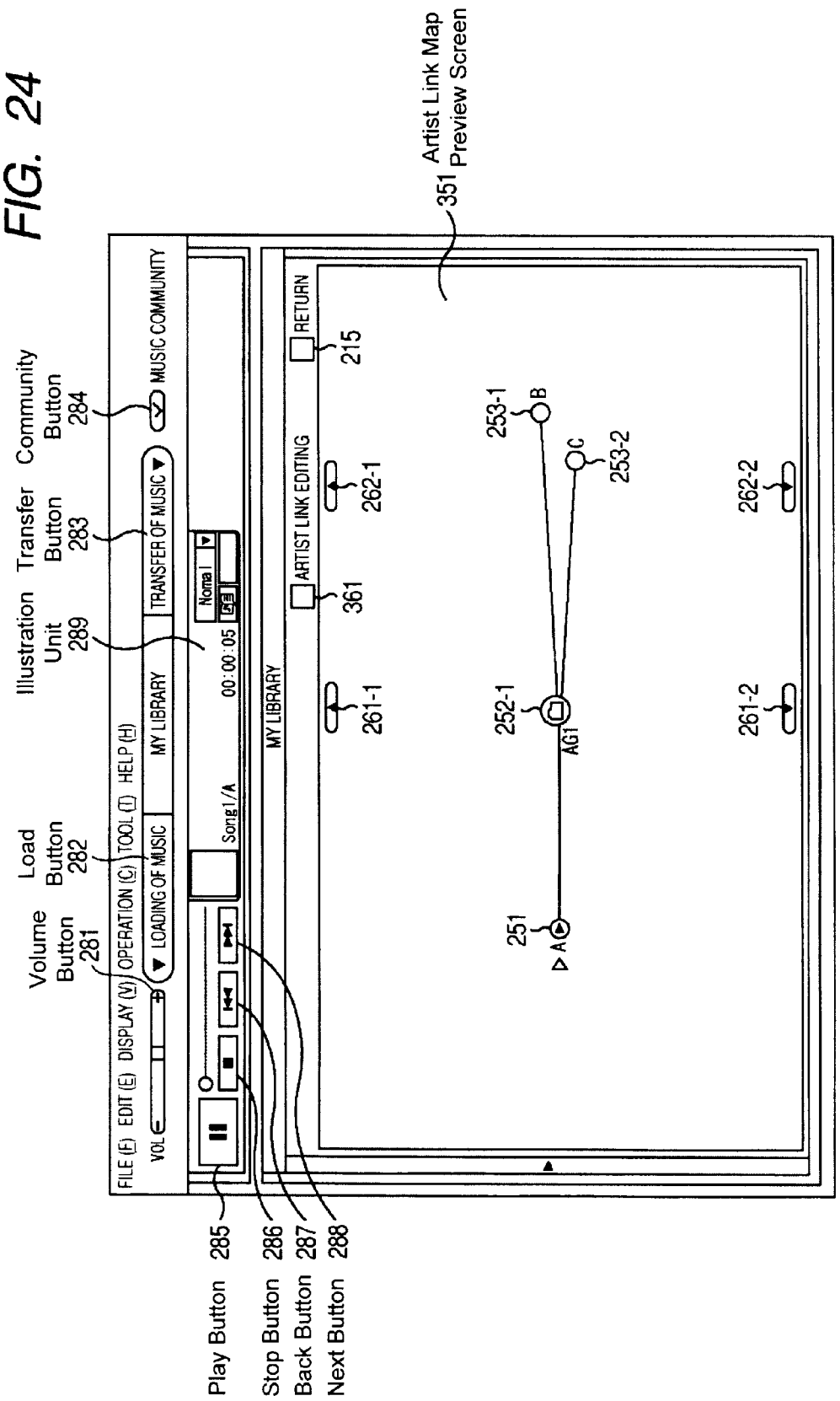
FIG. 24 is a view illustrating a display example of an artist link map preview screen in the case when an artist A is a basing-point artist.

Moreover, the ALM reproduction control unit 153 controls the GUI control unit 51 to display the acquired artist link information of the artist A on an artist link map preview screen 351 shown in FIG. 24.

FIG. 24 is a view illustrating an example of the configuration of an artist link map (ALM) preview screen on which artist link information is displayed to perform reproduction or the like.

The artist link map preview screen 351 has almost the same configuration as the artist link tree screen 213, on which artist link information of a basing-point artist is displayed in the tree format, of the artist link map editing screen 201 shown in FIG. 13. Accordingly, corresponding parts are denoted by the same reference numerals and an explanation thereof will be omitted because the parts basically have the same configuration.

That is, a basing-point icon 251 indicating a basing-point artist is displayed on a left side of the artist link map preview screen 351, a folder icon 252-1 indicating an artist group in which the basing-point artist is included is displayed on a middle part of the artist link map preview screen 351, and all associated icons 253-1 and 253-2 of other artists (that is, associated artists associated with the basing-point artist) included in the artist group of the folder icon 252-1 in which the basing-point artist is included are displayed. Unlike the artist link tree screen 213, it is difficult to perform editing for changing the order of the associated icons 253-1 and 253-2 on the artist link map preview screen 351. However, it is possible to configure the artist link map preview screen 351 such that the editing for changing the order of the associated icons 253-1 and 253-2 can be performed.

In the example shown in FIG. 24, contents of 'Song1' of the Artist A serving as a basing-point artist are reproduced, and accordingly, a triangular image indicating that the contents are being reproduced is displayed on the left side of the basing-point icon 251 and character A is attached to the basing-point icon 251 to be displayed. In addition, as the artist link information of the artist A serving as the basing-point artist, character of the artist group AG1 in which the artist A is included is attached to the folder icon 252-1 to be displayed, and characters of the associated artists B and C included in the artist group AG1 are attached to the associated icons 253-1 and 253-2 to be displayed.

In addition, an artist link edit button 361 for screen change to the artist link map editing screen 201 and a return button 215 for returning to a previous display screen are disposed at an upper part of the artist link map preview screen 351.

Referring back to FIG. 23, as indicated by arrow R1, when reproduction of contents of the 'Song1' is completed, the ALM reproduction control unit 153 selects any one (for example, associated artist C) of the associated artists B and C of the artist A from the contents management unit 55 and sets the select artist as a basing-point artist. Then, the ALM reproduction control unit 153 acquires information on contents of the basing-point artist and randomly selects one of the acquired contents. For example, contents of the 'Song6' of the artist C are selected among contents of the 'Song5' and 'Song6' of the artist C.

Moreover, the ALM reproduction control unit 153 controls the ALM management unit 54 to acquire artist link information of the artist C from the ALM database 57 having the configuration described in FIG. 21. Then, the ALM reproduction control unit 153 controls the reproduction unit 56 to reproduce contents of the 'Song6' of the artist C, which is a basing-point artist, and also controls the GUI control unit 51 to display the artist link information of the artist C, which has been acquired by the ALM management unit 54, on the artist link map preview screen 351 as shown in FIG. 25.

Referring to FIG. 21, the artist C is included in the artist group AG1 and the artist group AG2. In addition, the artists A and B that are associated artists are also included in the artist group AG1, and the artists D and E that are associated artists are also included in the artist group AG2.

Accordingly, the contents of the 'Song6' of the artist C that is a basing-point artist are output from the speaker 18. At the same time, on the artist link map preview screen 351 shown in FIG. 25, character of the artist C that is the basing-point artist is attached to the basing-point icon 251 to be displayed, character of the artist group AG1 in which the artist C is included is attached to the folder icon 252-1 to be displayed, character of the artist group AG2 in which the artist C is included is attached to the folder icon 252-2 to be displayed below the folder icon 252-1 in a somewhat small size, and characters of the associated artists A and B included in the artist group AG1 are respectively attached to associated icons 253-1 and 253-2 to be displayed.

Figure 25:
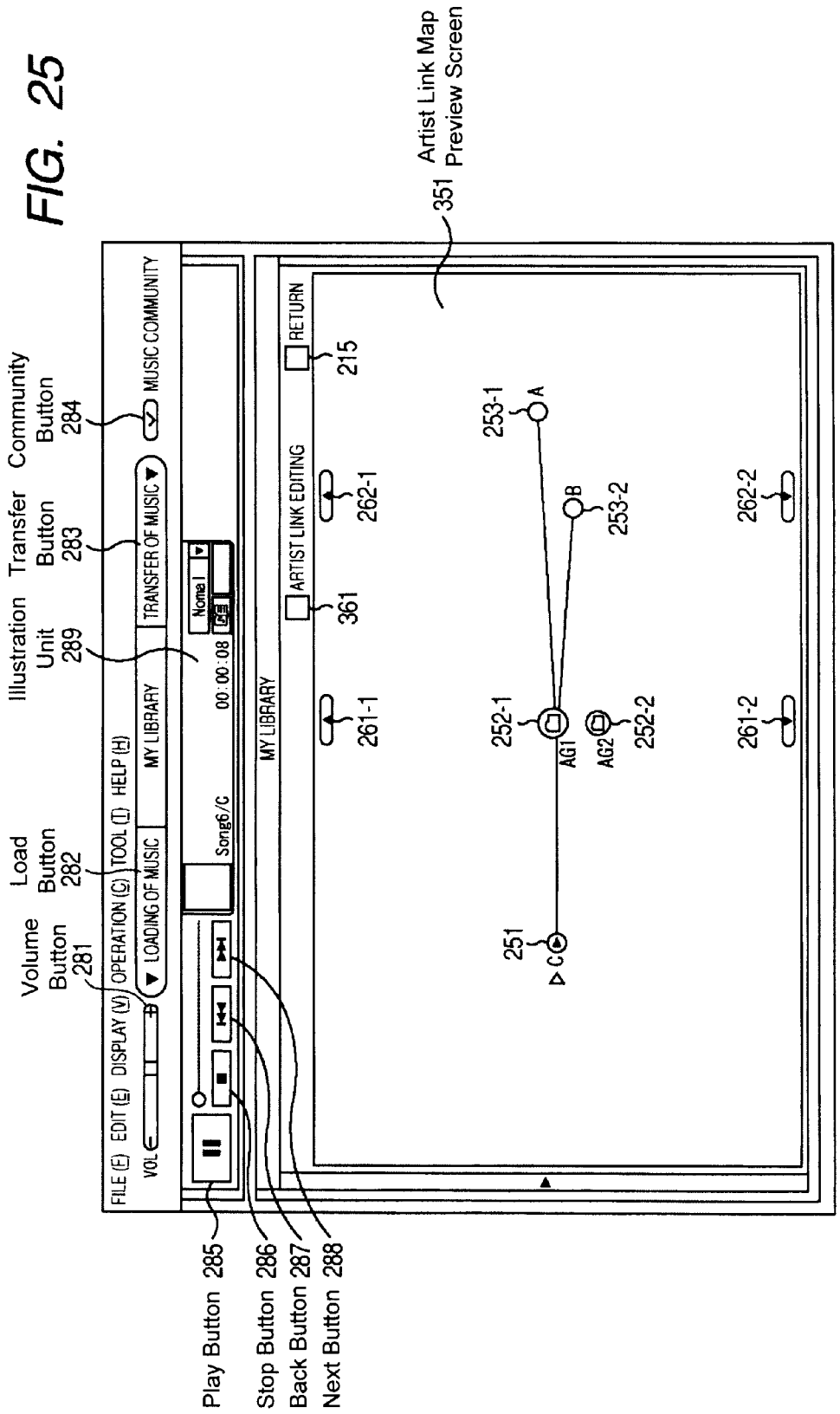
FIG. 25 is a view illustrating a display example of an artist link map preview screen in the case when an artist C is a basing-point artist.

In the example shown in FIG. 25, the artist group AG1 of the two artist groups AG1 and AG2 in which the artist C is included is an object to be displayed and associated artists included in the artist group AG1 are displayed. However, in the case when the artist group AG2 is an object to be displayed, characters of the associated artists D and E included in the artist group AG2 may be attached to the associated icons 253-1 and 253-2 to be displayed. In addition, associated artists of all artist groups may be displayed on the artist link map preview screen 351.

Referring back to FIG. 23, when a user operates the operation input unit 16 to instruct 'next song' through a 'to next' button 288 or a pull-down bar during reproduction of contents of the 'Song6', as indicated by arrow R2, the ALM reproduction control unit 153 selects one (for example, associated artist E) from the associated artists A and B and associated artist D and E of the artist C and sets the selected artist as a basing-point artist. Then, the ALM reproduction control unit 153 acquires information on contents of the basing-point artist and randomly selects one of the acquired contents. For example, contents of the 'Song9' of the artist E are selected among contents of the 'Song9' and 'Song10' of the artist E.

Figure 26:
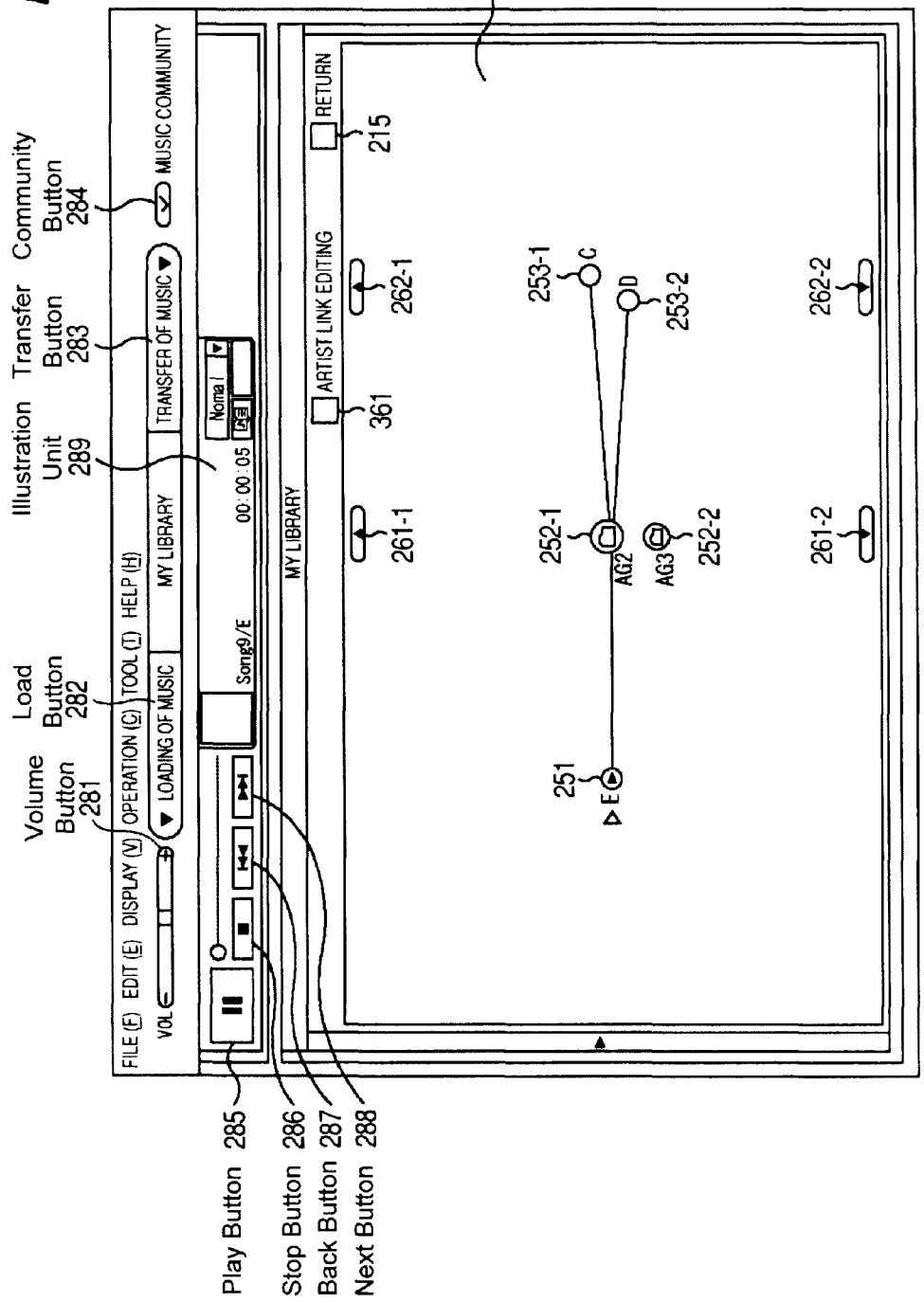
FIG. 26 is a view illustrating a display example of an artist link map preview screen in the case when an artist E is a basing-point artist.

Then, the ALM reproduction control unit 153 controls the ALM management unit 54 to acquire artist link information of the artist E from the ALM database 57 having the configuration described in FIG. 21. Then, the ALM reproduction control unit 153 controls the reproduction unit 56 to reproduce contents of the 'Song9' of the artist E, which is a basing-point artist, and also controls the GUI control unit 51 to display the artist link information of the artist E, which has been acquired by the ALM management unit 54, on the artist link map preview screen 351 as shown in FIG. 26.

Referring to FIG. 21, the artist E is included in the artist group AG2 and the artist group AG3. In addition, the artists C and D that are associated artists are also included in the artist group AG2, and the artist F that is an associated artist is also included in the artist group AG3.

Accordingly, the contents of the 'Song9' of the artist E that is a basing-point artist are output from the speaker 18. At the same time, on the artist link map preview screen 351 shown in FIG. 26, character of the artist E that is the basing-point artist is attached to the basing-point icon 251 to be displayed, character of the artist group AG2 in which the artist E is included is attached to the folder icon 252-1 to be displayed, character of the artist group AG3 in which the artist E is included is attached to a folder icon 252-2, which is disposed below the folder icon 252-1 so as to be a little smaller than the folder icon 252-1, to be displayed, and characters of the associated artists C and D included in the artist group AG2 are respectively attached to associated icons 253-1 and 253-2 to be displayed.

Referring back to FIG. 23, when a user operates the operation input unit 16 to select the associated icon 253-2, to which the character of the artist D displayed on the artist link map preview screen 351 is attached, during reproduction of contents of the 'Song9', the ALM reproduction control unit 153 sets the artist D corresponding to the user's instruction as a basing-point artist as indicated by arrow R3. Then, the ALM reproduction control unit 153 acquires information on contents of the basing-point artist and randomly selects one of the acquired contents. For example, contents of the 'Song7' of the artist D are selected among contents of the 'Song7' and 'Song8' of the artist D.

Figure 27:
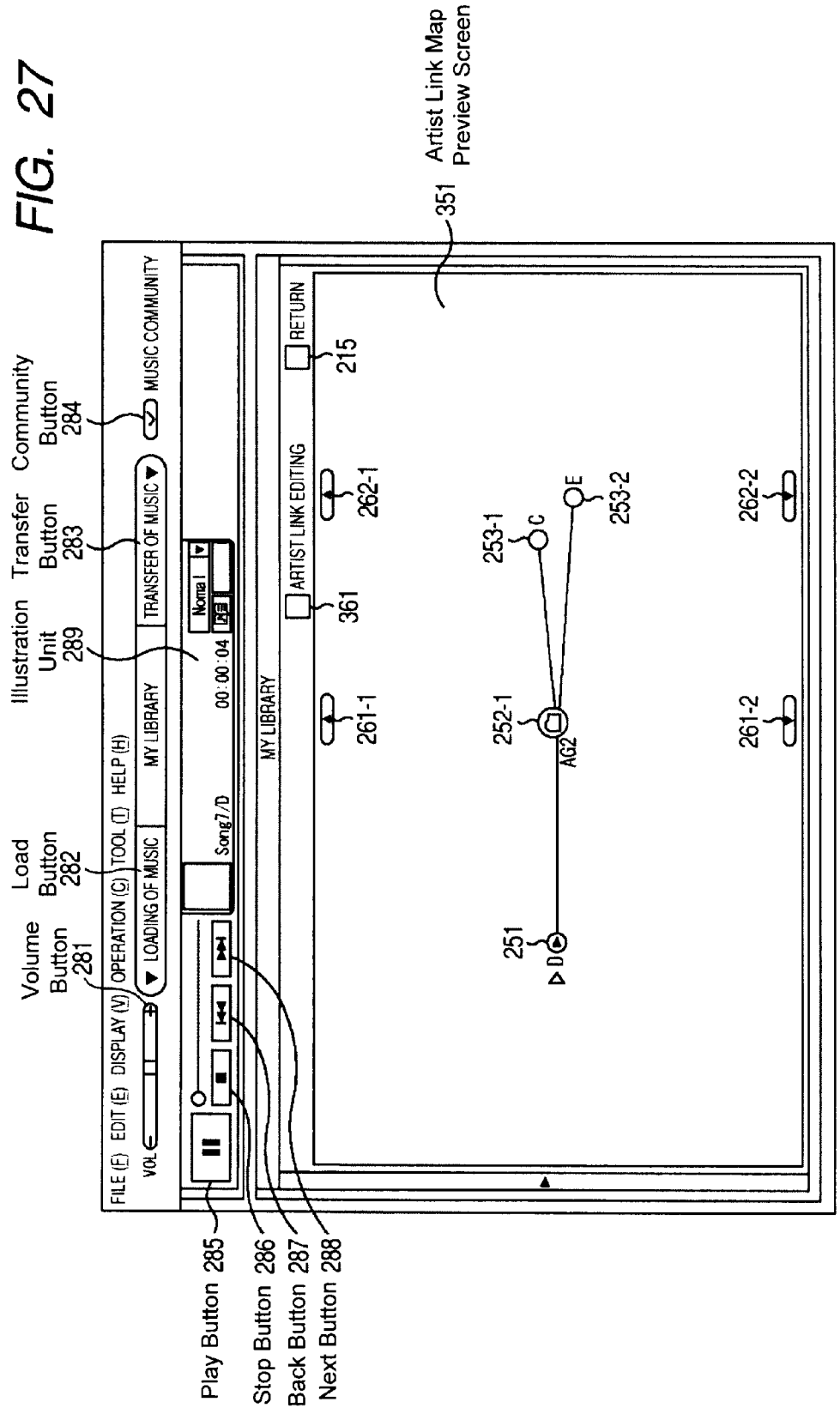
FIG. 27 is a view illustrating a display example of an artist link map preview screen in the case when an artist D is a basing-point artist.

Moreover, the ALM reproduction control unit 153 controls the ALM management unit 54 to acquire artist link information of the artist D from the ALM database 57 having the configuration described in FIG. 21. Then, the ALM reproduction control unit 153 controls the reproduction unit 56 to reproduce contents of the 'Song7' of the artist D, which is a basing-point artist, and also controls the GUI control unit 51 to display the artist link information of the artist D, which has been acquired by the ALM management unit 54, on the artist link map preview screen 351 as shown in FIG. 27.

Referring to FIG. 21, the artist D is included in the artist group AG2. In addition, the artists C and E that are associated artists are also included in the artist group AG2.

Accordingly, the contents of the 'Song7' of the artist D that is a basing-point artist are output from the speaker 18. At the same time, on the artist link map preview screen 351 shown in FIG. 27, character of the artist D that is the basing-point artist is attached to the basing-point icon 251 to be displayed, character of the artist group AG2 in which the artist E is included is attached to the folder icon 252-1 to be displayed, and characters of the associated artists C and E included in the artist group AG2 are respectively attached to associated icons 253-1 and 253-2 to be displayed.

Thereafter, in the case when there is a user's operation, reproduction is performed corresponding to the user's operation. On the other hand, in the case when there is no user's operation, if reproduction of contents is completed, a process in which a basing-point artist is selected from associated artists and contents of the basing-point artist are randomly selected to perform reproduction is repeatedly performed.

Thus, the shuffle reproduction is performed by using the artist link information. Specifically, a list of other associated artists included in an artist group in which an artist of contents being reproduced is included are acquired, a list of contents of a basing-point artist selected from the list of associated artists is acquired, and one content is randomly selected from the list to be then reproduced. Accordingly, it is possible to cause highly associated contents to be sequentially reproduced while causing contents to be unpredictably linked.

Figure 28:
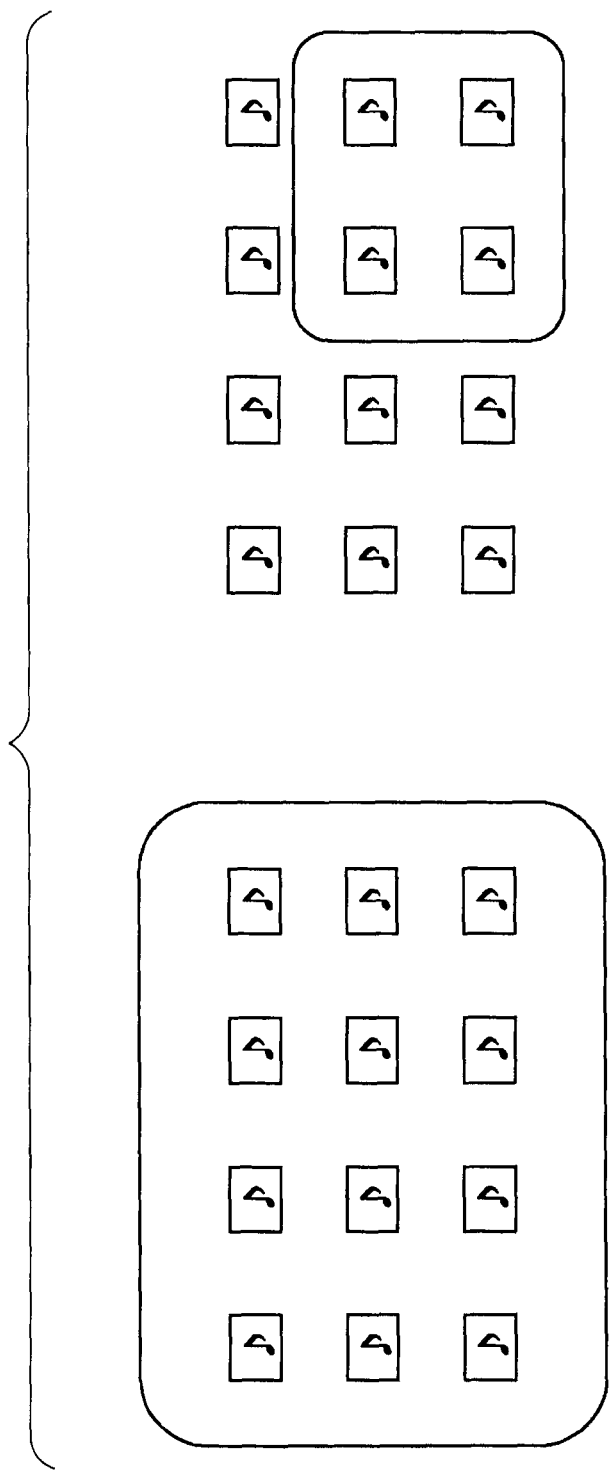
FIG. 28 is a view explaining known shuffle reproduction for the purpose of comparison with artist link map reproduction in an embodiment of the present invention.

That is, in the case of known shuffle reproduction, assuming that twelve contents (songs) are stored as shown in FIG. 28, contents randomly selected from the twelve contents were reproduced or contents randomly selected from contents (for example, four contents), which belong to a range classified according to a specific genre, artist, or album, of the twelve contents were reproduced.

Therefore, in the former case, it is possible to watch and listen to various contents, but the order of reproduction of the contents is completely random. As a result, there was little link among contents. In the latter case, shuffle reproduction can be performed using contents that are specifically linked, but objects to be selected are limited to a group of contents belonging to a range classified according to the specific genre, artist, or album. Accordingly, for example, in the case of performing reproduction for a long period of time, only contents having the same tendency are reproduced. As a result, there was no unpredictability.

Figure 29:
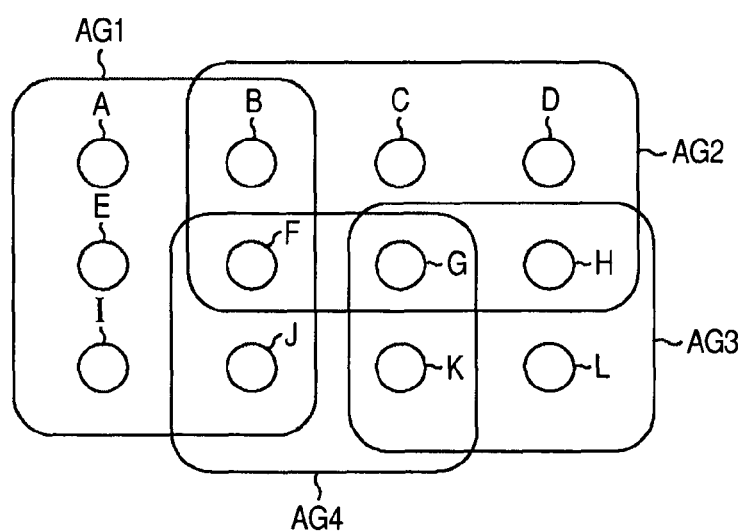
FIG. 29 is a view explaining effects of the artist link map reproduction in the embodiment of the present invention.

On the other hand, in the embodiment of the present invention, as shown in FIG. 29, an artist group AG1 in which artists A, B, E, F, I, and J are included, an artist group AG2 in which artists B, C, D, F, G, and H are included, an artist group AG3 in which artists G, H, K, and L are included, and an artist group AG4 in which artists F, G, J, and K are included, that is, a plural number of artist groups whose constituent member (artist) may be duplicated are set. In addition, a list of other associated artists included in an artist group in which an artist of contents being reproduced is included is acquired, a basing-point artist is acquired from the associated artists, and one content is randomly selected from the list of contents of the basing-point artist to be then sequentially reproduced. Accordingly, at the time of reproduction for a long period of time, contents are gradually linked to that having different tendency because associated contents (songs) are linked and then drift into contents having unpredictable tendency is performed. Accordingly, a user can enjoy the shuffle reproduction regardless of short time or long time.

Furthermore, a user can edit an artist group. Therefore, it is possible to grant 'meaning' or 'reason' with respect to a contents linking method in the shuffle reproduction. For example, starting from contents (song) of an artist AA, contents of an artist BB corresponding to tone similar to that of the contents of the artist AA are reproduced, then contents of an artist bb that is a member of the artist BB are reproduced, and then contents of an artist CC who participated in recording of the artist bb are reproduced. Moreover, contents of an artist DD are reproduced as a theme song of drama where the artist CC appeared, and then contents of an artist EE in which the artist DD is included are reproduced.

As described above, since a user can control the contents linking method to some extent and random reproduction is also realized, the user can enjoy combination of contents and contents linking method more than before.

Next, artist link map reproduction processing of the PC 1 will be described referring to a flow chart in FIG. 30.

In step S301, the ALM reproduction control unit 53 determines whether or not an artist has been selected by a user. If an operation signal corresponding to the user's operation of the operation input unit 16 is not input from the GUI control unit 51, the ALM reproduction control unit 53 determines that an artist is not selected by the user, proceeding to step S302.

In step S302, the ALM reproduction control unit 53 performs artist selection processing. The artist selection processing will be described later with reference to FIG. 31. To be short, in the artist selection processing, one artist is selected from artists within an associated artist list AList, which is obtained in previous step S307 to be described later, by the artist selection processing in step S302.

On the other hand, for example, a user operates the operation input unit 16 to select contents displayed on the contents list display screen 301 or the like, and accordingly, artist link map reproduction is instructed. Alternatively, the user operates the operation input unit 16 to select an associated artist, which is displayed on the artist link map preview screen 351, while contents of a basing-point artist are being reproduced. Then, since an operation signal corresponding to the user's operation of the operation input unit 16 is supplied from the GUI control unit 51, an artist corresponding to the contents or an artist is selected by the user in step S301. Then, the process proceeds to step S303 skipping step S302.

In step S303, the ALM reproduction control unit 53 sets an artist selected in step S301 or step S302 as a basing-point artist. Then, in step S304, the ALM reproduction control unit 53 controls the contents management unit 55 to perform a process of calculating a contents list of the basing-point artist. The contents list calculation processing will be described later with reference to FIG. 32. To be short, in the contents list calculation processing in step S303, a contents ID list TList of the basing-point artist is calculated.

In step S305, the ALM reproduction control unit 53 randomly selects one content from the contents ID list TList of the basing-point artist. Then, in step S306, the ALM reproduction control unit 53 sets a reproduced flag of the contents information database 58 of the selected content to '1'. In addition, the reproduced flag is a flag reset whenever artist link map reproduction is completed and, for example, is used in step S305. That is, in step S305, it is possible to select contents excluding a content whose reproduction flag is '1'. Thus, it is possible to prevent the same contents from being repeatedly reproduced in one artist link map reproduction.

In step S307, the ALM reproduction control unit 53 controls the ALM management unit 54 to perform associated artist list creation processing for obtaining artist link information of the basing-point artist. The artist link information of the basing-point artist will be described later with reference to FIG. 33. To be short, in the associated artist list creation processing in step S302, an artist group list in which the basing-point artist is included is obtained, and an artist list AList included in each artist group is created. The artist group list is used in the artist selection processing in subsequent step S302, and an artist group list and artist link information including the artist group list are used in step S309 to be described later.

In step S308, the ALM reproduction control unit 53 controls the reproduction unit 56 to reproduce contents, which are selected in step S305, of the basing-point artist. Then, in step S309, the ALM reproduction control unit 53 causes the GUI control unit 51 to redraw the artist link map preview screen 351 on the basis of artist link information including the artist list AList and the artist group list of the basing-point artist. Thus, the artist link map preview screen 351 redrawn corresponding to the basing-point artist is display on the display unit 17.

In step S310, the ALM reproduction control unit 53 determines whether or not completion of the artist link map reproduction has been instructed by the user. If it is determined that the completion of the artist link map reproduction has been instructed, the artist link map reproduction processing is completed.

If it is determined that the completion of the artist link map reproduction has not been instructed in step S310, the process proceeds to step S311. In step S311, the ALM reproduction control unit 53 determines whether or not the reproduction of contents being reproduced has been completed or whether or not the 'next' button 288 has been pressed by the user to instruct the 'next'. In step S311, if it is determined that the reproduction of contents being reproduced is not completed yet and the 'next' is not also instructed by the user, the process returns to step S310 to then repeat the subsequent processes.

In step S311, if it is determined that the reproduction of contents being reproduced has been completed or the 'next' has been instructed by the user, the process returns to step S301 to then repeat the subsequent processes.

Next, the artist selection processing in step S302 of FIG. 30 will be described referring to a flow chart in FIG. 31.

In step S331, the ALM reproduction control unit 53 obtains the number of contents, which have been registered in the contents information database 58 (my library), of each of the artists within the associated artist list AList obtained in the process of the previous step S307. Even in this case, when a reproduced flag is used in step S305 of FIG. 30, contents whose reproduced flag is '1' are not counted.

In step S332, the ALM reproduction control unit 53 excludes an artist, of which number of contents is zero, from the associated artist list AList. Then, in step S333, the ALM reproduction control unit 53 determines whether or not the associated artist list AList is empty. If it is determined that the associated artist list AList is not empty in step S333, the process proceeds to step S334. In step S334, the ALM reproduction control unit 53 randomly selects one content from the associated artist list AList. At this time, it is possible to preferentially select an artist corresponding to high order information of the artist link correspondence table 83 in FIG. 5.

On the other hand, in the case that the associated artist list AList is empty in the excluding process in step S332, it is determined in step S333 that the associated artist list AList is empty, proceeding to step S335.

In step S335, the ALM reproduction control unit 53 randomly selects one artist from artists registered in the contents information database 58 (my library).

Figure 30:
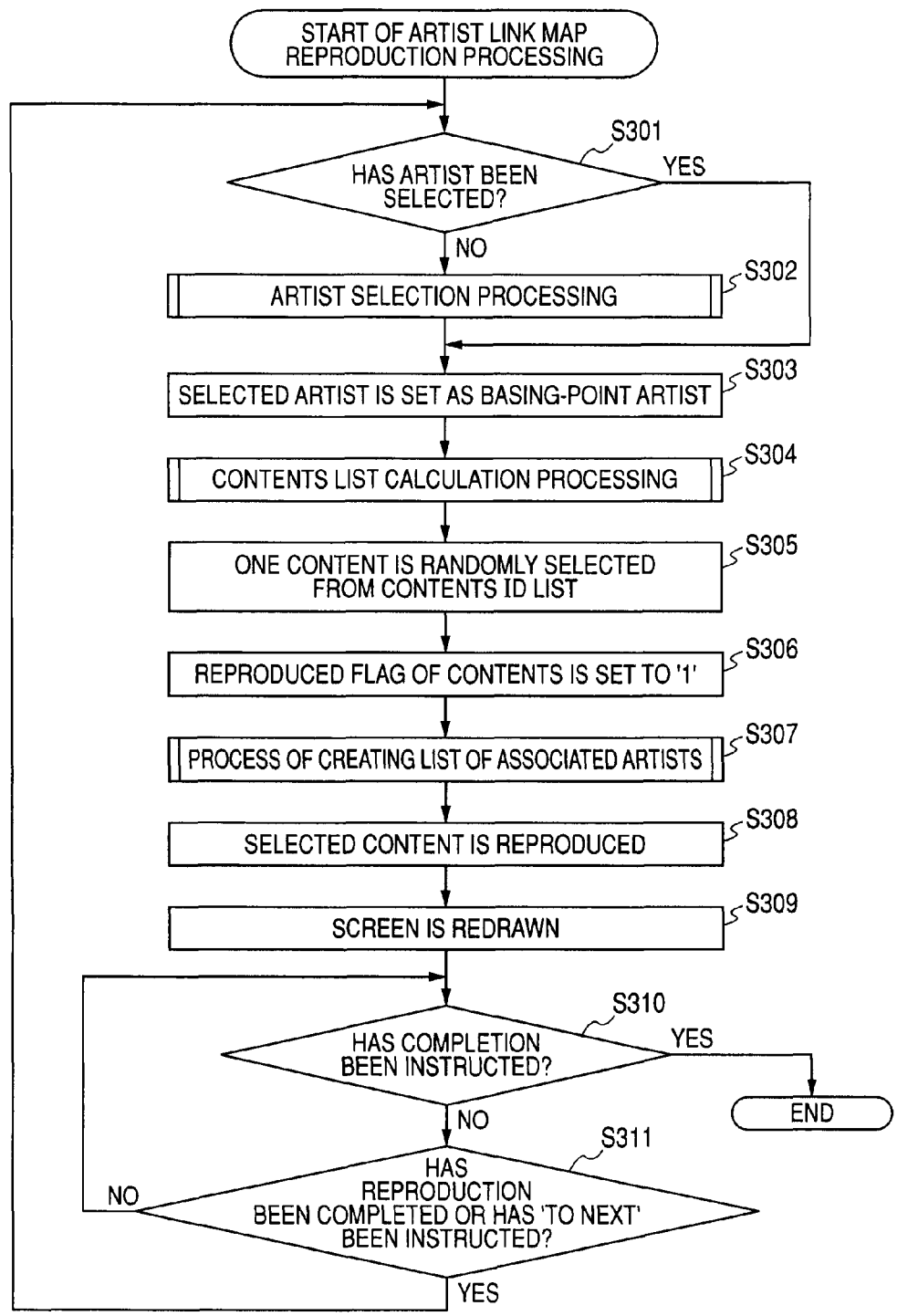
FIG. 30 is a flow chart explaining artist link map reproduction processing in a PC 1 shown in FIG. 1.
Figure 31:
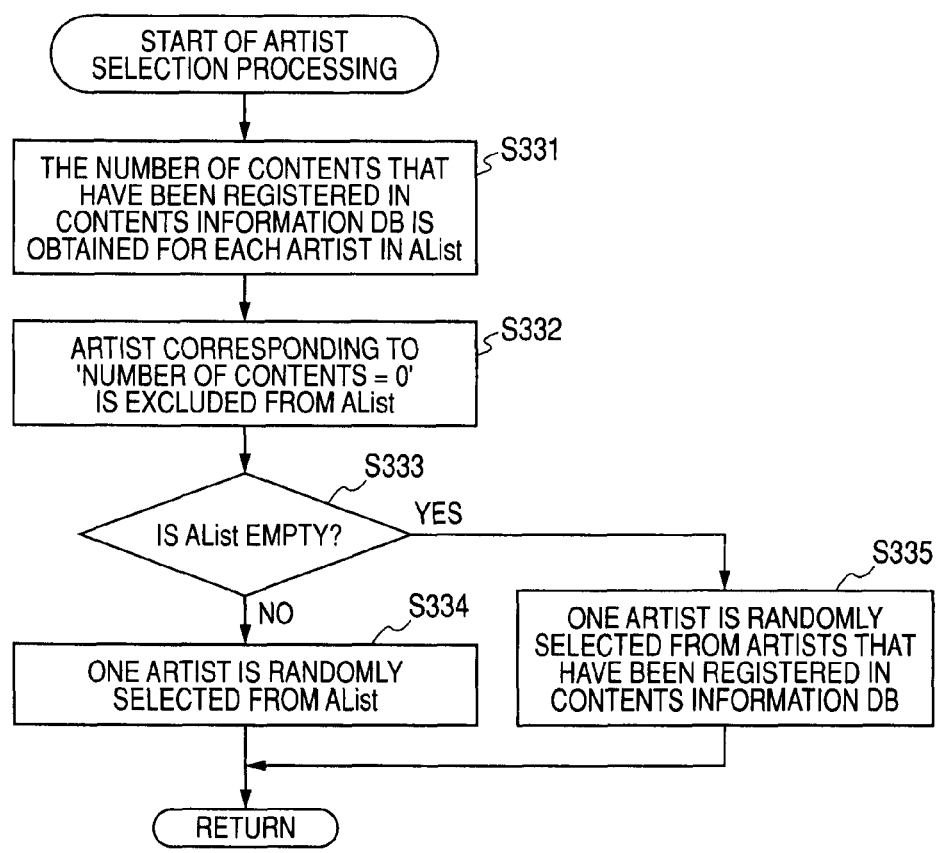
FIG. 31 is a flow chart explaining artist selection processing in step S302 shown in FIG. 30.

Then, the process returns to step S302 in FIG. 30, and the artist selected in step S334 or S335 is set as a basing-point artist in next step S303.

As described above, artists set as associated artists are randomly preferentially selected. However, in the case when contents of the associated artists are not registered in the contents information database 58 (my library) or when all contents of the associated artists have been reproduced once, an artist registered in the contents information database 58 (my library) is randomly selected. In addition, in the above cases, it may be possible to terminate the artist link map reproduction or to repeat the artist link map reproduction by resetting the reproduced flag.

Figure 32:
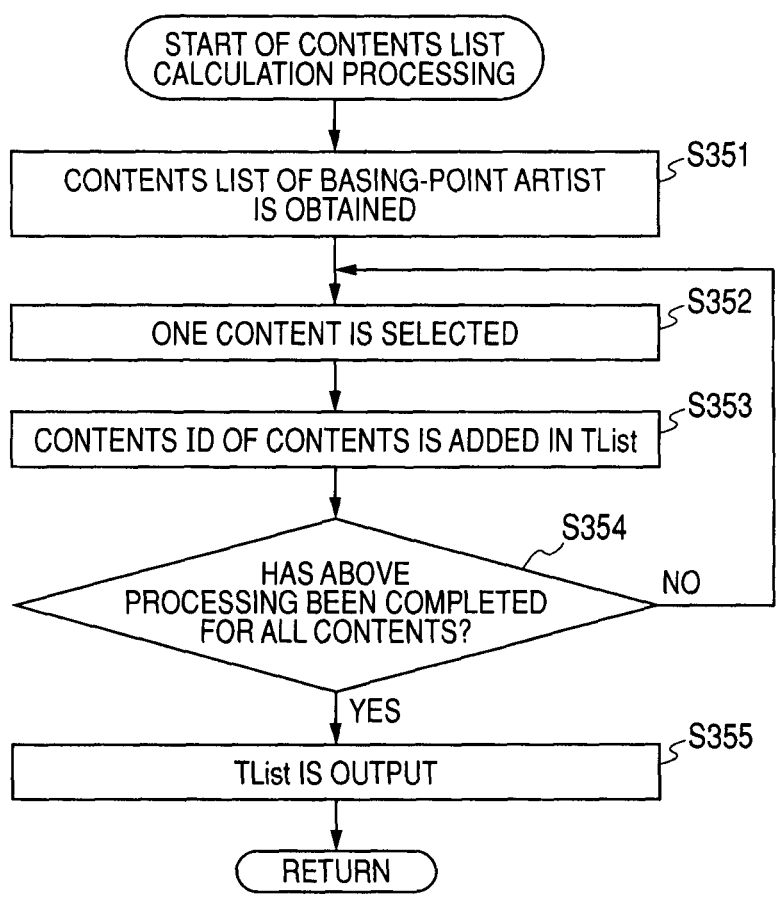
FIG. 32 is a flow chart explaining contents list calculation processing in step S304 shown in FIG. 30.

Next, the contents list calculation processing in step S304 of FIG. 30 will be described referring to a flow chart in FIG. 32.

In step S351, the contents management unit 55 obtains a contents list of a basing-point artist from the contents information database 58 under the control of the ALM reproduction control unit 53. In step S352, the contents management unit 55 selects one content from the contents list. Then, in step S353, the contents management unit 55 adds a content ID (TID) of the contents in a contents ID list TList.

In step S354, the contents management unit 55 determines whether or not the above process has been completed for all contents. If it is determined that the above process has not been completed for all contents, the process returns to step S352 to then repeat the subsequent processes. In addition, if it is determined that the above process has been completed for all contents in step S354, the process proceeds to step S355. In step S355, the contents management unit 55 outputs the contents ID list TList to the ALM reproduction control unit 53 and completes the contents list calculation processing, returning to step S304 in FIG. 30.

Figure 33:
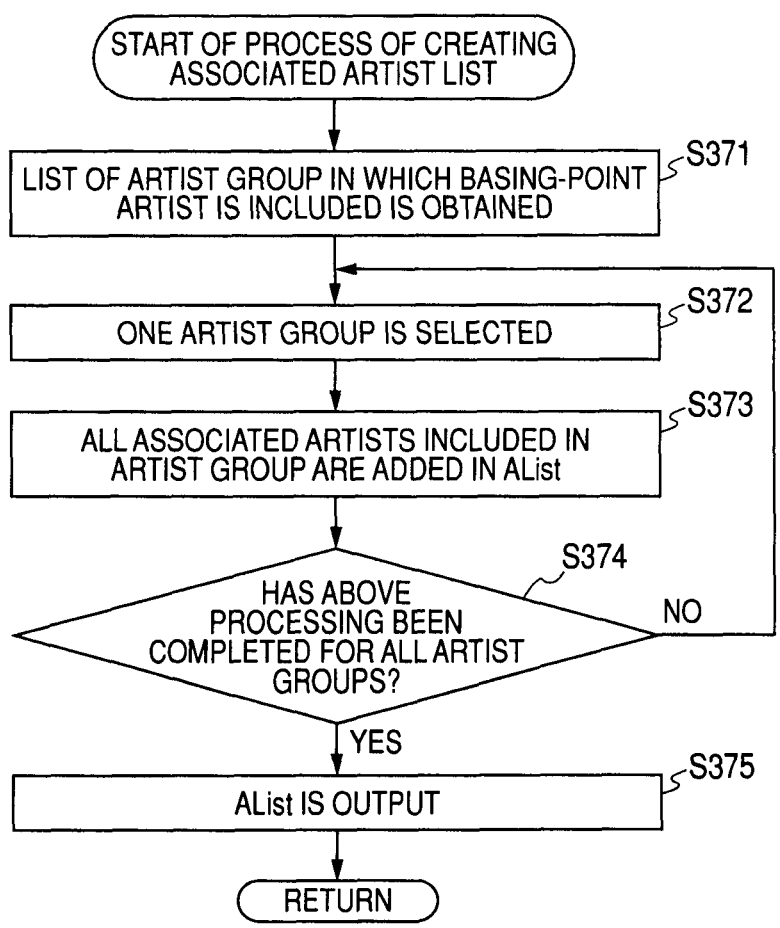
FIG. 33 is a flow chart explaining associated artist list creation processing in step S307 shown in FIG. 30.

Next, the associated artist list creation processing in step S307 of FIG. 30 will be described referring to a flow chart in FIG. 33.

In step S371, the ALM management unit 54 obtains an artist group list in which a basing-point artist is included. In step S372, the ALM management unit 54 selects one artist group from the obtained artist list. Then, in step S373, the ALM management unit 54 adds all associated artists, who are included in the selected artist group, in the associated artist list AList.

In step S374, the ALM management unit 54 determines whether or not the above process has been completed for all artist groups. If it is determined that the above process has not been completed for all artist groups, the process returns to step S372 to then repeat the subsequent processes.

If it is determined that the above process has been completed for all artist groups in step S374, the process proceeds to step S375. In step S375, the ALM management unit 54 outputs the associated artist ID list AList to the ALM reproduction control unit 53 and completes the associated artist list creation processing, returning to step S307 in FIG. 30.

As described above, in selecting contents to be reproduced next, an associated artist associated with an artist of contents being reproduced (that is, included in the same artist group) is preferentially selected and selection of a basing-point artist, selection of contents, and the like are randomly performed. Accordingly, it is possible to cause contents that are reproduced to be linked and to drift into contents having unpredictable tendency. Therefore, the user can enjoy combination of contents and contents linking method more than before.

Moreover, contents reproduced once are not repeatedly reproduced by using a reproduced flag, it is possible to watch and listen to fresh contents all the time.

Figure 34:
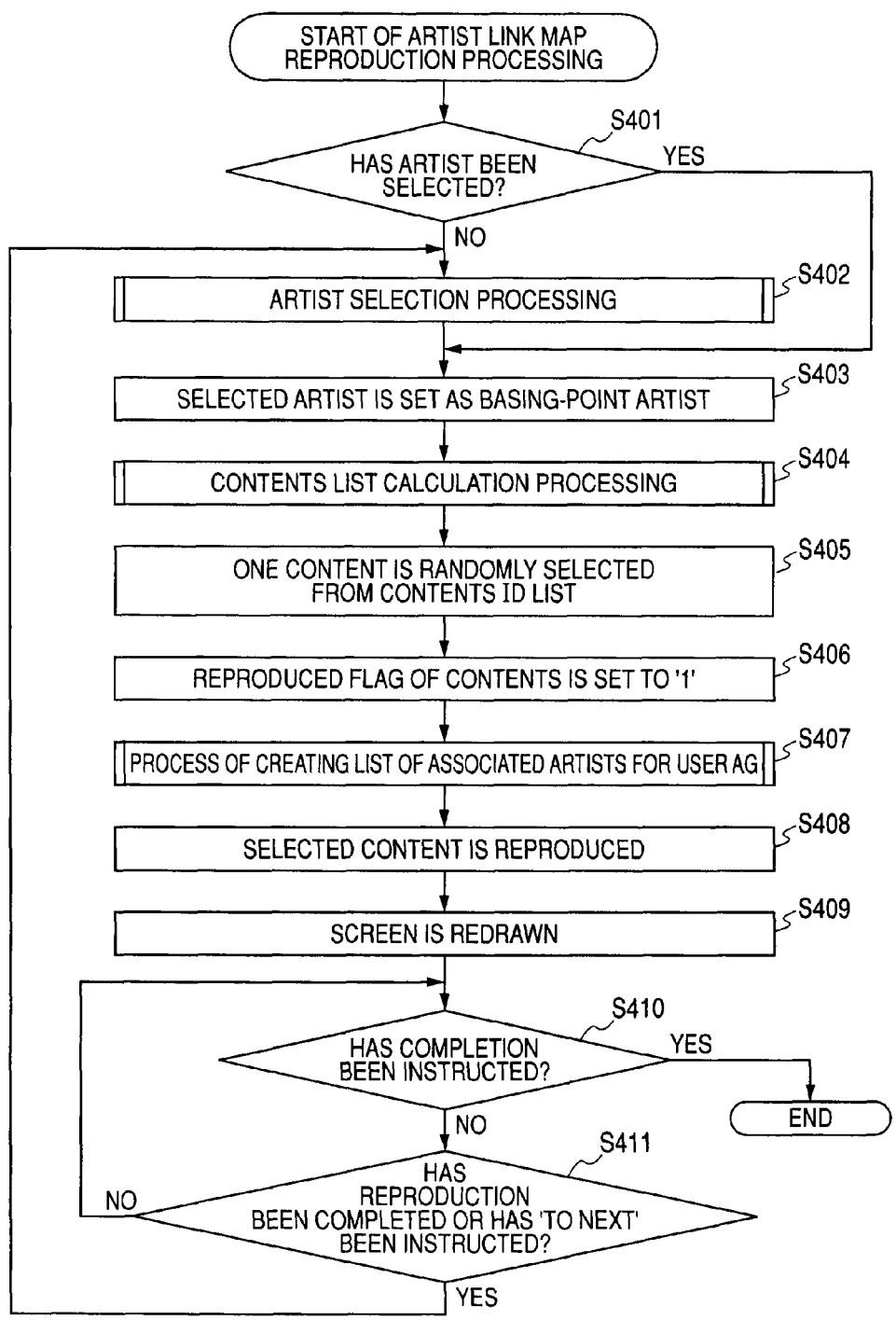
FIG. 34 is a flow chart explaining another example of the artist link map reproduction processing in the PC 1 shown in FIG. 1.

Next, it will be described about another example of artist link map reproduction processing of the PC 1 referring to a flow chart in FIG. 34. In addition, since step S401, steps S403 to S406, and steps S408 to S411 in FIG. 34 are basically the same as step S301, steps S303 to S306, and steps S308 to S311 in FIG. 30, detailed explanation thereof will be omitted to avoid repetition of the explanation.

In step S401, the ALM reproduction control unit 53 determines whether or not an artist has been selected by a user. If an operation signal corresponding to the user's operation of the operation input unit 16 is not input from the GUI control unit 51, the ALM reproduction control unit 53 determines that an artist is not selected by the user, proceeding to step S402.

In step S402, the ALM reproduction control unit 53 performs artist selection processing. The artist selection processing will be described later with reference to FIG. 35. To be short, in the artist selection processing, one artist is selected from artists within the associated artist list AList, which is obtained for an artist group created by the user in previous step S407 to be described later, by the artist selection processing in step S402.

On the other hand, if it is determined that an artist has been selected by the user in step S401, the process proceeds to step S403 skipping step S402. In step S403, the ALM reproduction control unit 53 sets an artist selected in step S401 or step S402 as abasing-point artist. Then, in step S404, the ALM reproduction control unit 53 controls the contents management unit 55 to perform the process of calculating a contents list of a basing-point artist described above with reference to FIG. 32. By the contents list calculation processing, the contents ID list TList of the basing-point artist is calculated.

In step S405, the ALM reproduction control unit 53 randomly selects one content from the contents ID list TList of the basing-point artist. Then, in step S406, the ALM reproduction control unit 53 sets a reproduced flag of the contents information database 58 of the selected content to '1'.

In step S407, the ALM reproduction control unit 53 controls the ALM management unit 54 to perform associated artist list creation processing for the artist group (user AG) created by the user in order to obtain artist link information of the basing-point artist.

The associated artist list creation processing is the same as the associated artist list creation processing described above with reference to FIG. 33 except that an artist group, of which associated artists are to be obtained, is limited to an artist group (that is, artist group whose attribute information in the artist group list table 81 of FIG. 4 is 'user') created (edited) by the 'user'. Accordingly, a detailed explanation thereof will be omitted to avoid repetition of the explanation. In addition, as for an artist group whose attribute information is 'user', only a user (user A) of the PC 1 may be included or a friend (user B) may be included therein.

Therefore, in the associated artist list creation processing for the user AG in step S407, an artist group list in which a basing-point artist is included is obtained from the artist group created by the 'user' and the artist list AList included in each artist group is created. The artist group list is used in the artist selection processing in subsequent step S402, and an artist group list and artist link information including the artist group list are used in step S409 to be described later.

In step S408, the ALM reproduction control unit 53 controls the reproduction unit 56 to reproduce contents, which are selected in step S405, of the basing-point artist. Then, in step S409, the ALM reproduction control unit 53 causes the GUI control unit 51 to redraw the artist link map preview screen 351 on the basis of artist link information including the artist list AList and the artist group list of the basing-point artist. Thus, the artist link map preview screen 351 redrawn corresponding to the basing-point artist is display on the display unit 17.

In step S410, the ALM reproduction control unit 53 determines whether or not completion of the artist link map reproduction has been instructed by the user. If it is determined that the completion of the artist link map reproduction has been instructed, the artist link map reproduction processing is completed.

If it is determined that the completion of the artist link map reproduction has not been instructed in step S410, the process proceeds to step S411. In step S411, the ALM reproduction control unit 53 determines whether or not the reproduction of contents being reproduced has been completed or whether or not the 'next' has been pressed by the user. In step S411, if it is determined that the reproduction of contents being reproduced is not completed yet and the 'next' is not also instructed by the user, the process returns to step S410 to then repeat the subsequent processes.

In step S411, if it is determined that the reproduction of contents being reproduced has been completed or the 'next' has been instructed by the user, the process returns to step S401 to then repeat the subsequent processes.

Figure 35:
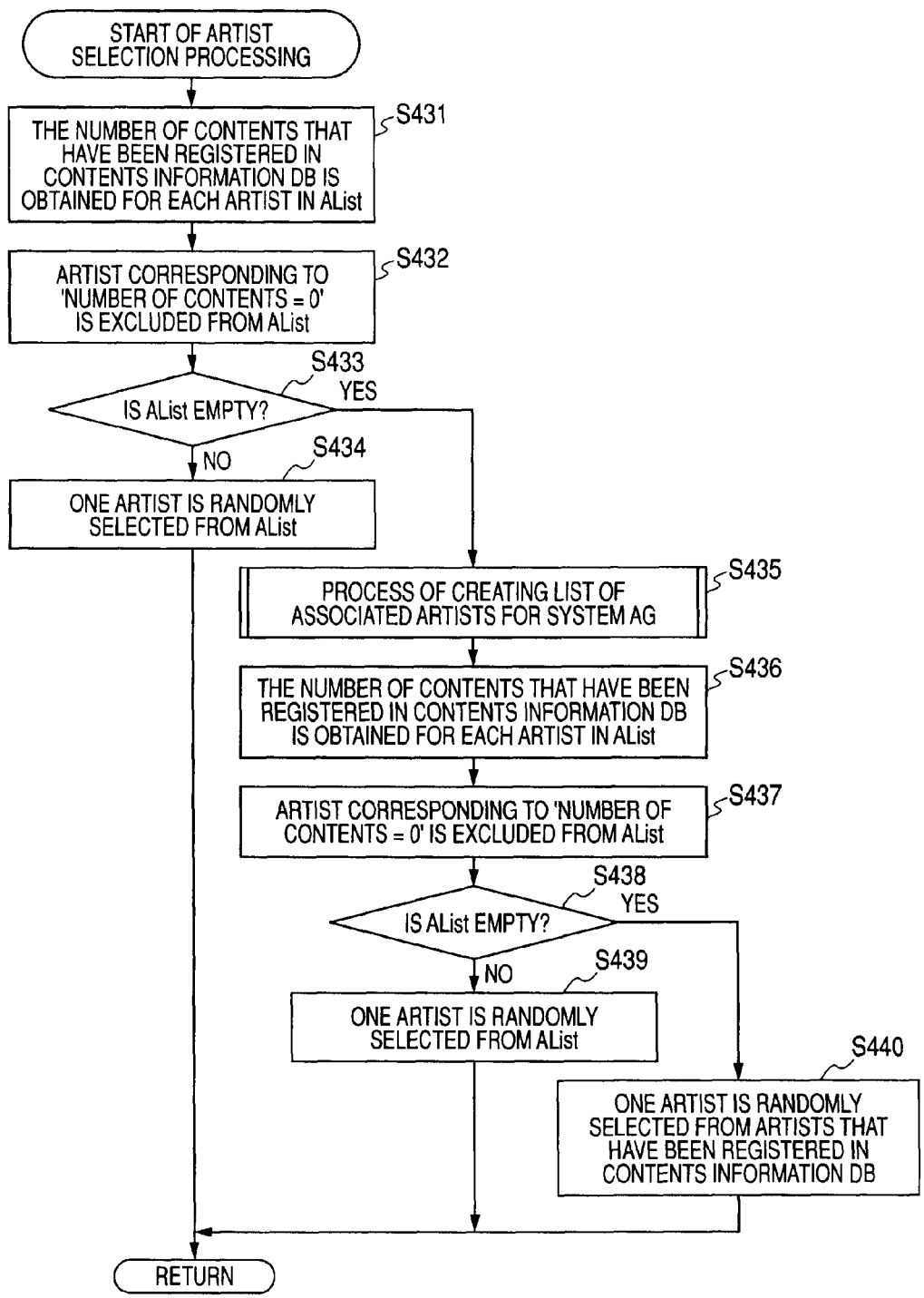
FIG. 35 is a flow chart explaining artist selection processing in step S402 shown in FIG. 34.

Next, the artist selection processing in step S402 of FIG. 34 will be described in detail with reference to a flow chart in FIG. 35.

In step S431, the ALM reproduction control unit 53 obtains the number of contents, which have been registered in the contents information database 58 (my library), of each of the artists within the associated artist list AList obtained for the artist group created by the user in the process of the previous step S407.

In step S432, the ALM reproduction control unit 53 excludes an artist, of which number of contents is zero, from the associated artist list AList. Then, in step S433, the ALM reproduction control unit 53 determines whether or not the associated artist list AList is empty. If it is determined that the associated artist list AList is not empty in step S433, the process proceeds to step S434. In step S434, the ALM reproduction control unit 53 randomly selects one content from the associated artist list AList.

On the other hand, in the case that the associated artist list AList is empty in the excluding process in step S432, it is determined in step S433 that the associated artist list AList is empty, proceeding to step S435.

In step S435, the ALM reproduction control unit 53 controls the ALM management unit 54 to perform associated artist list creation processing for the artist group (system AG) created by the 'system' in order to obtain artist link information of the basing-point artist with respect to an artist group that the 'system' has created on the basis of metadata.

The associated artist list creation processing is the same as the associated artist list creation processing described above with reference to FIG. 33 except that an artist group, of which associated artists are to be obtained, is limited to an artist group (that is, artist group whose attribute information in the artist group list table 81 of FIG. 4 is 'system') created by the 'system'. Accordingly, a detailed explanation thereof will be omitted to avoid repetition of the explanation.

Therefore, in the associated artist list creation processing for the system AG in step S435, an artist group list in which a basing-point artist is included is obtained from the artist group created by the 'system' and the artist list AList included in each artist group is created.

In step S436, the ALM reproduction control unit 53 obtains the number of contents, which have been registered in the contents information database 58, of each of the artists within the associated artist list AList created with respect to the system AG in step S435.

In step S437, the ALM reproduction control unit 53 excludes an artist, of which number of contents is zero, from the associated artist list AList. Then, in step S438, the ALM reproduction control unit 53 determines whether or not the associated artist list AList is empty. If it is determined that the associated artist list AList is not empty in step S438, the process proceeds to step S439. In step S439, the ALM reproduction control unit 53 randomly selects one content from the associated artist list AList.

On the other hand, in the case that the associated artist list AList is empty in the excluding process in step S437, it is determined in step S438 that the associated artist list AList is empty, proceeding to step S440. In step S440, the ALM reproduction control unit 53 randomly selects one artist from artists registered in the contents information database 58 (my library).

Then, the process returns to step S402 in FIG. 30, and the artist selected in step S434, S439, or S440 is set as a basing-point artist in next step S403.

As described above, first, an artist group in which a basing-point artist is included and an associated artist are obtained and randomly selected preferentially for an artist group created (or edited) by the user. However, in the case when contents of the associated artist are not registered, an artist group in which the basing-point artist is included and an associated artist included in the artist group are obtained and randomly selected preferentially for an artist group created on the basis of metadata by the 'system'.

Thus, contents to be reproduced next are selected such that link created on the basis of user s intention has priority. Accordingly, since link edited by the user is easily reflected, the user can enjoy the contents more than before.

In addition, the reproduction order of contents may be stored, for example, as a playlist in the contents information database 58. Thus, if the reproduction order of contents is satisfied, the contents may be reproduced in the same reproduction order later. Moreover, the playlist stored in the PC 1 may be transferred to the PD 7, as described above with reference to FIG. 9, such that it is possible to enjoy reproduction of the contents in the same reproduction order in the PD 7.

Furthermore, in addition to transferring the stored playlist while performing reproduction in the PC 1, for example, contents randomly selected by referring to artist link information may be transferred to the PD 7.

Figure 36:
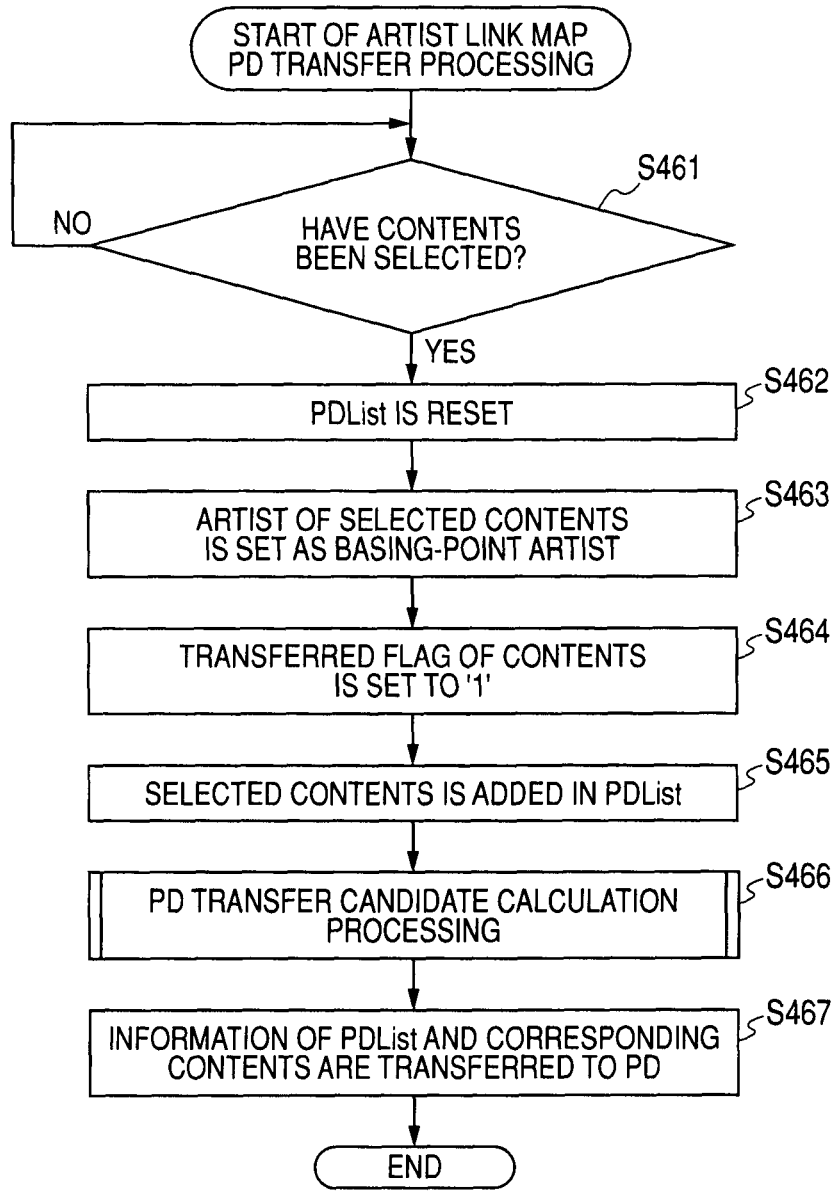
FIG. 36 is a flow chart explaining artist link map PD transfer processing in the PC 1 shown in FIG. 1.

Next, artist link map PD transfer processing of the PC 1 will be described referring to a flow chart in FIG. 36.

The PD 7 is connected to the PC 1 through a USB cable (not shown). Accordingly, for example, a user operates the operation input unit 16 to select contents displayed on the contents list display screen 301 or the like. In addition, for example, the user presses the transfer button 283 to instruct the artist link map PD transfer. The GUI control unit 51 of the PC 1 is input with a user's operation through the operation input unit 16 and supplies an operation signal corresponding to the operation to the PD transfer control unit 60.

In step S461, the PD transfer control unit 60 waits until contents are selected, and then the process proceeds to step S462 if it is determined that the contents have been selected on the basis of the operation signal from the GUI control unit 51. In step S462, the PD transfer control unit 60 resets a PD transfer candidate list PDList stored in a built-in memory (not shown).

In step S463, the PD transfer control unit 60 controls the ALM management unit 54 to acquire information on an artist of contents selected by the user and sets the artist of the contents selected by the user as a basing-point artist. Then, in step S464, the PD transfer control unit 60 sets a transferred flag of contents selected by the user to '1'. The transferred flag is equivalent to a reproduced flag and is reset whenever artist link map PD transfer processing is completed. In one artist link map PD transfer, it is possible to cause the same contents not to be repeatedly selected.

In step S465, the PD transfer control unit 60 controls the contents management unit 55 to acquire a contents ID of the contents selected by the user and add the contents ID of the contents selected by the user in the PD transfer candidate list PDList.

In step S466, the PD transfer control unit 60 controls the ALM management unit 54 and the contents management unit 55 to perform PD transfer candidate calculation processing. The PD transfer candidate calculation processing will be described later with reference to FIG. 37. To be short, in the PD transfer candidate calculation processing in step S466, an associated artist of the basing-point artist is obtained, one content randomly selected from a contents list of the associated artist is added in the PD transfer candidate list PDList, and the PD transfer candidate list PDList is output to the PD transfer control unit 60.

Then, in step S467, the PD transfer control unit 60 controls the PD communication unit 62 to transfer information of the PD transfer candidate list PDList and corresponding contents data or metadata as necessary. Then, the PD communication unit 62 transmits the information of the PD transfer candidate list PDList and the like to the PD 7 through the communication unit 20 and a USB cable (not shown), as described above with reference to FIG. 9. Thus, the PD transfer candidate list PDList is stored as a playlist in the PD 7 and contents reproduction using the playlist is performed in the PD 7.

Figure 37:
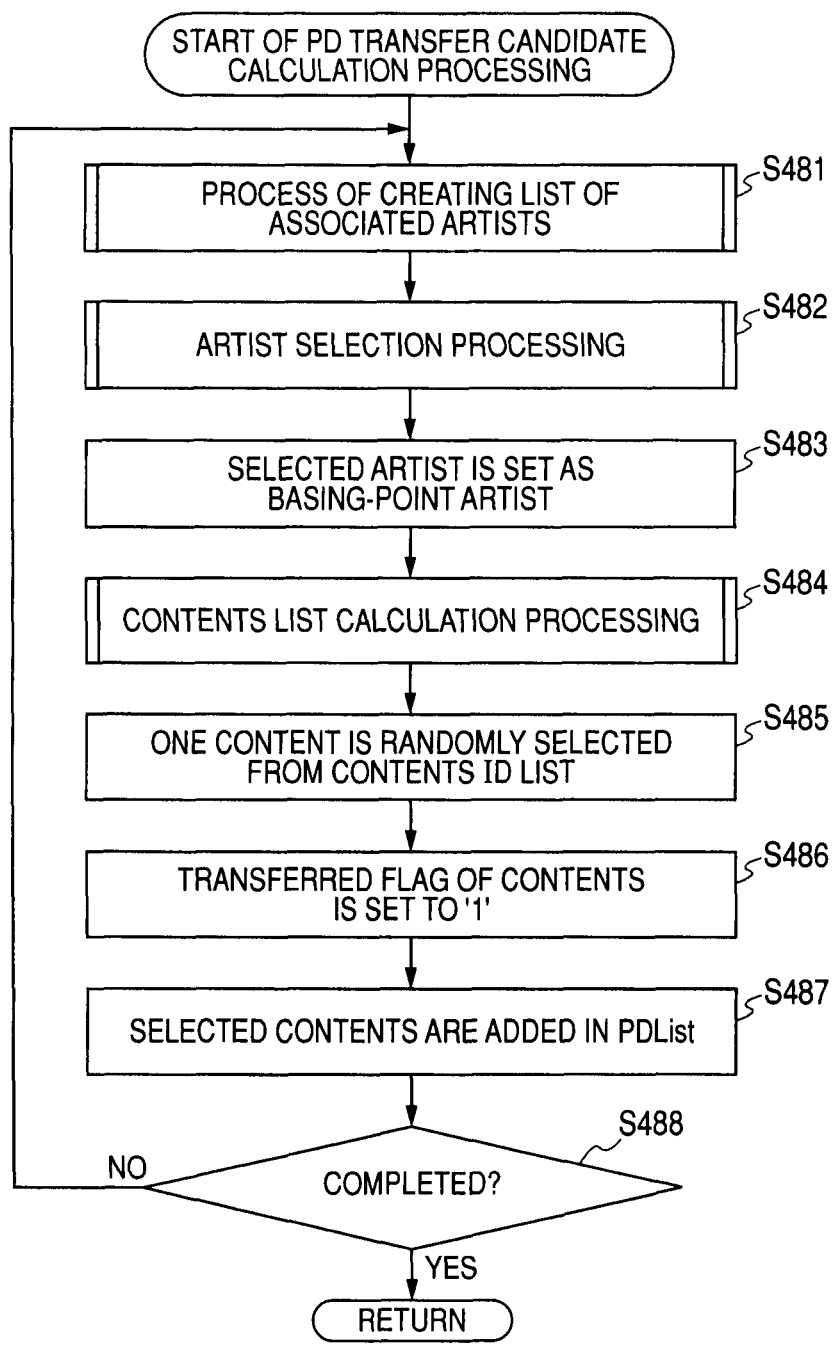
FIG. 37 is a flow chart explaining PD transfer candidate calculation processing in step S466 shown in FIG. 36.

Next, the PD transfer candidate calculation processing in step S466 of FIG. 36 will be described in detail with reference to a flow chart in FIG. 37.

In step S481, the PD transfer control unit 60 controls the ALM management unit 54 to perform associated artist list creation processing for obtaining artist link information of the basing-point artist. Since the associated artist list creation processing is basically the same as the associated artist list creation processing described above with reference to FIG. 33, a detailed explanation thereof will be omitted. To be short, in the associated artist list creation processing in step S481, an artist group list in which the basing-point artist is included is obtained, and an artist list AList included in each artist group is created.

In step S482, the PD transfer control unit 60 performs artist selection processing. Since the artist selection processing is basically the same as the artist selection processing described above with reference to FIG. 31, a detailed explanation thereof will be omitted. To be short, in the artist selection processing in step S482, one artist is selected from artists within the associated artist list AList obtained in step S481.

In step S483, the PD transfer control unit 60 sets an artist selected in step S482 as a basing-point artist. Then, in step S484, the PD transfer control unit 60 controls the contents management unit 55 to perform a process of calculating a contents list of the basing-point artist. Since the contents list calculation processing is basically the same as the contents list calculation processing described above with reference to FIG. 32, a detailed explanation thereof will be omitted. To be short, in the contents list calculation processing in step S484, the contents ID list TList of the basing-point artist is calculated.

In step S485, the PD transfer control unit 60 randomly selects one content from the contents ID list TList of the basing-point artist. Then, in step S486, the PD transfer control unit 60 sets a reproduced flag of the contents information database 58 of the selected content to '1'.

In step S487, the PD transfer control unit 60 adds the contents ID of the selected contents in the PD transfer candidate list PDList.

In step S488, the PD transfer control unit 60 determines whether or not to complete PD transfer candidate calculation processing. If it is determined in step S488 that the PD transfer candidate calculation processing is not completed, the process returns to step S481 to repeat the subsequent processes.

On the other hand, in step S488, for example, the PD transfer control unit 60 compares free space of the PD with total capacity of contents to be added in the PD transfer candidate list PDList. If it is determined that the free space of the PD becomes smaller than a predetermined threshold value, the PD transfer candidate calculation processing is completed. Alternatively, the user may set the number of contents, a file size (MB), play time (min), and the like beforehand. In this case, in step S488, the PD transfer control unit 60 terminates completes the PD transfer candidate calculation processing when the number of contents, a file size (MB), play time (min), and the like reaches those set beforehand by the user, and then the process returns to step S466 in FIG. 36 and proceeds to step S467.

As described above, it is also possible to transfer a list of contents, contents, and the like, which are randomly selected referring to artist link information, to the PD 7 so that a user can enjoy the contents. Even in the artist link map PD transfer processing, it is possible to preferentially transfer an artist group created by a user, in the same manner as in the reproduction processing described with reference to FIG. 34.

In the above description, a case has been suggested in which the artist link information editing processing or the artist link map reproduction processing is performed in the PC 1. However, as described above with reference to FIG. 7, since the PD 7 has the same configuration as the PC 1 in performing the artist link information editing processing or the artist link map reproduction processing, basically the same processing can also be performed in the PD 7. In this case, unlike a mouse or keyboard in the PC 1, the operation input unit 36 is configured to include, for example, an artist link button 411, an option button 412, a back button 413, a cross button 414, and a decision button 415 that are formed on a housing 401 of the PD 7, as shown in FIG. 38.

Figure 38:
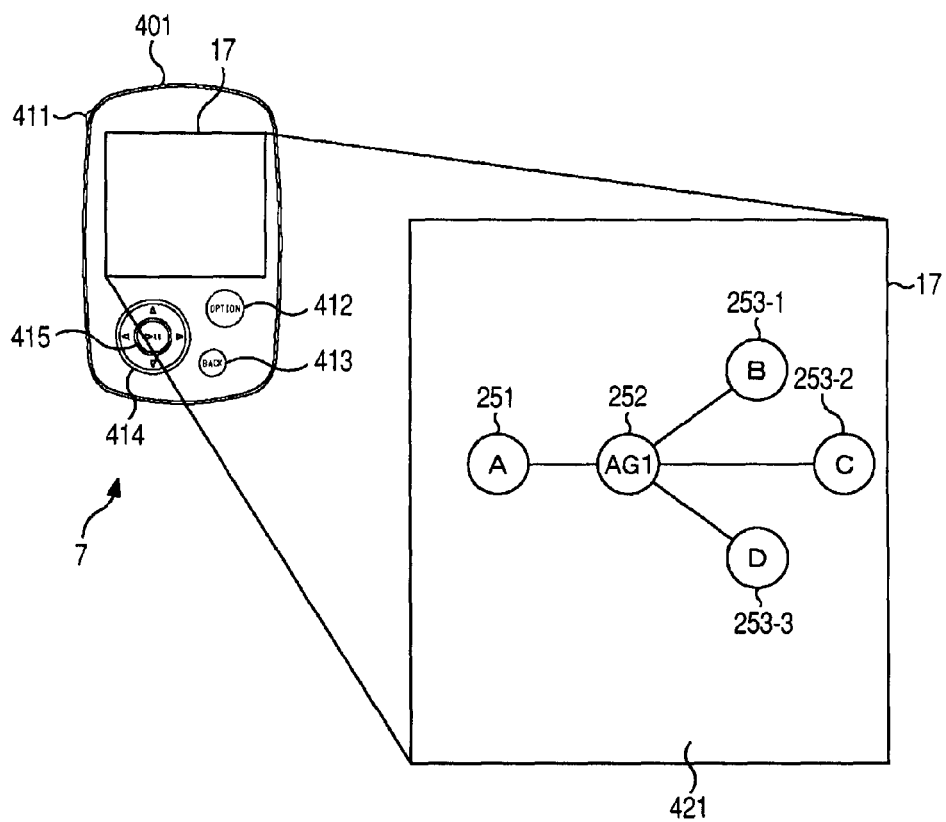
FIG. 38 is a view illustrating an example of the configuration of outer appearance of a PD 7 shown in FIG. 1.

FIG. 38 is a view illustrating an example of the configuration of outer appearance of the PD 7.

The artist link button 411, which is used to display an artist link map preview screen 421 corresponding to the artist link map preview screen 351 shown in FIG. 24 in the PC 1, is provided at an upper part of a left side surface of the housing 401 of the PD 7.

A display unit 17 formed of an LCD is provided on a front surface of the housing 401, and the artist link map preview screen 421 is displayed thereon as shown in a right part of FIG. 38 in an enlarged manner. In the same manner as the artist link map preview screen 351 shown in FIG. 24, a basing-point icon 251 indicating a basing-point artist, a folder icon 252 that is displayed on a middle part of the artist link map preview screen 421 and indicates an artist group in which the basing-point artist is included, and associated icons 253-1 to 253-3 of the artists (that is, associated artists associated with the basing-point artist) included in the artist group in which the basing-point artist is included are displayed on the artist link map preview screen 421.

On the artist link map preview screen 421 in FIG. 38, there is displayed a case in which an artist A is a basing-point artist as shown by character 'A' of the basing-point icon 251, the basing-point artist is included in the artist group AG1 as shown by 'AG1' of the folder icon 252, and the artists B to D are also included in the artist group AG1 as shown by 'B', 'C', and 'D' of the associated icons 253-1 to 253-3.

Further, on the artist link map preview screen 421, artist link map reproduction is performed when an artist or the like is selected.

Furthermore, at a right side below the display unit 17 on the front surface of the housing 401, the option button 412 and the back button 413 for returning to a previous screen are provided in line up and down. For example, if the option button 412 is pressed while the artist link map preview screen 421 is being displayed, a screen, on which artist link information can be edited, for example, corresponding to the artist link map editing screen 201 of the FIG. 13 is displayed. Furthermore, since a display region of the display unit 17 of the PD 7 is not large, a screen corresponding to the artist link tree screen 213 is excluded. Accordingly, an artist link map editing screen of the PD 7 is configured to include at least one of a screen corresponding to the artist list screen 211 and a screen corresponding to the artist group list screen 212.

Moreover, the cross button 414 is provided at a left side below the display unit 17 on the front surface of the housing 401, and the decision button 415 is provided in the middle of the cross button 414. For example, artist link information can be edited by selecting an artist or an artist group displayed on the screen corresponding to the artist list screen 211 or the screen corresponding to the artist group list screen 212 with the cross button 414 according to a user's operation and then deciding the artist or the artist group with the decision button 415. That is, the same effects as in the PC 1 can also be achieved in the PD 7.

Thus, the shuffle reproduction is performed by using the artist link information. Specifically, a list of other associated artists included in an artist group in which an artist of contents being reproduced is included are acquired, a list of contents of a basing-point artist selected from the list of associated artists is acquired, and one content is randomly selected from the list to be then reproduced. Accordingly, it is possible to cause highly associated contents to be sequentially reproduced while causing contents to be unpredictably linked.

Further, since artist link information created on the basis of detailed metadata can be easily edited corresponding to a user's operation, more efficient artist link information is created. Thus, artist link information that is efficient for each user is created, and it is possible to grant 'meaning' or 'reason' with respect to a contents linking method in the above shuffle reproduction. Therefore, since a user can control the contents linking method and random reproduction is also realized, the user can enjoy combination of contents and contents linking method more than before.

Furthermore, since edited artist link information can be written in a file or the written file can be loaded, users may exchange information with each other. Accordingly, for example, since it becomes possible to supply the edited artist link information to the contents server 3 or the like, contents (song) may be sold in cooperation with web service.

Even though the above description has been made using contents, such as motion pictures or songs, the present invention may also be applied to contents, such as application, without being limited to the motion pictures or songs.

Further, in the above description, a personal computer such as the PC 1 or the PD 7 that is a portable record and reproduction apparatus in FIG. 1 has been used as an information processing apparatus. However, without being limited to the PC 1 or the PD 7, for example, a mobile phone, a PDA (personal digital assistant) apparatus, a reproduction apparatus or a record and reproduction apparatus such as an AV (audio visual) apparatus, or a CE (consumer electronics) apparatus such as home appliances (home electric appliances) may be used as an information processing apparatus.

The series of processing described above may be executed using hardware or software.

In the case of executing the series of processing using software, a program included in the software is installed in a computer provided in dedicated hardware or installed in a general-purpose personal computer, which is capable of executing various kinds of functions when various programs are installed, through a network or a recording medium.

As shown in FIG. 2, the recording medium may be provided, separately from a main body of an apparatus, as package media such as the removable media 22 including a magnetic disc (including a flexible disc), an optical disc (including a CD-ROM (compact disc-read only memory and a DVD (digital versatile disc)), a magneto-optic disc (including MD (mini-disc; trademark)), and a semiconductor memory which are distributed to supply a program to a user and in which the program is recorded. In addition, without being limited to the package media described above, the recording medium may be provided as, for example, a hard disk included in the ROM 12 or the storage unit 19, which is supplied to a user while being provided beforehand in the main body of the apparatus and in which the program is recorded.

Moreover, in the present specification, the steps shown in the flow charts include processes performed in a time-sequential manner according to the described order and also include processes performed in parallel or separately even if not necessarily performed in the time-sequential manner.

Furthermore, in the present specification, a system refers to the entire apparatus configured to include a plurality of apparatuses.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus that performs processing for editing information on contents, comprising:
  an acquisition means for acquiring an attribute data classification information element, in which attribute data elements indicating predetermined attributes of the contents are correlated with category data elements indicating categories for classifying the attributes of the contents;
  a selection means for selecting a predetermined attribute data element from the attribute data elements included in the attribute data classification information element acquired by the acquisition means;
  a correlation means for newly correlating the selected attribute data element selected by the selection means with a second category data element other than a first category data element to which the selected attribute data element is already correlated with in the attribute data classification information element acquired by the acquisition means, in response to a user's instruction, by editing the attribute data classification information element to add the second category data element to the attribute data classification information element without altering the attribute data elements of the contents, wherein
  the attribute data classification information element includes a table that correlates the attribute data elements with the category data elements, and the editing the attribute data classification information element includes adding the second category data element to the table, such that the selected attribute data element correlates with both the first and second category data elements in the table;

a reproduction means for reproducing a first content of the contents, the first content having a first attribute data element; and a display means for displaying:
- a first link map for only the first content, the first link map including a first attribute data classification information element that includes the first attribute data element, by drawing a line directly connecting the first attribute data element and the first attribute data classification information element, and
- one or more second attribute data elements, other than the first attribute data element, that are respectively included in the first attribute data classification information element, by drawing lines directly connecting the first attribute data classification information elements to the one or more second attribute data elements.

2. The information processing apparatus according to claim 1, wherein a category indicated by the other category data element is created in response to a user's instruction.

3. The information processing apparatus according to claim 1, wherein the correlation means newly correlates the category data elements, which are included in the attribute data classification information element acquired by the acquisition means, with an attribute data element other than an attribute data element correlated with the category data elements, in response to a user's instruction.

4. The information processing apparatus according to claim 1, wherein the correlation means causes the attribute data elements, which are correlated with the category data elements included in the attribute data classification information element acquired by the acquisition means, to stop being correlated with the category data elements in response to a user's instruction.

5. The information processing apparatus according to claim 1, wherein the acquisition means acquires the attribute data classification information element on contents stored in a predetermined storage means, through a network.

6. The information processing apparatus according to claim 1, wherein the correlation means outputs, as a file, the edited attribute data classification information element that is a result obtained by newly correlating the attribute data element selected by the selection means with the other category data.

7. The information processing apparatus according to claim 6, wherein the correlation means acquires the edited attribute data classification information element output as the file from another information processing apparatus and also newly correlates the category data elements, which are included in the edited attribute data classification information element that is the result of the new correlation, with the attribute data elements correlated in the acquired attribute data classification information element.

8. The information processing apparatus according to claim 1, further comprising:
a contents acquisition means for acquiring, when contents having the newly correlated attribute data element are not stored in a predetermined storage means, the contents having the attribute data element through a network.

9. The information processing apparatus according to claim 1, wherein the attribute data element correlated with the category data element included in the attribute data classification information element is prioritized.

10. The information processing apparatus according to claim 1, further comprising:
a registering means for registering the attribute data elements with the category data elements in the attribute data classification information element, wherein the attribute data classification information element is a correspondence table which includes the attribute data elements and the category data elements and identifies correlations therebetween.

11. The information processing apparatus according to claim 10, wherein the correlation means newly correlates the selected attribute data element with the second category data element by adding the second category data element to the correspondence table so that the correspondence table identifies the new correlation between the second category data element and the selected attribute data element.

12. The information processing apparatus according to claim 1, wherein the contents include music contents, and the attributes include artist names.

13. The information processing apparatus according to claim 12, wherein the attributes include genres.

14. The information processing apparatus according to claim 1, wherein the correlation means correlates a first attribute data element of a first content with both of a first attribute data classification information element and a second attribute data classification information element, such that the first attribute data element and the first content are both correlated with both of the first and second attribute data classification information elements.

15. The information processing apparatus according to claim 14, further comprising:
an interface means for accepting a selection of one of the second attribute data elements that are displayed by the display means, wherein
in response to a selection of one of the second attribute data elements that are displayed by the display means, the reproduction means reproduces a content having the one of the second attribute data elements.

16. An information processing method for an information processing apparatus that performs processing for editing information on contents, the method comprising:
acquiring, in the information processing apparatus, an attribute data classification information element, in which attribute data elements indicating predetermined attributes of the contents are correlated with category data elements indicating categories for classifying the attributes of the contents;

selecting, in the information processing apparatus, a predetermined attribute data element from the attribute data elements included in the acquired attribute data classification information element;

newly correlating, in the information processing apparatus, the selected attribute data element with a second category data element other than a first category data element to which the selected attribute data element is already correlated with in the acquired attribute data classification information element, in response to a user's instruction, by editing the attribute data classification information element to add the second category data element to the attribute data classification information element without altering the attribute data elements of the contents, wherein the attribute data classification information element includes a table that correlates the attribute data elements with the category data elements, and the editing the attribute data classification information element includes adding the second category data element to the table, such that the selected attribute data element correlates with both the first and second category data elements in the table;

reproducing a first content of the contents, the first content having a first attribute data element; and displaying:
- a first link map for only the first content, the first link map including a first attribute data classification information element that includes the first attribute data element, by drawing a line directly connecting the first attribute data element and the first attribute data classification information element, and
- one or more second attribute data elements, other than the first attribute data element, that are respectively included in the first attribute data classification information element, by drawing lines directly connecting the first attribute data classification information elements to the one or more second attribute data elements.

17. The information processing method according to claim 16, further comprising:

accepting a selection of one of the second attribute data elements that are displayed in the displaying; and in response to the accepting the selection of one of the second attribute data elements that are displayed in the displaying, reproducing a content having the one of the second attribute data elements.

18. A non-transitory computer readable medium, including computer executable instructions, which when executed by a processor, cause an information processing apparatus to perform a method for editing information on contents, the method comprising:

acquiring an attribute data classification information element, in which attribute data elements indicating predetermined attributes of the contents are correlated with category data elements indicating categories for classifying the attributes of the contents;

selecting a predetermined attribute data element from the attribute data elements included in the acquired attribute data classification information element; and newly correlating the selected attribute data element with a second category data element other than a first category data element to which the selected attribute data element is already correlated with in the acquired attribute data classification information element, in response to a user's instruction, by editing the attribute data classification information element to add the second category data element to the attribute data classification information element without altering the attribute data elements of the contents, wherein the attribute data classification information element includes a table that correlates the attribute data elements with the category data elements, and the editing the attribute data classification information element includes adding the second category data element to the table, such that the selected attribute data element correlates with both the first and second category data elements in the table;

reproducing a first content of the contents, the first content having a first attribute data element; and displaying:
- a first link map for only the first content, the first link map including a first attribute data classification information element that includes the first attribute data element, by drawing a line directly connecting the first attribute data element and the first attribute data classification information element, and
- one or more second attribute data elements, other than the first attribute data element, that are respectively included in the first attribute data classification information element, by drawing lines directly connecting the first attribute data classification information elements to the one or more second attribute data elements.

19. The medium according to claim 18, wherein the method further comprises:

accepting a selection of one of the second attribute data elements that are displayed in the displaying; and in response to the accepting the selection of one of the second attribute data elements that are displayed in the displaying, reproducing a content having the one of the second attribute data elements.

20. An information processing apparatus that performs processing for editing information on contents, comprising:

an acquisition circuit configured to acquire, by a processor of the information processing apparatus, an attribute data classification information element and record the attribute data classification information element on an electronic storage unit, in which attribute data elements indicating predetermined attributes of the contents are correlated with category data elements indicating categories for classifying the attributes of the contents;

a selection circuit configured to select a predetermined attribute data element from the attribute data elements included in the attribute data classification information element acquired by the acquisition circuit and stored on the electronic storage unit;

a correlation circuit configured to newly correlate, by the processor, the selected attribute data element selected by the selection circuit with a second category data element other than a first category data element to which the selected attribute data element is already correlated with in the attribute data classification information element acquired by the acquisition circuit, in response to a user's instruction, by editing the attribute data classification information element stored on the electronic storage unit to add the second category data element to the attribute data classification information element without altering the attribute data elements of the contents, wherein the attribute data classification information element includes a table that correlates the attribute data elements with the category data elements, and the editing the attribute data classification information element includes adding the second category data element to the table, such that the selected attribute data element correlates with both the first and second category data elements in the table;

reproduction circuit configured to reproduce a first content of the contents, the first content having a first attribute data element; and a display circuit configured to output to a display:
- a first link map for only the first content, the first link map including a first attribute data classification information element that includes the first attribute data element, by drawing a line directly connecting the first attribute data element and the first attribute data classification information element, and
- one or more second attribute data elements, other than the first attribute data element, that are respectively included in the first attribute data classification information element, by drawing lines directly connecting the first attribute data classification information elements to the one or more second attribute data elements.

21. The information processing apparatus according to claim 20, further comprising:
an interface circuit configured to accept a selection of one of the second attribute data elements that are displayed by the display, wherein
in response to a selection of one of the second attribute data elements that are displayed by the display means, the reproduction circuit reproduces a content having the one of the second attribute data elements.

* * * * *